US012561732B2

(12) United States Patent
Sparks et al.

(10) Patent No.: US 12,561,732 B2
(45) Date of Patent: Feb. 24, 2026

(54) COMPUTING DEVICES AND SYSTEMS FOR SENDING AND RECEIVING A DIGITAL GIFT USING A VOICE INTERFACE

(71) Applicant: FACET LABS, LLC, Los Gatos, CA (US)

(72) Inventors: Lindsay Sparks, Seattle, WA (US); Wilfred P. So, Mississauga (CA); Koichi Nishimura, San Jose, CA (US); Stuart Ogawa, Los Gatos, CA (US)

(73) Assignee: FACET LABS, LLC, Los Gatos, CA (US)

( * ) Notice: Subject to any disclaimer, the term of this patent is extended or adjusted under 35 U.S.C. 154(b) by 284 days.

(21) Appl. No.: 17/625,145

(22) PCT Filed: Jul. 10, 2020

(86) PCT No.: PCT/US2020/041670
§ 371 (c)(1),
(2) Date: Jan. 6, 2022

(87) PCT Pub. No.: WO2021/007546
PCT Pub. Date: Jan. 14, 2021

(65) Prior Publication Data
US 2022/0270162 A1      Aug. 25, 2022

Related U.S. Application Data

(60) Provisional application No. 62/872,373, filed on Jul. 10, 2019.

(51) Int. Cl.
*G06Q 30/00* (2023.01)
*G06F 3/0484* (2022.01)
*G06Q 30/0601* (2023.01)
*G10L 15/08* (2006.01)

(52) U.S. Cl.
CPC ....... *G06Q 30/0641* (2013.01); *G06F 3/0484* (2013.01); *G10L 15/08* (2013.01); *G10L 2015/088* (2013.01)

(58) Field of Classification Search
USPC ............................................... 705/26.1–27.2
See application file for complete search history.

(56) References Cited

U.S. PATENT DOCUMENTS

| | | | |
|---|---|---|---|
| 2014/0040059 A1* | 2/2014 | Barabas ............. | G06Q 30/0601 705/26.1 |
| 2015/0242679 A1* | 8/2015 | Naveh .................. | G06V 40/174 382/100 |
| 2018/0053243 A1* | 2/2018 | Schimke ............. | G06Q 30/0641 |

OTHER PUBLICATIONS

O. T.-C. Chen, S.-Y. Chang, Y.-Z. Ma, Y. C. Zhang and Y. L. Lee, "Time Capsule Gift with Affective Awareness of Event Memories via Near Field Communication," 2020 IEEE/SICE International Symposium on System Integration (SII), Honolulu, HI, USA, 2020, pp. 585-589, doi: 10.1109/SII46433.2020.9026183. (Year: 2020).*

* cited by examiner

*Primary Examiner* — Anand Loharikar

(57) ABSTRACT

Composing messages and receiving messages using text is time consuming and can lose meaning for recipients. Systems and methods are provided to generate a digital gift. A digital gift wrapper is used to precede the digital gift. A gift recipient interacts with the digital gift wrapper and the digital gift using a voice interface. The digital gift includes, for example, both audio and visual data. A physical gift is also generated and sent in a coordinated manner with the digital gift.

12 Claims, 33 Drawing Sheets

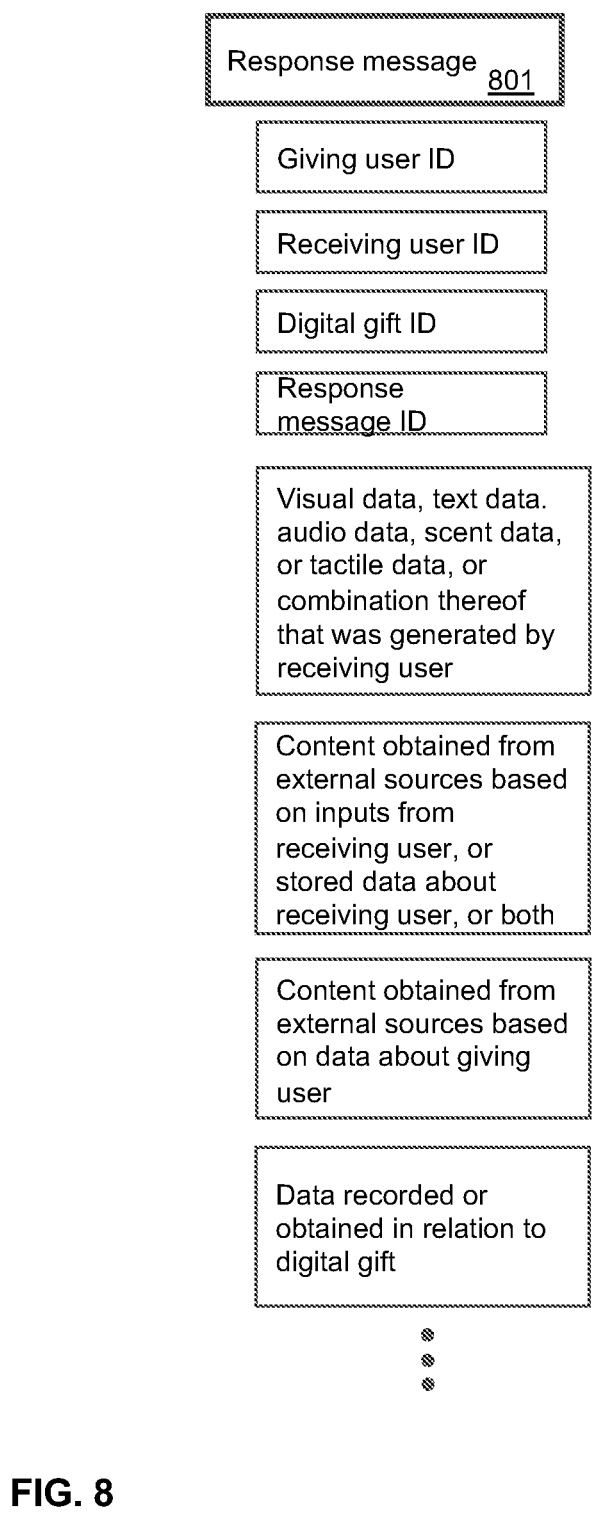

Response message 801

Giving user ID

Receiving user ID

Digital gift ID

Response message ID

Visual data, text data. audio data, scent data, or tactile data, or combination thereof that was generated by receiving user Content obtained from external sources based on inputs from receiving user, or stored data about receiving user, or both Content obtained from external sources based on data about giving user Data recorded or obtained in relation to digital gift

FIG. 8

Gift Giver
Device

Gift Recipient's Device

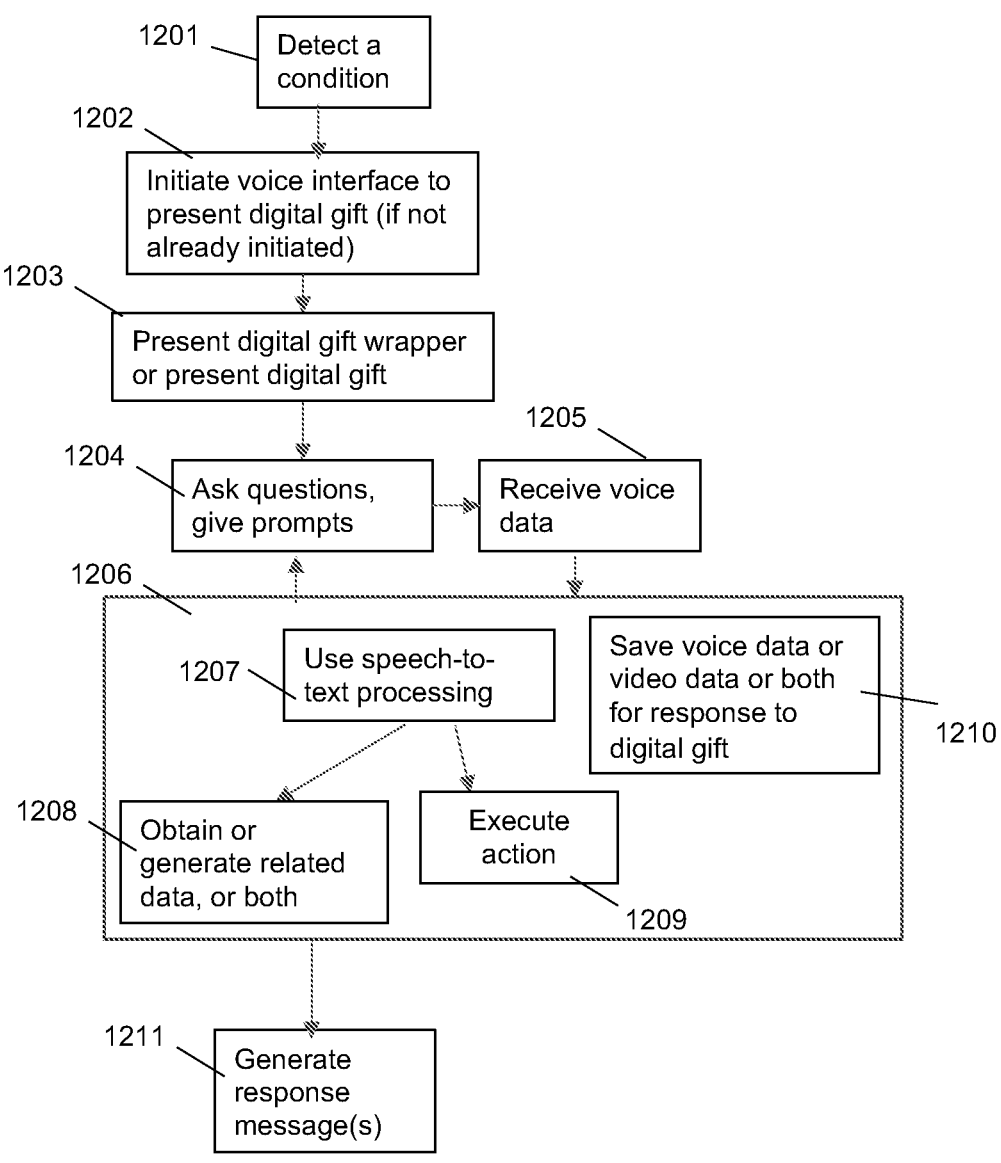

1201 — Detect a condition

1202 — Initiate voice interface to present digital gift (if not already initiated)

1203 — Present digital gift wrapper or present digital gift

1204 — Ask questions, give prompts

1205 — Receive voice data

1206 —

1207 — Use speech-to-text processing

1210 — Save voice data or video data or both for response to digital gift

1208 — Obtain or generate related data, or both

1209 — Execute action

1211 — Generate response message(s)

FIG. 12

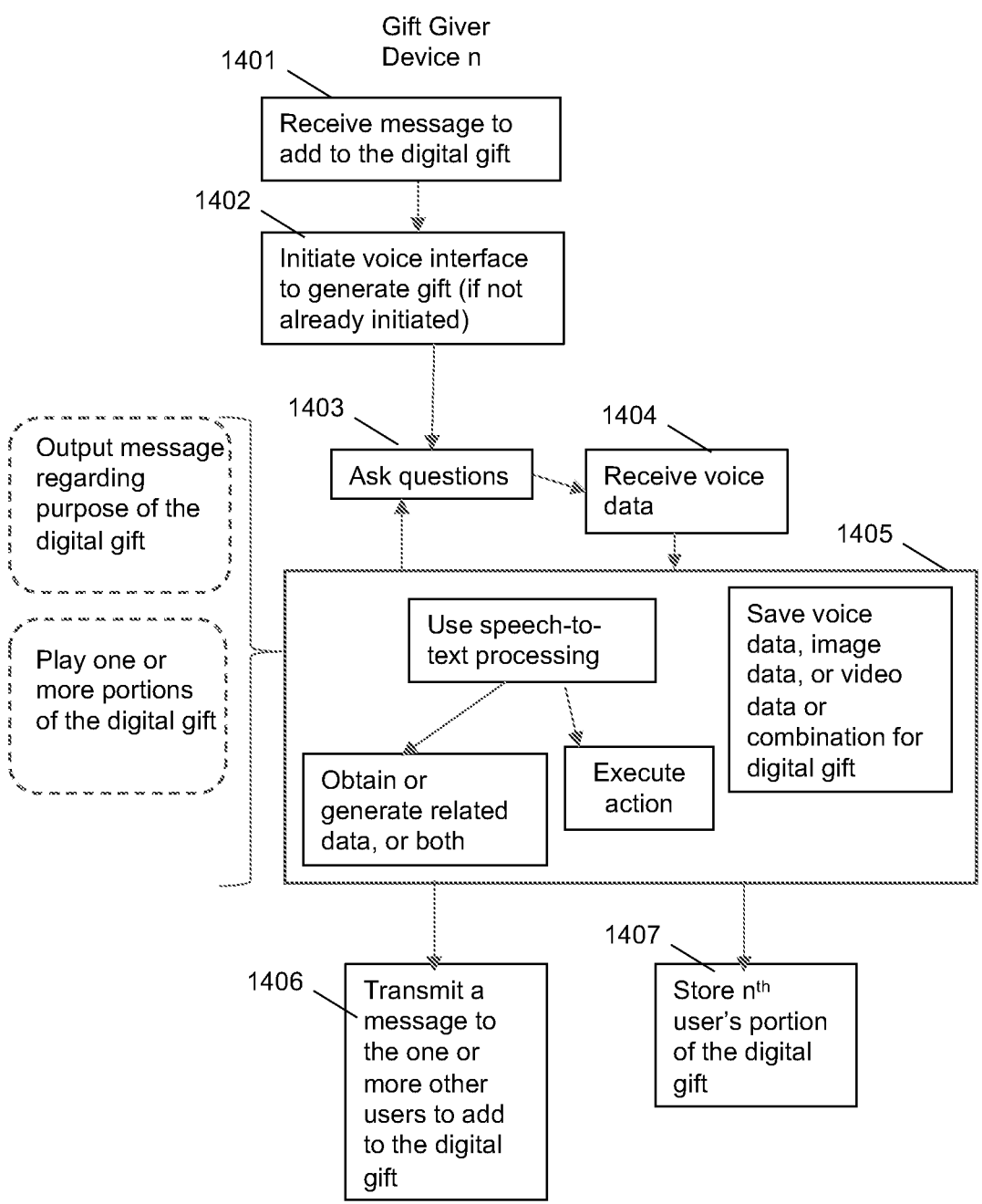

1401

Gift Giver
Device n

Receive message to
add to the digital gift

1402

Initiate voice interface
to generate gift (if not
already initiated)

1403

Output message
regarding
purpose of the
digital gift

Ask questions

1404

Receive voice
data

1405

Play one or
more portions
of the digital gift

Use speech-to-
text processing

Save voice
data, image
data, or video
data or
combination for
digital gift

Obtain or
generate related
data, or both

Execute
action

1407

1406

Transmit a
message to
the one or
more other
users to add
to the digital
gift

Store nth
user's portion
of the digital
gift

FIG. 14

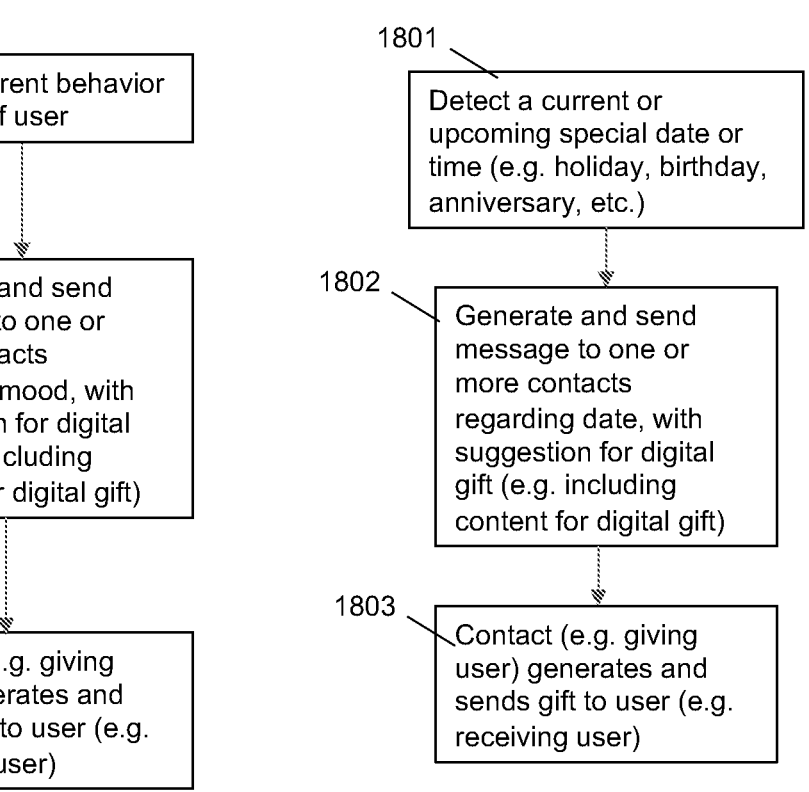

1701

Detect current behavior or mood of user

1702

Generate and send message to one or more contacts regarding mood, with suggestion for digital gift (e.g. including content for digital gift)

1703

Contact (e.g. giving user) generates and sends gift to user (e.g. receiving user)

Detect a current or upcoming special date or time (e.g. holiday, birthday, anniversary, etc.)

1802

Generate and send message to one or more contacts regarding date, with suggestion for digital gift (e.g. including content for digital gift)

1803

Contact (e.g. giving user) generates and sends gift to user (e.g. receiving user)

FIG. 18A

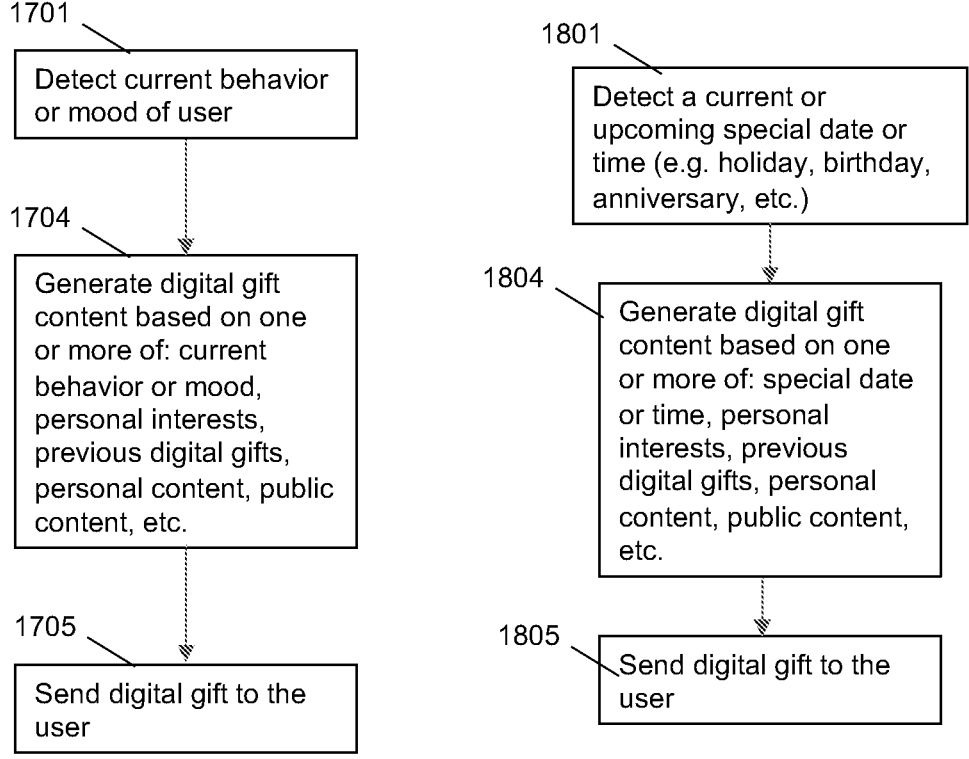

1701

Detect current behavior or mood of user

1704

Generate digital gift content based on one or more of: current behavior or mood, personal interests, previous digital gifts, personal content, public content, etc.

1705

Send digital gift to the user

1801

Detect a current or upcoming special date or time (e.g. holiday, birthday, anniversary, etc.)

1804

Generate digital gift content based on one or more of: special date or time, personal interests, previous digital gifts, personal content, public content, etc.

1805

Send digital gift to the user

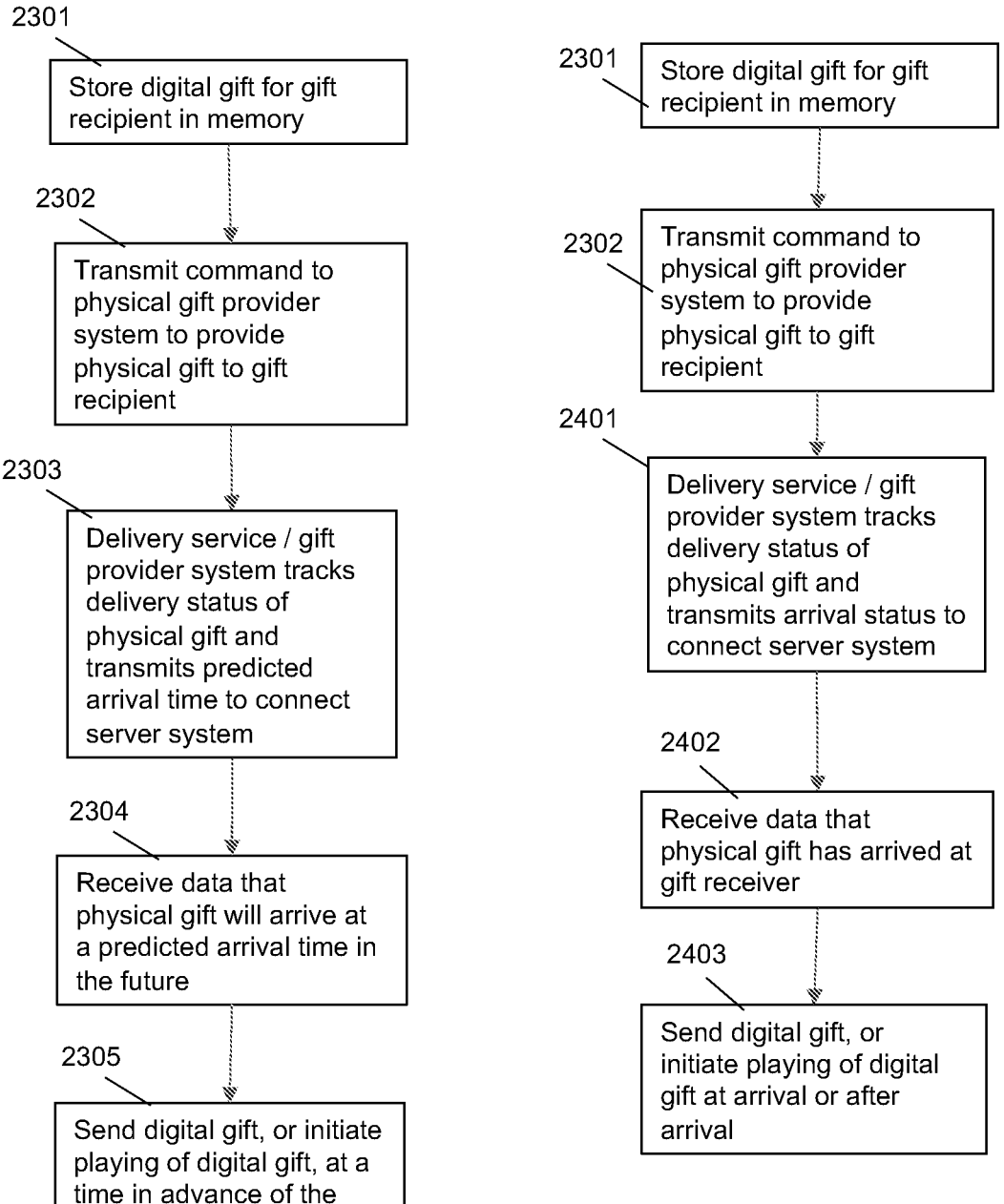

2301
Store digital gift for gift recipient in memory

2302
Transmit command to physical gift provider system to provide physical gift to gift recipient 2303
Delivery service / gift provider system tracks delivery status of physical gift and transmits predicted arrival time to connect server system 2304
Receive data that physical gift will arrive at a predicted arrival time in the future 2305
Send digital gift, or initiate playing of digital gift, at a time in advance of the predicted arrival time

FIG. 23

2301
Store digital gift for gift recipient in memory

2302
Transmit command to physical gift provider system to provide physical gift to gift recipient 2401
Delivery service / gift provider system tracks delivery status of physical gift and transmits arrival status to connect server system 2402
Receive data that physical gift has arrived at gift receiver 2403
Send digital gift, or initiate playing of digital gift at arrival or after arrival

FIG. 24

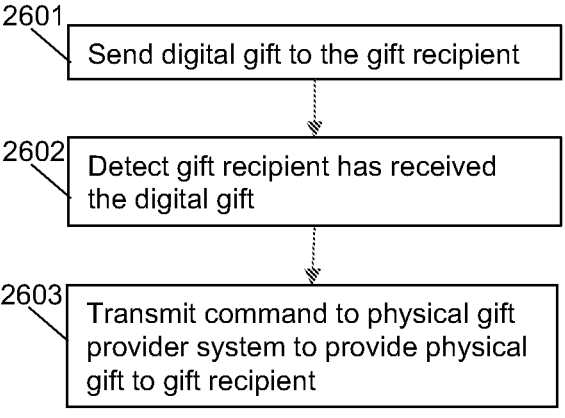

2601 Send digital gift to the gift recipient

2602 Detect gift recipient has received the digital gift

2603 Transmit command to physical gift provider system to provide physical gift to gift recipient

FIG. 26

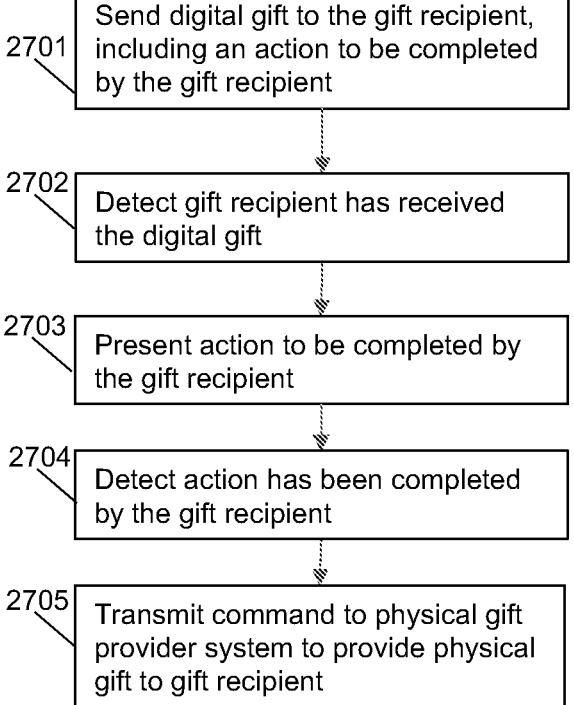

2701 Send digital gift to the gift recipient, including an action to be completed by the gift recipient 2702 Detect gift recipient has received the digital gift 2703 Present action to be completed by the gift recipient 2704 Detect action has been completed by the gift recipient 2705 Transmit command to physical gift provider system to provide physical gift to gift recipient

FIG. 27

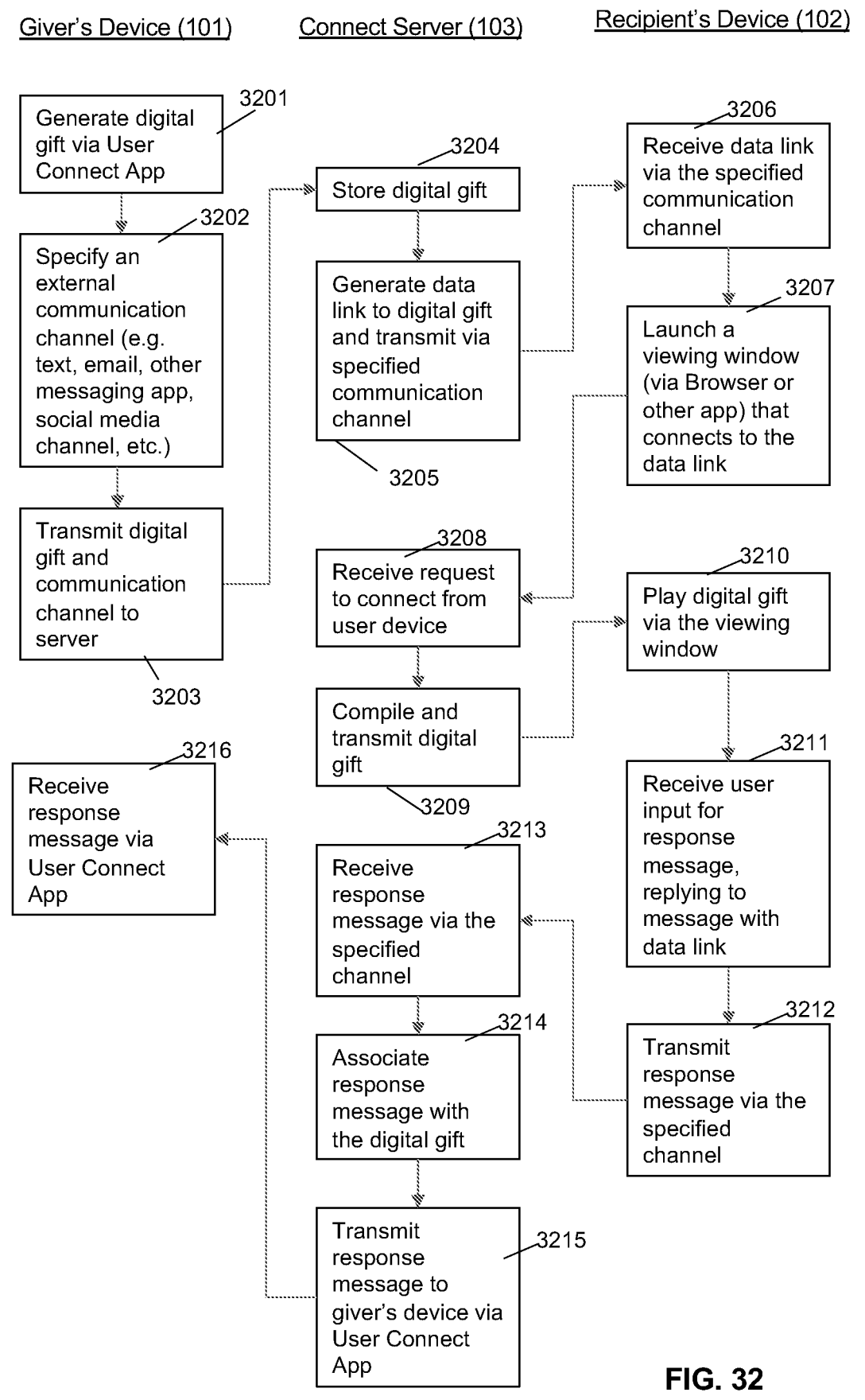

Giver's Device (101)        Connect Server (103)        Recipient's Device (102)

Generate digital gift via User Connect App 3201

Store digital gift 3204

Receive data link via the specified communication channel 3206

Specify an external communication channel (e.g. text, email, other messaging app, social media channel, etc.) 3202

Generate data link to digital gift and transmit via specified communication channel 3205

Launch a viewing window (via Browser or other app) that connects to the data link 3207

Transmit digital gift and communication channel to server 3203

Receive request to connect from user device 3208

Play digital gift via the viewing window 3210

Receive response message via User Connect App 3216

Compile and transmit digital gift 3209

Receive user input for response message, replying to message with data link 3211

Receive response message via the specified channel 3213

Associate response message with the digital gift 3214

Transmit response message via the specified channel 3212

Transmit response message to giver's device via User Connect App 3215

FIG. 32

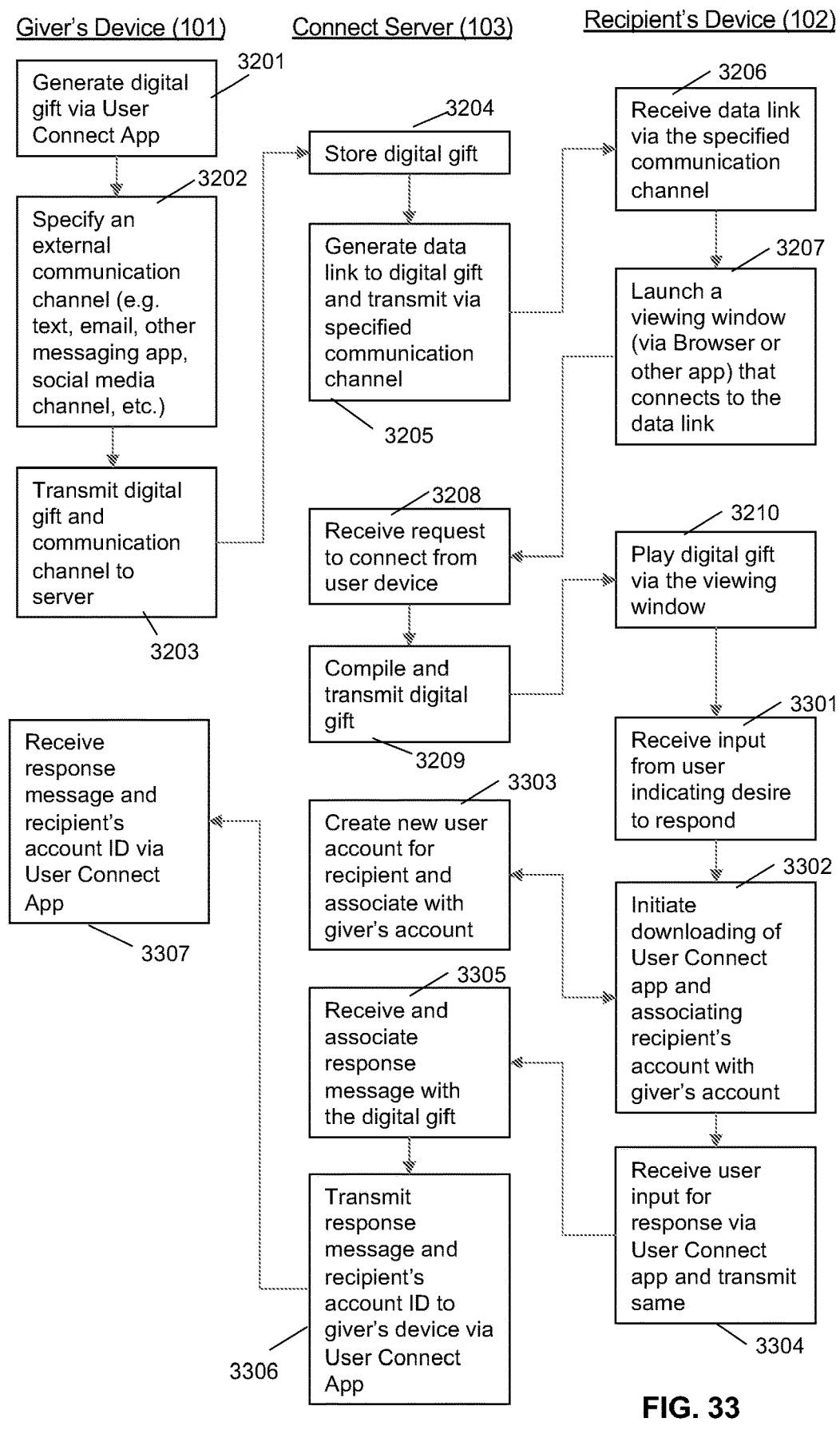

Giver's Device (101)    Connect Server (103)    Recipient's Device (102)

3201
Generate digital gift via User Connect App

3202
Specify an external communication channel (e.g. text, email, other messaging app, social media channel, etc.)

3203
Transmit digital gift and communication channel to server

3307
Receive response message and recipient's account ID via User Connect App

3204
Store digital gift

3205
Generate data link to digital gift and transmit via specified communication channel 3208
Receive request to connect from user device 3209
Compile and transmit digital gift 3303
Create new user account for recipient and associate with giver's account 3305
Receive and associate response message with the digital gift 3306
Transmit response message and recipient's account ID to giver's device via User Connect App 3206
Receive data link via the specified communication channel 3207
Launch a viewing window (via Browser or other app) that connects to the data link 3210
Play digital gift via the viewing window 3301
Receive input from user indicating desire to respond 3302
Initiate downloading of User Connect app and associating recipient's account with giver's account 3304
Receive user input for response via User Connect app and transmit same

FIG. 33

COMPUTING DEVICES AND SYSTEMS FOR SENDING AND RECEIVING A DIGITAL GIFT USING A VOICE INTERFACE

CROSS-REFERENCE TO RELATED APPLICATION

This application claim priority to U.S. Patent Application No. 62/872,373 filed on Jul. 10, 2019, and titled "Computing Devices and Systems for Sending and Receiving a Digital Gift Using a Voice Interface", the entire contents of which are herein incorporated by reference.

TECHNICAL FIELD

The following generally relates to sending and receiving a digital gift on computing devices. More particularly, in an example aspect, the digital gift is voice interactive.

DESCRIPTION OF THE RELATED ART

Electronic messages are conventionally created by a person typing text, such as in an email message, a text message, or an instant message for chatting. However, as people age, typing text becomes more difficult. Also, generating a message often uses a visual interface on a desktop computer screen, a tablet screen or a mobile phone screen. A user conventionally moves a pointer or uses a touch screen to select a contact, or to type in a contact name to send the message. These types of technological interfaces are difficult to use, for example, if people have decreased eyesight or have reduced fine motor abilities.

Furthermore, when a user receives a message, it often appears in a graphical user interface as a message item in a list of contacts or in a list of messages. The user then needs to use a mouse pointer or a touch screen to select the message item from the list of messages or the list of contacts. Again, this is a difficult interface for those with reduced fine motor abilities or with reduced eyesight.

BRIEF DESCRIPTION OF THE DRAWINGS

Embodiments will now be described by way of example only with reference to the appended drawings wherein:

FIG. 8 shows example components of a response message.

FIG. 12 is a flow diagram of example executable instructions for receiving a digital gift.

FIG. 14 is a flow diagram of example executable instructions for an Nth gift giver generating a portion of a digital gift that is generated by multiple gift givers.

FIG. 17A is a flow diagram of executable instructions for the connect server system messaging a potential gift giver based on a detected behavior or mood of a potential gift recipient.

FIG. 17B is a flow diagram of executable instructions for the connect server system automatically obtaining and transmitting a digital gift based on a detected behavior or mood of a potential gift recipient.

FIG. 18A is a flow diagram of executable instructions for the connect server system messaging a potential gift giver based on an upcoming special date or time for a potential gift recipient.

FIG. 18B is a flow diagram of executable instructions for the connect server system automatically obtaining and transmitting a digital gift based on an upcoming special date or time for a potential gift recipient.

FIG. 23 is a flow diagram of example executable instructions for coordinating sending a digital gift and a physical gift according to an example embodiment.

FIG. 24 is a flow diagram of example executable instructions for coordinating sending a digital gift and a physical gift according to another example embodiment.

FIG. 26 is a flow diagram of example executable instructions for coordinating sending a digital gift and a physical gift according to another example embodiment.

FIG. 27 is a flow diagram of example executable instructions for coordinating sending a digital gift and a physical gift according to another example embodiment.

FIG. 32 is a flow diagram of example executable instructions generating and transmitting a digital gift using a User Connect application and specifying a receiving communication channel for the gift recipient. The flow diagram also shows a gift recipient's device sending a response message via the same communication channel, and the response message is received on the User Connect application.

FIG. 33 is a flow diagram of example executable instructions generating and transmitting a digital gift using a User Connect application and specifying a receiving communication channel for the gift recipient. The flow diagram also shows a gift recipient's device downloading a User Connect application and sending a response message via the User Connect application.

DETAILED DESCRIPTION

Figure 1:
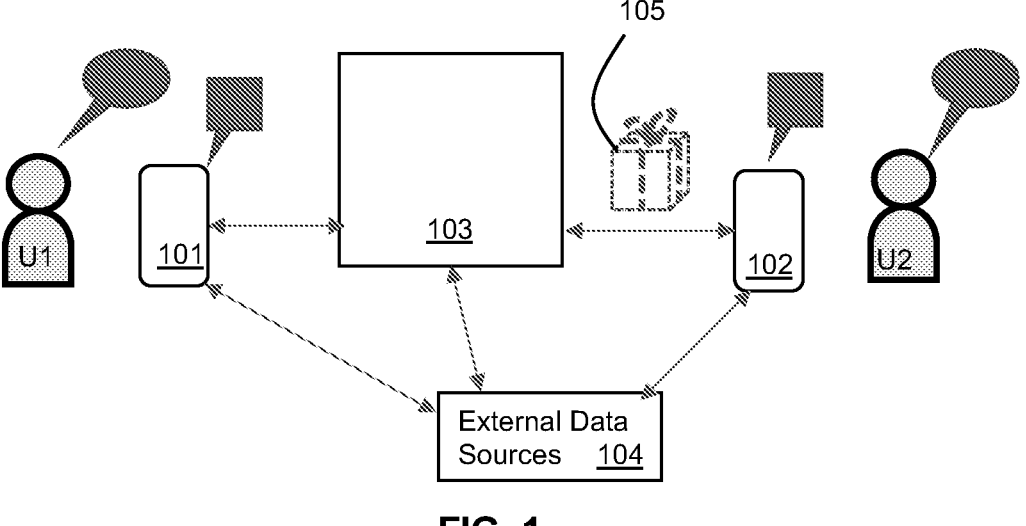
FIG. 1 is a schematic diagram of an example of a connect server system and user devices that facilitate generating and sending a digital gift from a gift giver to a gift recipient.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that it is desirable to provide a digital connection platform that facilitates communication of messages between people in a more natural way, such as by a voice interface. In particular, devices and systems described herein allow people to send and receive digital gifts by listening to voice prompts from a chat bot and providing voice responses. This reduces the use of a touch screen, a mouse pointer, and other digital buttons on a graphical user interface.

The term "digital gift" herein refers to a digital message that is intended for a gift receiver. In an example embodiment, the digital gift includes an audio gift message. In another example embodiment, the digital gift includes an audio gift message and one or more photos. In another example embodiment, the digital gift includes an audio gift message and other digital content (e.g. one or more videos, other audio content like music, a digital game, a command to a device to initiate an action, etc.). In another example embodiment, the digital gift includes a video gift message and other digital content (e.g. photos, other videos, audio content, a digital game, a command to a device to initiate an action, etc.).

The term "digital gift wrapper" herein refers to digital content that precedes the digital gift. In an example embodiment, the digital gift wrapper includes at least one of text content, visual content and audio content. The digital gift wrapper could include a combination of any of text, visual and audio content. In another example aspect, the digital gift wrapper includes conditions that are to be satisfied before opening the digital gift.

In another example aspect, the digital gift wrapper is sent first to a user device of the gift recipient, and the digital gift wrapper includes one or more conditions that are to be satisfied before playing the digital gift. After the one or more conditions are satisfied, then the digital gift is sent to the user device of the gift recipient.

Turning to FIG. 1, a gift giver U1 and their user device 101 interact with each other by speaking and listening to generate a digital gift. Examples of a user device 101 include a mobile phone, a tablet, a laptop, a smart speaker, a voice-assistant device, a smart watch, a smart television, a display device (e.g. a display screen, a media projector, etc.) connected to a computer, and a desktop computer. For example, the user device 101 initiates a voice interface that comprises activating an audio speaker and a microphone. The user device 101 asks one or more questions via the audio speaker and respectively records one or more answers via the microphone. The set of the one or more questions and the set of the one or more answers are used, for example, to identify a gift recipient, to record an audio gift message for the gift recipient U2, and to confirm transmission of a digital gift, the digital gift comprising the audio gift message. In another example aspect, the set of the one or more questions and the set of the one or more answers are used to initiate an option to select an image or a video to become part of the content of the digital gift. In an alternative example embodiment, the user device 101 presents a touch-based graphical user interface (GUI) and the gift giver U1 uses the GUI to generate the digital gift. In other words, the digital gift can be generated using a touch-based GUI or using a voice interface, or a combination of both touch gestures and voice commands.

The user device 101 then initiates transmission of the digital gift to the gift recipient via the communication system of the user device 101. For example, content of the digital gift message is transmitted via a mobile cellular network, wireless Internet, or a wired Internet connection. The content of the digital gift is received by a connect server system 103. The connect server system 103 stores the content of the digital gift, or stores the data link to content of the digital gift, or both.

In an example embodiment, the content of the digital gift is stored on the connect server system. In another example embodiment, a portion of the content of the digital gift is stored on the connect server system 103 and another portion of the content of the digital gift is stored on external data sources 104. For example, the external data source 104 could be photo sharing database, a video sharing platform, a music sharing platform, etc. The external data source 104, for example, includes public data. The data obtained from the gift recipient's device 101 and data from one or more external data sources 104 can be combined to generate the content of the digital gift.

A digital gift wrapper 105, which is associated with the digital gift, is sent to the user device 102 of the gift recipient U2. The gift recipient U2 and the user device 102 interact with each other by speaking and listening to play the digital gift. For example, the user device 101 asks the gift recipient U2 a set of one or more questions via the audio speaker and respectively records a set of one or more answers from the gift recipient U2 via the microphone. These one or more questions and one or more answers are used to confirm the user wants to play the digital gift. After the user device 102 receives a positive confirmation from the gift recipient U2, the user device 102 plays the digital gift. The content of the digital gift is then transmitted to the user device 102 from the connect server system 103 or the external data source 104, or from both. In another example embodiment, the user device 102 receives some other user input (e.g. a touch input via a GUI, a biometric signal, a movement gesture, etc.) to initiate playing the digital gift. In yet another example embodiment, the user device 102 automatically plays the digital gift after it is received at the user device 102. In yet another example embodiment, the user device 102 automatically plays the digital gift at a predetermined time condition, or at a predetermined location condition, or both.

After the user device 102 plays the digital gift, the user device 102 asks the gift recipient U2 another set of one or more questions via the audio speaker and respectively records another set of one or more answers from the gift recipient U2 via the microphone. These one or more questions and one or more answers are used, for example, to initiate an option to provide a response message to the gift giver U1. If the gift recipient U2 says they wish to record a response message, then the user device 102 records the response message using at least the microphone and confirms with the gift recipient their command to transmit their response message.

The response message is then sent to the connect server system 103 and then is transmitted to the gift giver's user device 101. The gift giver's user device 101 provides an alert that a response message has been received, originating from the gift recipient U2. The gift giver U1 speaks to their user device 101 to play the response message. In an example embodiment, the user device 101 plays the original digital gift (or a representation thereof) sent to the gift recipient U2 and then plays the response message from the gift recipient U2. For example, the representation of the original digital gift is the original gift message played back at a faster speed, or is a portion of the original digital gift. In another example embodiment, the user device 101 does not play back the original gift message and directly plays the response message.

In an example aspect, the voice interface is able to form audio sounds of speaking using text-to-speech processing. The voice interface is also able to understand audio sounds that have been recorded from the gift recipient or gift giver, or both, using speech-to-text processing.

In an example embodiment, a gift recipient can interact with a digital gift beyond the original content of the digital gift. For example, a gift giver (e.g. an adult daughter) generates a digital gift that includes photos of the gift recipient's grandson, where the gift recipient is the mother of the gift giver. The gift recipient sees the photos in the digital gift and speaks out to the voice interface, for example: "How old is my grandson?", or "What are my grandson's hobbies?", or some other question. The voice interface of the gift recipient's user device responds back with an answer by first processing the question using sentiment analysis and obtaining the answer from a library or by contacting the gift giver to provide the answer.

Figure 2:
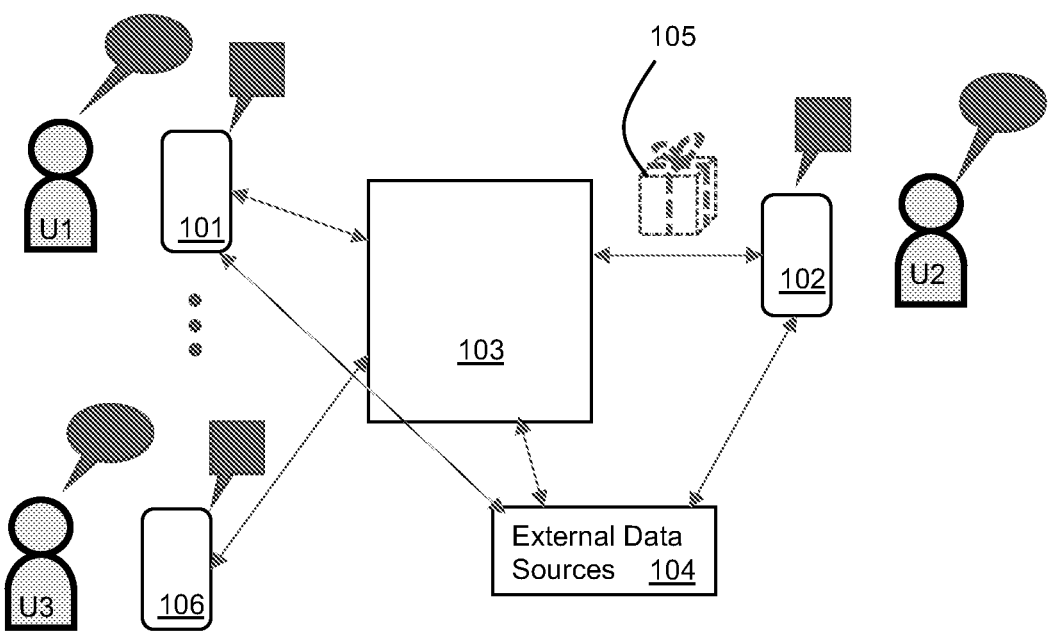
FIG. 2 is a schematic diagram similar to FIG. 1, but multiple gift givers generate a digital gift for a gift recipient.

FIG. 2 shows another example embodiment that includes multiple gift givers (e.g. U1, U3) that use their respective devices (e.g. user devices 101, 106) to compile a digital gift 105 that is transmitted to the gift recipient U2 via their user device 102. In particular, the gift givers U1 and U3 contribute their own digital content (e.g. voice messages, photos, videos, digital activities, digital games, etc.), and the connect server system 103 compiles the content from the multiple gift givers for transmission and presentation to the gift recipient U2. From the perspective of the gift recipient U2, the digital gift appears as one compiled digital gift, which can have different parts played in sequence.

For example, the gift giver U1 initiates a digital gift for the gift recipient U2 and adds digital content (e.g. U1 digital content). The gift giver U1 then names other gift givers to contribute to the digital gift, such as a gift giver U3. The gift giver U3 receives a message on their user device 106 prompting them to add digital content for the gift recipient U2 for their digital gift. The gift giver U3 then adds digital content (e.g. U3 digital content) using a voice interface on their user device 106. The connect server system 103 compiles U1 digital content with U3 digital content.

This compilation process includes, for example, mixing portions of digital content together. For example, photos from U1 digital content and U3 digital content are mixed together according to a time-based order, or are randomly mixed together. In another example, U1 digital content includes a series of photos and U3 digital content includes a song, and the connect server system 103 overlays the song with the series of photos. There are other different ways to mix the digital content together which are applicable to the principles described herein.

In another example, the compilation process includes adding transitions between the digital content. For example, a transition is an image transition or an audio transition or a tactile transition, or a combination thereof, between different digital content. A tactile transition, for example, includes a vibrating tactile action.

In another example, the compilation process includes automatically adding additional digital content (e.g. from external data sources 104) to provide a more cohesive digital gift presentation. For example, music or sounds are added to the U1 digital content and the U3 digital content so that the compiled digital content appears to be one digital gift. In another example, one or more of the same image effects (e.g. image filters, image borders, image sizing, image shapes, etc.) are added to photos to photos originating from U1 digital content and to photos from U3 digital content.

It will be appreciated that other types of post-processing can be applied to the U1 digital content and the U3 digital content when compiling the content together to form a digital gift.

The gift recipient U2 receives and view the digital gift 105 via their user device 102. The gift recipient U2 records and sends a response message. This response message is sent to the connect server system 103, and the connect server system transmits the response message to the user devices 101 and 106 belonging to the gift givers U1 and U3.

The embodiment shown in FIG. 2 is a many-to-one scenario.

Figure 3:
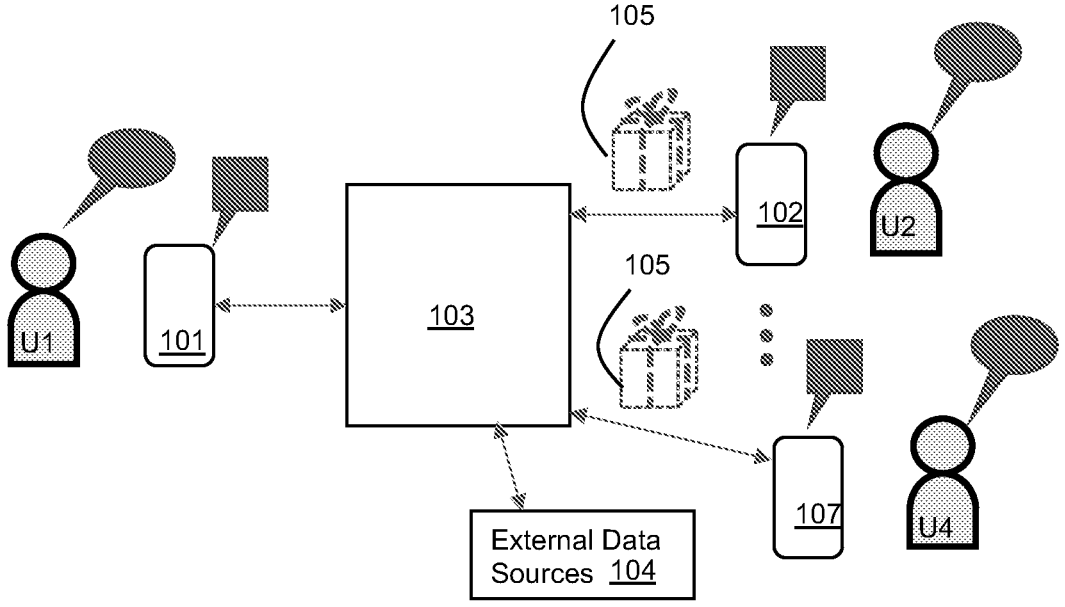
FIG. 3 is a schematic diagram similar to FIG. 1, but the gift giver sends the digital gift to multiple gift recipients.

FIG. 3 shows another example embodiment in which the gift giver U1 creates and transmits a digital gift to multiple gift recipients U2 and U4. In other words, the same digital gift 105 is sent to multiple user devices 102, 104 of the multiple gift recipients U2, U4. This is a one-to-many scenario.

In another example, not shown, multiple gift givers can use their respective user devices to contribute their respective digital content and generate one digital gift. This digital gift is then sent to multiple gift recipients. This is a many-to-many scenario.

Figure 4:
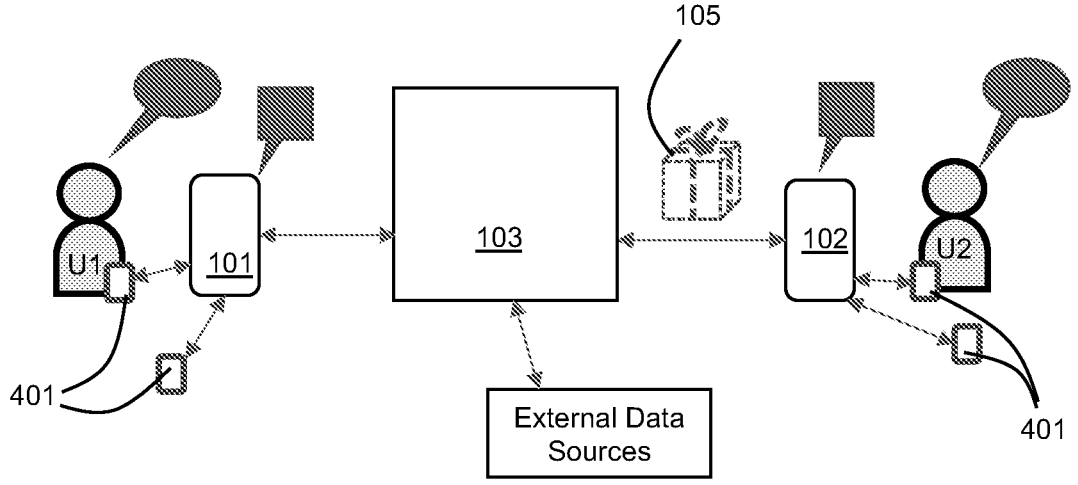
FIG. 4 is a schematic diagram for generating, sending and receiving digital gifts, including Internet-of-Things devices to provide contextual data or to provide another user interface, or both, according to an example embodiment.

FIG. 4 shows an example embodiment in which complimentary devices 401 (e.g. sensors and Internet-of-Things (IoT) devices) are in data communication with the user device 101, or the user device 102, or both. These complimentary devices 401 provide additional information that affect the generating process of the digital gift, or the receiving and playing process of the digital gift, or both. These complimentary devices 401, for example, could be on a body of the gift recipient or the gift giver, or both. Examples of these wearable devices include a smartwatch, a smart ear bud, a smart hearing aid, a smart headphone set, smart glasses, a heart monitor, a blood pressure monitor, an EKG or ECG monitor, a device embedded in the body, a device worn on the ankle, a wetness sensor in underwear, etc. These wearable devices, for example, obtain information about the user (e.g. U1, U2, etc.) via sensors. In another example aspect, these wearable devices can also provide information to the user via audio, or visual, or tactile systems.

In another example, the complimentary devices 401 are not worn on the body. For example, the complimentary devices are in the environment of the user. Examples include smart thermostats, camera devices, smart speakers, proximity sensors, motion detector sensors, chair sensors to detect a seated person, a bed sensor that is placed or part of the bed, a TV sensor, sensors on wheelchairs and other ambulatory devices, etc. It will be appreciated that different types of sensors and IoT devices can be used according to the principles described herein.

For example, based on the detected presence of a gift giver, or the detected state of the gift giver (e.g. moving near a user device 101, activity state, mood state, etc.), the user device 101 prompts the gift giver U1 to generate and send a digital gift.

In another example, based on the detected presence of a gift recipient, or the detected state of the gift recipient (e.g. moving near a user device 102, alone in the room, other people are in the room, activity state, health state, mood state, etc.), the user device 102 prompts the gift recipient U2 to play a digital gift that has been sent to them.

Below is an example voice interaction for creating a digital gift.

Example: Gift Create and Send

User Device, via voice interface, says: "Hello <Gift Giver Name>.

User Device, via voice interface, says: "Would you like to send a gift to"<Gift Recipient Name>?

Gift Giver says: "No"

User Device displays a standby image (e.g. a family photo, or other image)

Gift Giver says: "Yes"

User Device, via voice interface, says: "Please say a gift title, such as 'Happy Birthday, Harry!'"

Gift Giver says: "Happy Birthday Harry!"

User Device, via voice interface, says: "Please say a 10 second message"

Gift Giver says: "Hi Harry! Happy Birthday! I will swing by tomorrow at 5 PM to take you to your favorite Italian restaurant."

User Device automatically plays recording

After playing the recording, User Device, via voice interface, says: "Would you like to re-record the message?"

Gift Giver says: "Yes"

If yes, then User Device executes "Please say a 10 second message" script

Gift Giver says: "No", in response to "Would you like to re-record the message"

User Device: "Would you like to add a photo, video, song, or activity to your gift card"

Gift Giver says: "Photo"

User Device presents user with a photo library

Gift Giver selects a photo

User Device displays selected photo

User Device, via voice interface, says: "Would you like to change any gift content?"

If yes, then execute Please say a gift card title, such as "Happy Birthday, Harry!"

execute "Please say a 10 second message" script
execute present smartphone photo library display and select routine User Device, via voice interface, says: "Ready to send your gift?"
If no, then return user to family photo
If yes, then send message User Device, via voice interface, says: "Your gift is being sent!" and displays a dynamic progress icon of gift being sent User Device, via voice interface, says: "Your gift has been sent to <<Gift Recipient Name>> Thank you for creating the gift!"

User Device, via voice interface, says: "What would you like to do next?"
*microphone turned on
*this enables the user to say "exit" or "create gift" command
*if no response, then the User Device displays the standby image
Exit will take the control back to the login screen
"Create Gift" will prompt the user back to Gift creation In another example embodiment, a touch-based GUI includes buttons and text on a screen that facilitate the process for a gift giver to create a digital gift.

Below is an example voice interaction for receiving a digital gift.

Example: Receive Gift

User Device of Gift Recipient displays standby image (e.g. photo of family or some other image)
User Device, via voice interface, says: "Hello" <<Gift Recipient Name>>
If no gift received, then remain on standby image
If gift received, then User Device, via voice interface, says: "You have a gift from <Gift Giver Name>. Do you want me to play it?"
Gift Recipient says: "No"
If no, then User Device returns to displaying standby image
Gift Recipient says: "Yes"
If yes, then User Device plays digital gift
After User Device plays the digital gift, User Device, via voice interface, says: "Do you want me to play the gift again?"
Gift Recipient says: "No"
If no, then User Device, via voice interface, says: "Do you want to send a thank you message?"
Gift Recipient says: "No"
If no, then User Device returns to displaying standby image
Gift Recipient says: "Yes"
If yes, then User Device, via voice interface, says: "Please say a 10 second thank you message"
Gift Recipient says: "Thank you for the thoughtful gift! It is so nice to hear from you! I will be ready for you!"
User Device, via voice interface, says: "Do you want to re-record the thank you message?"
Gift Recipient says: "No"
if no, then User Device sends thank you message to Gift Giver and the User Device, via the voice interface, says: "Your thank you message to <Gift Giver Name> has been sent."
Gift Recipient says: "Yes"
if yes, then User Device, via voice interface, executes: "Please say a 10 second thank you message" script User Device sends thank you message and, via the voice interface, says: "Your thank you message to <Gift Giver Name> has been sent."
User Device displays standby image
User Device, via voice interface, says: "What would you like to do next?"
*microphone turned on
*this enables the user to say "exit" or "create gift" command
*if no response, then app displays the family photo
Exit will take the control back to the login screen
"Create Gift" will prompt the user back to Gift creation
Below is an example voice interaction for receiving a thank you message.

Example: Receive Thank You Message

User Device of Gift Giver displays standby image
User Device, via voice interface, says: "You have a thank you message. Would you like me to play the message?"
Gift Giver says: "No"
If No, then User Device displays standby image
Gift Giver says: "Yes"
if Yes, then User Device plays original digital gift that was created and then plays the thank you message from the Gift Recipient
User Device, via voice interface, says: "Do you want me to play the message again?"
Gift Giver says: "No"
If No, then User Device displays standby image
Gift Giver says: "Yes"
if Yes, then User Device plays original digital gift that was created, then plays the thank you message from the Gift Recipient, and then displays the standby image
User Device, via voice interface, says: "What would you like to do next?"
*microphone turned on
*this enables the user to say "exit" or "create gift" command
*if no response, then app displays the standby image
Exit will take the control back to a login screen
"Create Gift" will prompt the user back to Gift creation The above are example scripts. It will be appreciated that the script can change according to culture, language, colloquialisms, and functionality (e.g. incorporating different data, taking other actions, scheduling functions, adding conditions, adding other gift givers to a digital gift, adding other gift recipients to a digital gift, start and stop functions for playing the gift, etc.).

It will also be appreciated that voice commands can be replaced with text prompts, text inputs, and buttons on a GUI. In some examples, one or more of the processes for creating and sending a digital gift, viewing a digital gift, generating a thank you message (e.g. a response message), and viewing a thank you message include a combination of voice commands and touch controls (e.g. buttons, text inputs, etc.) on a GUI.

Figure 5:
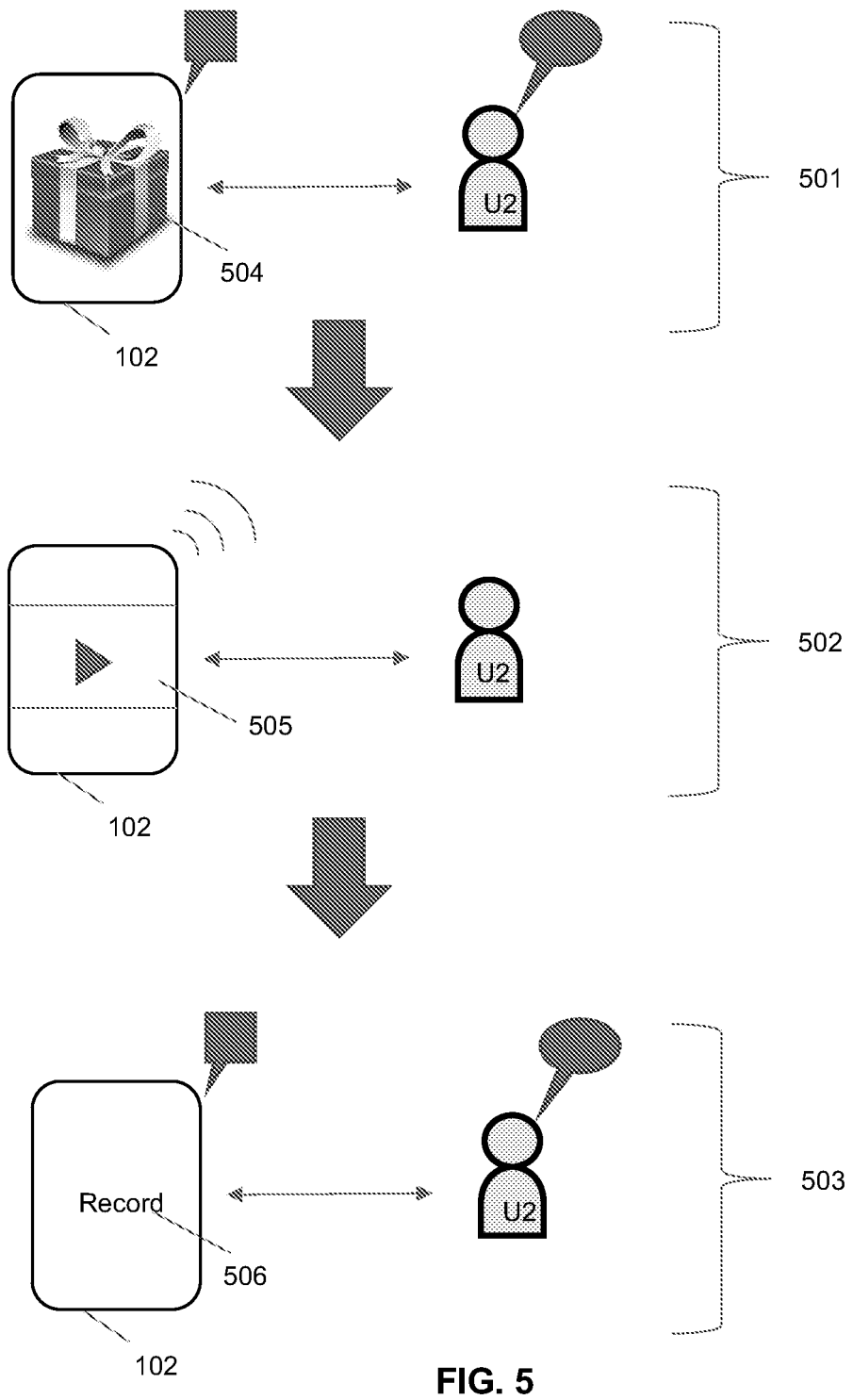
FIG. 5 is a schematic diagram showing the different stages of a gift recipient's user device receiving a digital gift, playing the digital gift and recording a response message, according to an example embodiment.

Turning to FIG. 5, an example embodiment is provided for different stages of voice interaction exchanges between a user device 102 and the gift recipient U2. At a first stage 501, the user device 102 displays or audio plays, or both, a digital gift wrapper 504. For example, the digital gift wrapper 504 is an image, animation, or a video of something familiar to the gift recipient, such as of a physically wrapped gift box with a ribbon. The images on the wrapping on the digital gift wrapper 504 can change to suit the context and purpose of the gift (e.g. Christmas trees and wreaths images for a Christmas related digital gift, balloons and cake images for a birthday related digital gift, hearts and rose images for a romantic related digital gift, etc.). In another example, the digital gift wrapper 504 is an image, animation, or video of a coffee cup. In another example, the digital gift wrapper 504 is an image, animation or video of a physical card in a physical envelope. In another example, the digital gift wrapper 504 is an image, animation or video of a person delivering or presenting a physical item (e.g. a package, a plate, a platter, an envelope, a thing, etc.); if the digital gift wrapper 504 is an animation or video, then the person is shown approaching from a distance and then coming closer to present the physical item. In another example, the digital gift wrapper 504 is an image, animation or video of a familiar person or a familiar thing, or both. In an example aspect, the digital gift wrapper is a representation of something that the gift recipient can easily understand and associate with a certain past experience or emotion, or both. In a further example aspect, the digital gift wrapper is a representation of something that the gift recipient would understand to be related or associated with a certain person (e.g. the gift giver) or a certain thing (e.g. the context, the purpose or the type of digital gift), or both.

The digital gift wrapper 504, either in alternative or in combination, can have audio content playing. For example, music, sounds, voices, etc. can be played in combination with or in alternative to the images, animations, or videos.

In another example embodiment, the digital gift wrapper 504, includes text. The text can be in alternative to the other types of data (e.g. images, animation, video, audio), or can be combined with the other types of data.

In an example embodiment, the digital gift wrapper includes a data link (e.g. URL) that is embedded or associated with one or more of the image, animation, video, audio content, or the text of the digital gift wrapper.

The digital gift wrapper 504 precedes the digital gift content and prepares the gift recipient U2 with understanding the context of the digital gift content. The digital gift wrapper 504 also provides suspense and engagement with the gift recipient U2.

In particular, after displaying or audio playing, or both, the digital gift wrapper 504, the user device 102 asks the gift recipient U2 if they wish to open or play the digital gift, and the user replies with an oral response to open or play the digital gift. Alternatively, the user device 102 does not need to ask the gift recipient and, instead, the user device 102 receives a command (e.g. an oral command, a visual command, a touch command, etc.) from the gift recipient U2 to open or play the digital gift.

In an example aspect, the digital gift wrapper 504 includes one or more conditions to access the digital gift. A condition is, for example, receiving confirmation from the gift recipient first to open or play the digital gift. Another condition is, for example, the gift recipient playing a game first or completing an action first. In another aspect, the user device 102 or the connect server system, or both, detect that one or more context conditions are satisfied prior to providing the gift recipient with access to the digital gift. For example, context conditions include: the state of the gift recipient, the time, the environment of the gift recipient, the state of one or more other people that are associated with the gift recipient, the state of one or more other devices that are associated with the gift recipient, etc.

At the second stage 502, the content 505 of the digital gift is played or displayed, or both, on the user device 102. During this stage, the user device 102 asks the gift recipient U2 if they wish to repeat playing the content of the digital gift, and will or will not repeat playing based on the response from the gift recipient.

At the third stage 503, the user device 102 prompts the gift recipient if they wish to send a response message (e.g. a thank you message). After detecting that the gift recipient wishes to send a response message, the user device 102 activates one or more recording devices (e.g. microphone or camera, or both) to record the response message. During the recording process, a symbol or other visual indication 506 is shown by the user device 102 to indicate that the recording is taking place. In another example aspect, the user device provides audio indication to the gift recipient that the recording is about to start, and after the recording has ended.

Figure 6A:
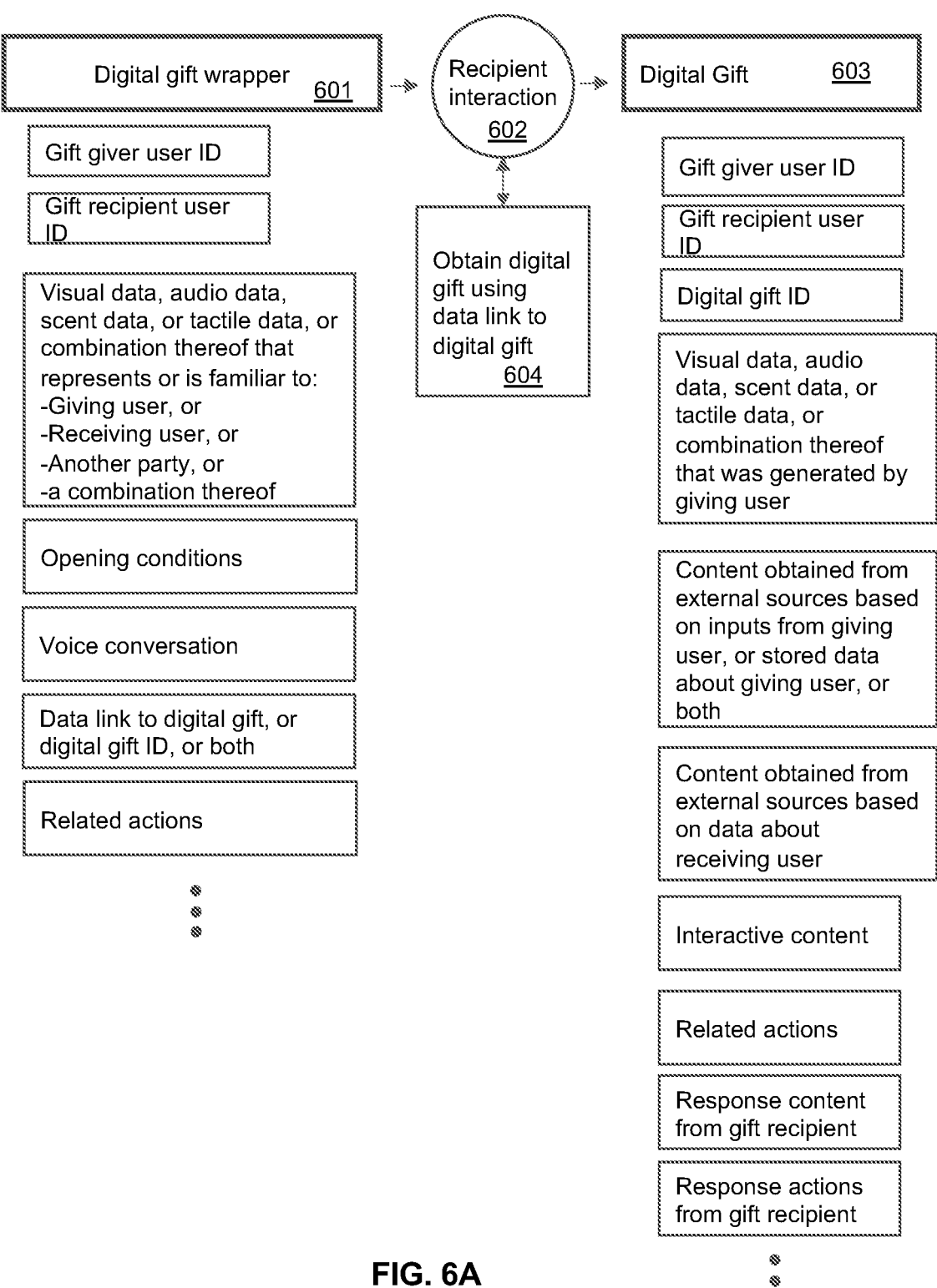
FIG. 6A is a schematic diagram showing example components of a digital gift wrapper and a digital gift pairing.

FIG. 6A shows additional components of a digital gift 603 and a digital gift wrapper 601. The digital gift wrapper 601 precedes the digital gift 603.

In an example embodiment, the digital gift wrapper 601 includes, or is associated with, one or more of the following: the gift giver user ID, the gift recipient user ID, content data for the digital gift wrapper, one or more opening conditions, voice voice conversation data, a data link to the digital gift or a digital gift ID (or both), and related actions.

The content data for the digital gift wrapper 601 includes visual data, audio data, scent data, or tactile data, or a combination thereof. The content data, for example, represents or is familiar to the gift giving user, the gift recipient user, another party, or a combination thereof. In an example embodiment, a library of digital gift wrappers is provided, which includes stock template digital gift wrappers, template digital gift wrappers that can be customized, and customized digital gift wrappers. The digital gift wrappers are suited for different occasions, themes, interests, hobbies, likes, locations, and cultures. In an example aspect, third party companies (e.g. Hallmark or brand companies) provide stock digital gift wrappers.

In an example aspect, the content data of the digital gift wrapper is familiar to both the gift giver and the gift recipient and is presented for selection to the gift giver, or automatically selected, based on the common attributes of the gift giver and the gift recipient (e.g. common interests, common hobbies, common likes, common occupations, common cultural aspects, etc.). In this way, when the gift recipient sees or hears the digital gift wrapper, the gift recipient understands that is a gift for them and may be able to deduce the identity of the gift giver from the digital gift wrapper. For example, the gift recipient Mary receives a digital gift wrapper of yellow rose flowers and knows that her friend Alice also enjoys yellow rose flowers; therefore, Mary may guess that the digital gift is from Alice.

In an example aspect, the connect server system assigns stock digital gift wrappers to a gift recipient or a gift giver, based on their personal profile (e.g. age, gender, interests, likes, culture, hobbies, occupation, past-occupation, etc.). For example, if the gift recipient is known to enjoy drink a certain brand of coffee, and the gift giver is known to be a bird-watching enthusiast, then the stock digital gift wrapper that is used includes: images, animation, or video of a coffee cup displaying the certain brand; or images, animation, video or sounds of birds; or a combination thereof.

In another example aspect, the connect server system generates customized digital gift wrappers for a gift recipient or a gift giver, using a digital gift wrapper template, based on their personal profile (e.g. age, gender, interests, likes, culture, hobbies, occupation, past-occupation, etc.). For example, a gift recipient is a male that is born in the 1940s, who likes motorcycles. The connect server system searches for images, animations, videos, or sounds (or a combination thereof) of motorcycles from the 1950s to 1970s from online external databases, and then incorporates the images, animations, videos or sounds (or a combination thereof) into a digital gift wrapper template, to produce a custom digital gift wrapper.

It will be appreciated that the personal profile information of the gift giver or the gift recipient, or both, are obtained using an intake survey. In alternative or in addition, the personal profile information is obtained from other data sources (e.g. social media profile, etc.).

Figure 7A:
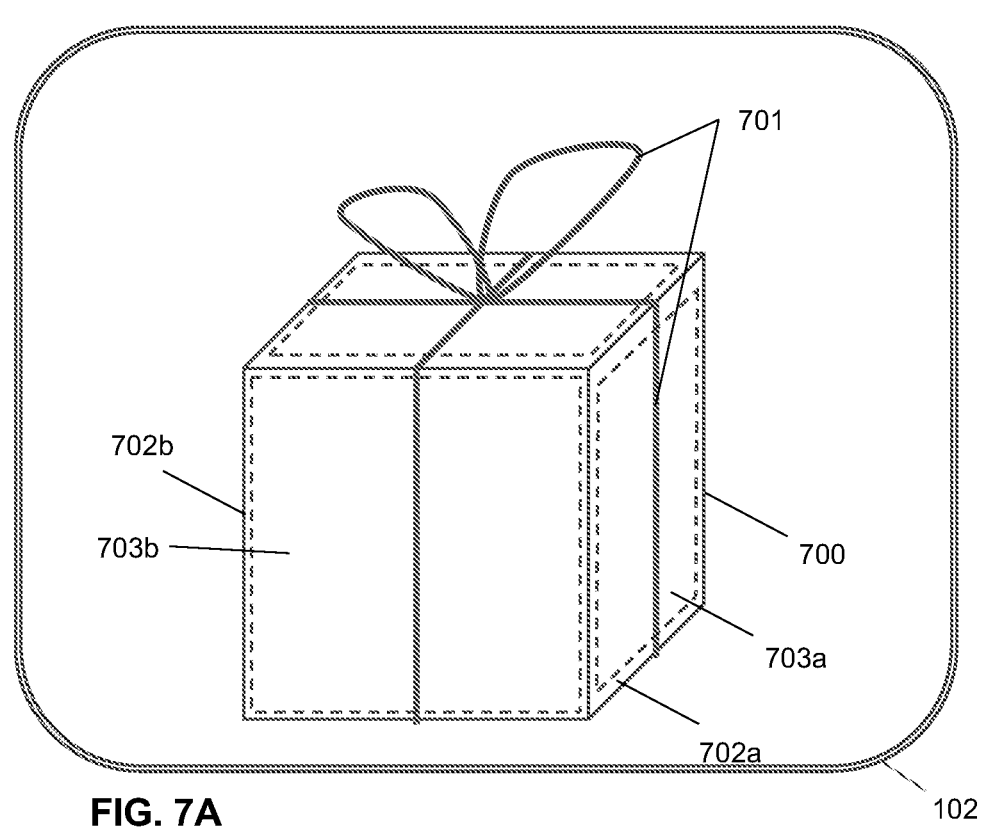
FIGS. 7A, 7B and 7C are examples of user interfaces that display a digital gift.
Figure 7B:
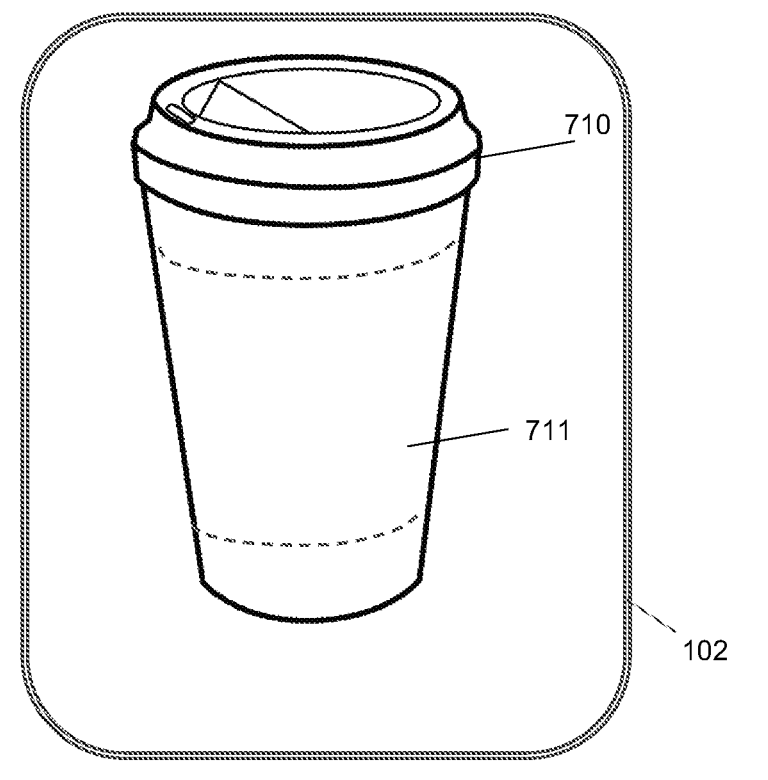

For example, the images, animations or videos could form the 3D surfaces of a gift box. In particular, turning to FIG. 7A, a 3D digital object 700 in the shape of a gift box has different 3D surfaces 702a, 702b that respectively include different windowed surfaces 703a, 703b to hold and display visual content. These windowed surfaces 703a, 703b are then populated with the images, animations or videos (or a combination thereof) of the motorcycles. Using image rendering, the image, animation or video is automatically sized, oriented, and skewed to fit within the windowed surface, thereby keeping the 3D object gift box look. A ribbon 701 overlays the windowed surfaces 703a, 703b and the image content that populates these windowed surfaces. A similar approach can be used with the template shown in FIG. 7B, which shows a digital 3D cup 710 and a windowed surface 711 that curves around the side of the digital 3D cup 710. In other words, one or more images, animations, videos, etc. can be used to populate to the windowed surface 711, and a curved distortion image effect is added to the images, animations or videos so that the visual content appears as if it is part of the 3D cup 710.

In another example, the digital gift wrapping template includes placing the motorcycle image, animation or video in the background and displaying a gift box in the foreground, and overlaying the image, animation or video.

Figure 7C:
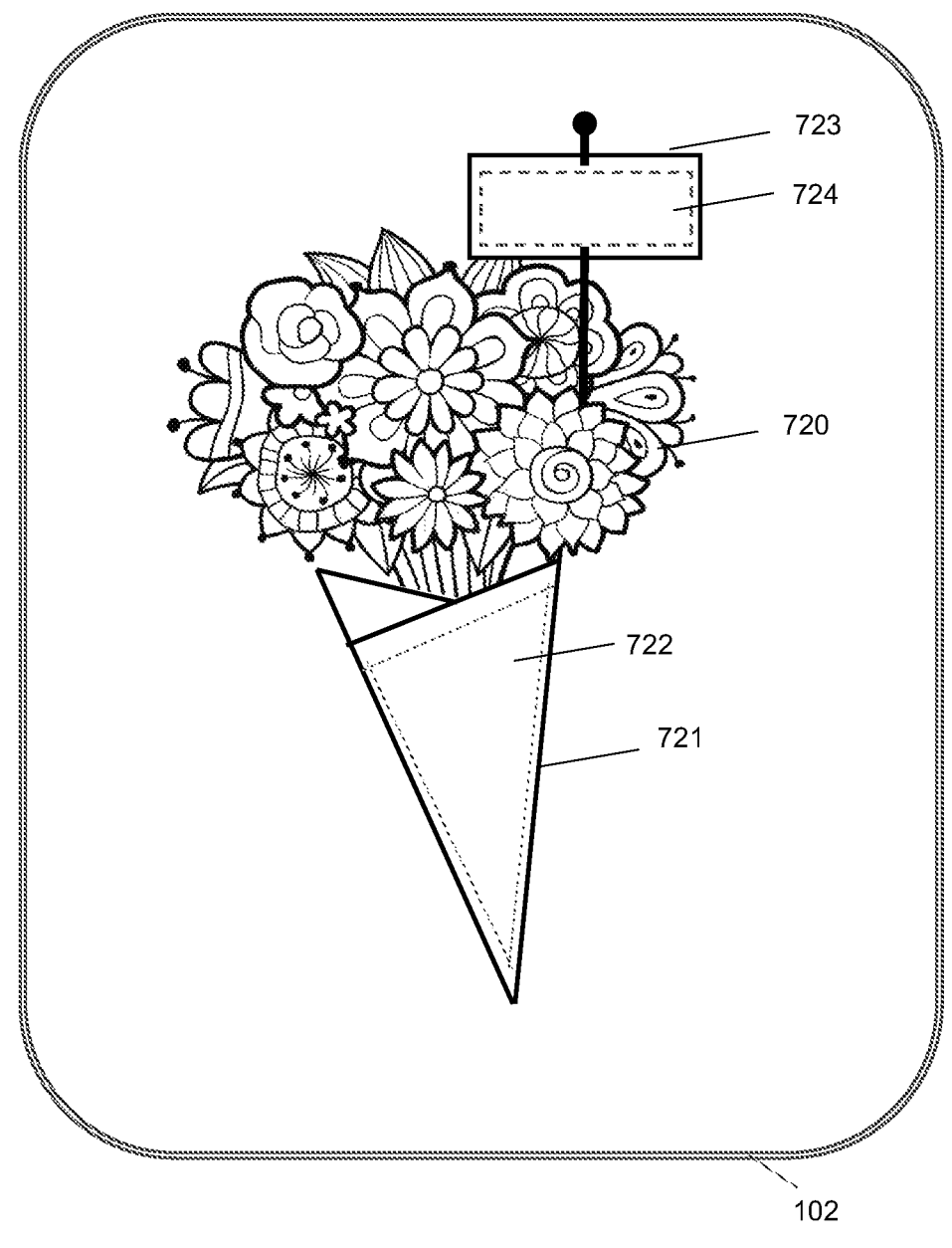

In another example aspect, the connect server system obtains photos or videos from the gift recipient or the gift giver, or both, and uses these to generate a digital gift wrapper. For example, a digital gift wrapper template is shown in FIG. 7C of an image of a bouquet of flowers 720. The paper wrapping 721 portion of the image 720 includes a windowing surface 721 that is populated with one or more photos that include both the gift giver and the gift recipient. The windowing surface 721 is a surface rendering of image content that is overlaid the image of the paper wrapping 721, so that it appears as if photos form the paper wrapping around the flowers. It will be appreciated that, using facial recognition, photos in a photo database can be tagged to identify the gift giver and the gift recipient, and that photos showing both the gift giver and the gift recipient can be searched and returned. The returned or found photos are then applied to the windowing surface 722. The image of the bouquet of flowers 720 also includes an image of a card 723, which has overlaid it a window surface 724 that can be populated by text or an image. For example, the text could include the words "Happy Birthday", or "I love you", or "Happy Mother's Day", or "Good luck!", or some other words or names selected or provided by the gift giver.

Turning back to FIG. 6A, examples of one or more opening conditions that are associated with or included in the digital gift wrapper 601 include simply detecting a selection input to play the digital gift (e.g. via a GUI interface or a voice interface). In another example, an opening condition includes a verification process of the gift recipient or their user device, or both (e.g. digital signature verification, biometric verification, password verification, facial recognition verification, voice recognition verification, thumbprint verification, etc.). Another example opening condition is detecting that the gift recipient is within a certain proximity, or is near, to the user device of the gift recipient. Another example opening condition is detecting that the current time and date satisfies certain values (e.g. a designated schedule time or time period for viewing the digital gift). Another example opening condition is detecting that the current location of the gift recipient's user device is within a certain location (e.g. certain geographical location, or certain local position within a building). Another example condition is that the gift recipient's biological state satisfies certain values, for example, in relation to heart rate, eye movement, blood pressure, body movement, etc. In another example, an opening condition requires that the gift recipient wave to open the digital gift, or smile to open the digital gift, or give a thumbs up to open the digital gift, or sign a song to open the digital gift, or some other action that is detectable by the camera, or microphone or other sensors of the user device, or sensors that are in communication with the user device. In another example, an opening condition requires that the gift recipient is alone in their immediate area of the user device in order to access the digital gift. For example, a camera and image recognition processes are used to detect if other people other than the gift recipient is within the immediate area of the user device. In another example, a microphone and voice recognition processes are used to detect if other people other than the gift recipient is in the immediate area of the user device.

The digital gift wrapper 601 also includes or is associated with a voice conversation library for engaging with the gift recipient. The voice conversation library includes questions, responses, prompts, and resulting actions. For example, the conversation script includes: "You have a gift from <Name of Gift Giver>. Do you want to play it now?"; or "Hello <Name of Gift Recipient>. Please wave at the screen to open the gift from <Gift Giver>."; or some other conversation.

In an example aspect, the content of the digital gift is not part of the digital gift wrapper. Instead, a data link to the digital gift, or a digital gift ID, or both, is associated with the digital gift wrapper. In an example aspect, this allows the digital gift wrapper to be transmitted and viewed quickly without having to load the content of the digital gift, which saves transmission and data loading time. In another example aspect, this keeps the contents of the digital gift protected until a verification process has been completed.

Related actions include, for example, processes for recording the gift recipient (e.g. via camera, microphone, biological signals, or a combination thereof) as they receive and interact with the digital gift wrapper. Related actions also include detecting the mood of the gift recipient before presenting the digital gift wrapper and then detecting the mood again after the presenting the digital gift wrapper. Another related action includes detecting the current time and location at which the digital gift wrapper is presented to the gift recipient.

Recipient interaction 602 with the digital gift wrapper 601 is detected. For example, if certain conditions are satisfied, then the user device of the gift recipient obtains the digital gift using the data to the digital gift or a digital gift ID, or both (block 604).

The digital gift 603 is then obtained and presented to the gift recipient. In an example embodiment, the digital gift 603 includes one or more of: a gift giver user ID, a gift recipient user ID, a digital gift ID, content data of the digital gift that was generated by the gift giver, content data of the digital gift that is obtained from one or more external data sources based on inputs from or data associated with the giving user, content data of the digital gift that is obtained from one or more external data sources based on data about the gift recipient, interactive digital content, and related actions.

The content data of the digital gift can be in the form of visual data, audio data, scent data, or tactile data, or a combination thereof. In an example aspect, the content data is included in the digital gift. In another example aspect, data links to content data is part of the digital gift, and the content data is pulled from one or more data sources via the data links. The data links, for example, include permissions and access information to application programming interfaces (APIs) to obtain photos, videos, music, digital games, digital points, data representing value or currency, etc.

Examples of interactive digital content include games (e.g. quizzes, puzzles, gambling, etc.), sing-along songs, move-along activities, and conversation content (e.g. questions and answers scripts).

An example of a related action in the digital gift 603 includes, for example, recording the gift recipient's reaction as they view, interact with, or listen to the digital gift. Another example of a related action includes detecting the mood of the gift recipient during and after they have viewed the digital gift.

A gift recipient can send a response message (e.g. a thank you message) to the gift giver. This response message can also be stored in association with the digital gift, or as part of the digital gift. In other words, the content of the response message (e.g. images, audio, video, text, etc.) becomes part of the digital gift 603. Similarly, the response message may include response actions, such as delivery of a physical gift or a digital game, etc., and these response actions can also form part of the digital gift. In this way, the content of the digital gift 603 increases as response messages are generated.

Figure 6B:
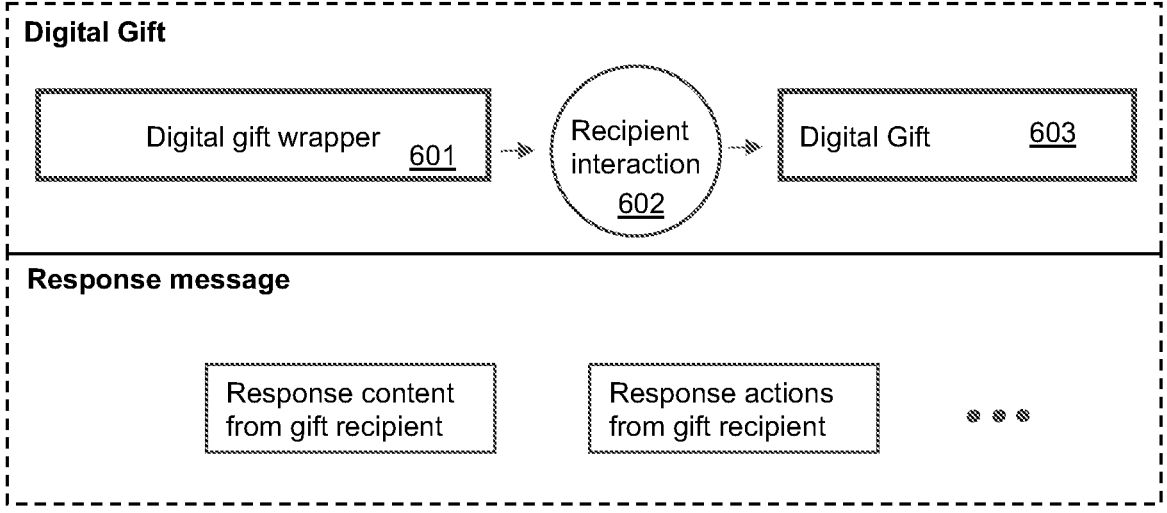
FIG. 6B is a schematic diagram showing an example embodiment of digital gift data and response message data that are linked together.

In an alternative example embodiment, as shown in FIG. 6B, the response message includes a response content or response actions, or both. The response message is stored in a separate digital data file from the initiating digital gift, and in association with the initiating digital gift (e.g. using a reference tag).

Figure 6C:
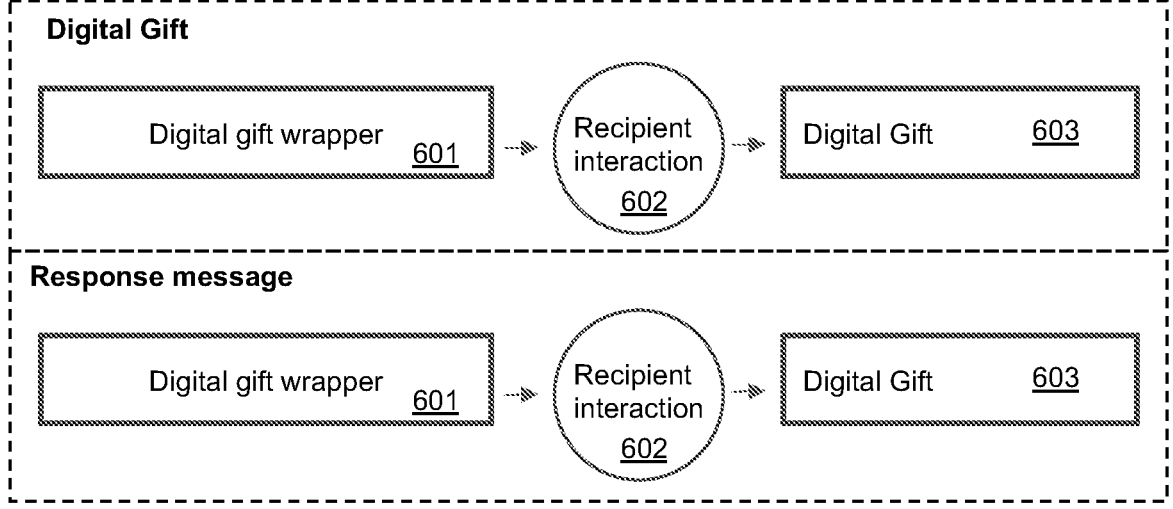
FIG. 6C is a schematic diagram showing an example embodiment of digital gift data and response message data, in a different data form that includes a digital gift wrapper and recipient interaction rules, that are linked together.

In another alternative example embodiment, as shown in FIG. 6C, the response message is in the form of a digital gift wrapper, recipient interaction and a digital gift. The response message is stored as a separate digital data file from the initiating digital gift, and in association with the initiating digital gift (e.g. using a reference tag).

Turning to FIG. 8, an example embodiment of a response message 801 and its components are provided. The response message 801 includes one or more of: a gift giver user ID, a gift recipient user ID, a digital gift ID, a response message ID, content data of the response that is generated by the gift recipient, content data of the response message that is obtained from one or more external data sources based on inputs from the gift recipient or based on data associated with the gift recipient, content data of the response message that is obtained from one or more external data sources based on data about the gift giver, reaction data recorded of the gift recipient viewing the digital gift wrapper or the digital gift or both, and data obtained in relation to the viewing or playing of the digital gift.

In an example aspect, the content data of response generated by the gift recipient includes one or more of: visual data, text data, audio data, scent data, or tactile data.

In an example aspect, the data obtained in relation to the viewing or playing of the digital gift includes one or more of: the time and date that the digital gift was opened or played, the location at which the digital gift was played, whether other people were in the room or immediate are when the digital gift was played or opened, and data about the gift recipient's interaction with the interactive content (e.g. a game or activity).

It will be appreciated that the response message 801 could be, in an example embodiment, text data that is sent via text, email, social media, or a messaging application, or a User Connect application that is dedicated to sending and receiving digital gifts.

Figure 9:
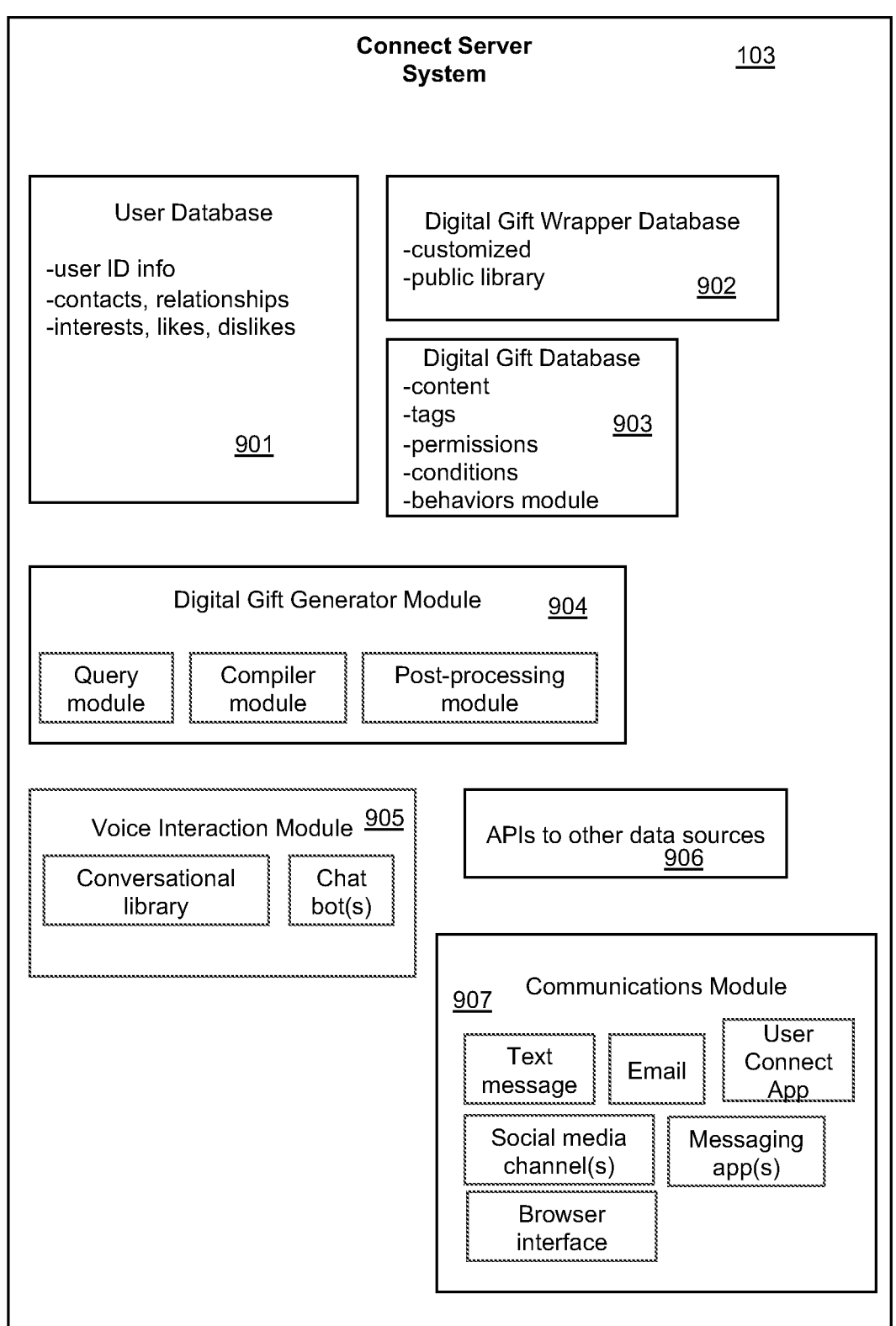
FIG. 9 is a schematic diagram showing of a connect server system according to an example embodiment.

Turning to FIG. 9, an example embodiment of a connect server system 103 is provided. The connect server system 103 includes processor systems, memory systems and communication systems. In an example embodiment, the connect server system 103 is a cloud server system.

The connect server system 103 includes, for example, a user database 901, a digital gift wrapper database 902, a digital gift database 903, a digital gift generator module 904, a voice interaction module 905, APIs to other data sources 906, and a communication module 907.

The user database 901 includes, for example, user IDs, contacts and relationships associated between users, and personal profile information associated with each user (e.g. name, gender, age, interests, likes, hobbies, occupation, past-occupation, location, culture, dislikes, etc.).

The digital gift wrapper database 902 includes a stock digital gift wrapper, templates of digital gift wrappers that can be customized, and the customized digital gift wrappers associated with specific users.

The digital gift database 903 includes content of digital gifts (e.g. audio content, visual content, tactile content, scent content or olfactory content, activity content, games content, etc.), tags associated with digital gifts, permissions, conditions for playing or presenting the digital gifts, and a behaviours module associated with the digital gifts. In an example aspect, each digital gift is associated with one or more gift givers and one or more gift recipients. In another example aspect, tags can be used to help sort, identify and search digital gifts. Examples of tags include: location, event (e.g. happy birthday, happy anniversary, thank you, Christmas, etc.), type of content, mood, etc. Examples of permissions include permission data that allows a user device playing the digital gift to access other data sources (e.g. external photo or video database, external music database, external activities database, external games database, external e-commerce database, etc.). In an example aspect, the behaviors module associates moods or behaviors, or both, with digital gifts. In another example aspect, the behaviors module records moods or behaviors, or both, before and after presentation of a digital gift. In another example aspect, the behaviours module executes behavioral data science computations to: generate a digital gift; modify an existing digital gift; provide suggestions to a gift giver to assist in making and sending a digital gift; determine when to send or present a digital gift; or a combination thereof.

In an example aspect, the digital gift generator module 904 helps to generate digital gifts, either automatically or semi-automatically based on the input of one or more gift givers. For example, the digital gift generator module 904 includes a query module to help search and obtain digital content for a digital gift. In another example aspect, the digital gift generator module 904 includes a compiler module to compile the digital content into a digital gift (e.g. using image processing, video processing, audio processing, speech-to-text processing, text-to-speech processing, etc.). In another example aspect, the digital gift generator module 904 includes a post-processing module to make additional changes (e.g. adding permissions, tags, conditions, and actions).

In another example aspect, the voice interaction module 905 includes a conversational library that includes scripts for interacting with a gift giver and a gift receiver for different scenarios. In another example aspect, the voice interaction module 905 includes one or more chat bots that have different voices, colloquialisms, languages, and speaking mannerisms. In an example embodiment, the voice interaction module 905 translates from one language to another language. In this way, a gift giver can give a voice message in a first language and the gift recipient will receive a translated voice message in a second language.

The communication module 907 transmits a digital gift using one or more different communication channels. Examples of communication channels include: a User Connect application (also called a User Connect app) that is dedicated to the digital gifts; text messaging channel; emailing channel; social media channel (e.g Facbeook, Instagram, etc.); and other messaging apps (e.g. WhatsApp, etc.).

For example, the communication module 907 sends a data link to a gift recipient via text, email, a social media app, or messaging app, or a combination thereof. The recipient opens the data link to view the digital gift on the web browser. The browser interface on the communication module plays the digital gift via the gift recipient's web browser. This helps a gift recipient view the digital gift even if they do not have a User Connect app.

In another example, in the situation where the gift recipient has a User Connect app on their device, the communication module 907 sends the digital gift directly to gift recipient's User Connect app.

Figure 10:
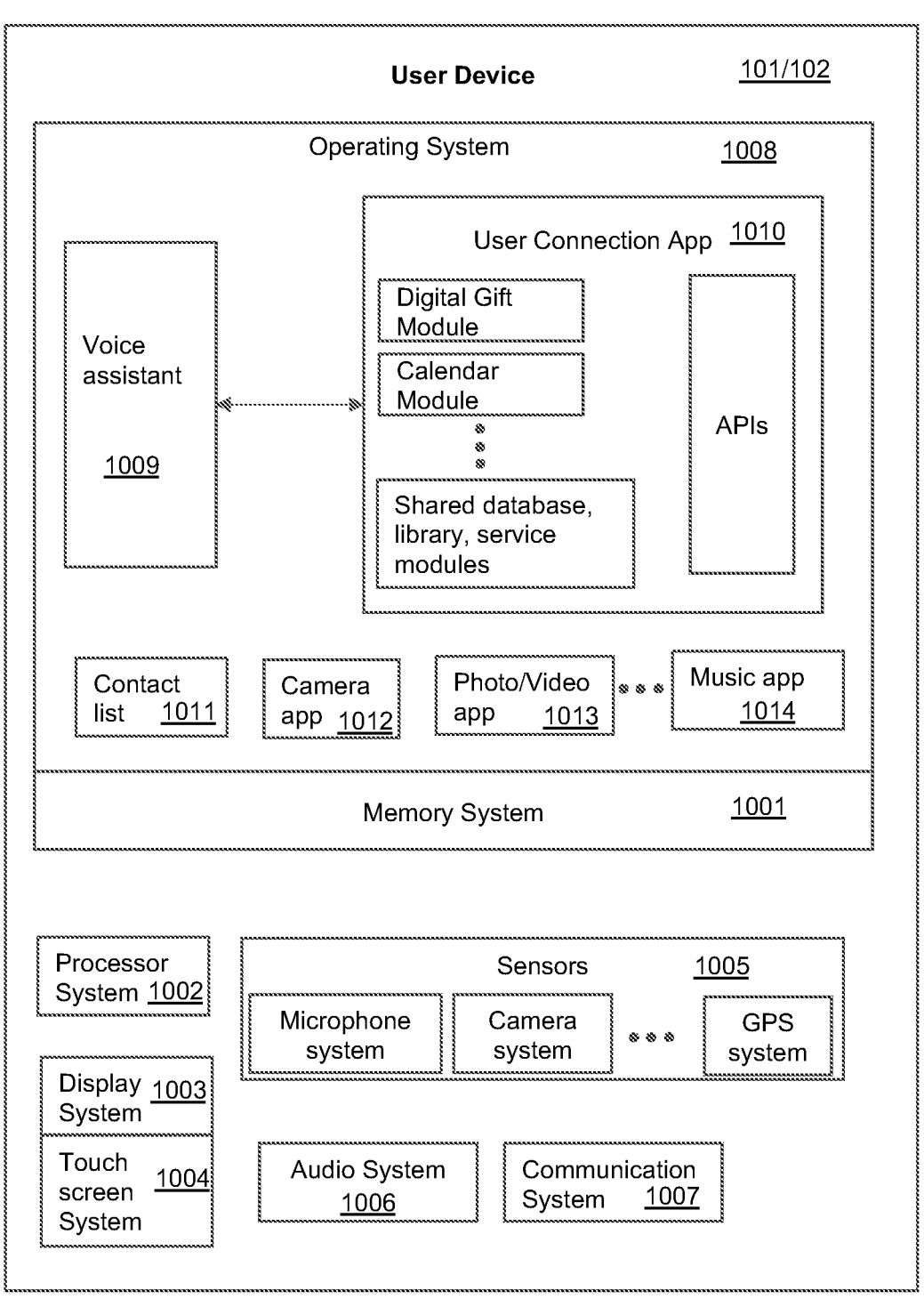
FIG. 10 is a schematic diagram showing an example user device.

Turning to FIG. 10, an example embodiment of a user device is shown, such as the user devices 101, 102 of the gift giver and the gift recipient. Examples of user devices include a mobile phone, a tablet, a laptop, a smart speaker, a voice-assistant device, a smart watch, a smart television, a display device (e.g. a display screen, a media projector, etc.) connected to a computer, a user device integrated within a car, and a desktop computer. The user device includes, for example, a memory system 1001, a processor system 1002, a display system 1993, a touch screen system 1004, sensors 1005, an audio system 1006 and a communication system 1007.

The memory system 1001 has stored thereon an operation system 1008 that includes software for a voice assistant 1009 and a user connection application 1010. The user connection application 1010 includes a digital gift module for generating and for receiving digital gifts, a calendar module for scheduling, and one or more other modules for other services and functions. The user connection application 1010 also includes databases and libraries from which it can retrieve data and commands. In addition to libraries related to data and commands, the libraries also include specific language libraries (e.g. Spanish, Mandarin Chinese, French, etc.). The user connection application 1010 also includes APIs to connect to other applications on the user device, such as a contact list 1011, a camera application 1012, a photo/video application 1013, and a music application 1014.

In an example embodiment, the voice assistant 1009 is native to the operating system. Examples of voice assistant technologies include those that are available under the trade names Siri, Alexa and Google Assistant. It will be appreciated that other currently-known and future-known voice assistant technologies can be used.

Examples of sensors 1005 include a microphone system for capturing audio, a camera system for capturing video and images, and a GPS system for capturing location. Other types of sensors can be included on the user device. In another example aspect, other sensors that are external to the user device, transmit sensor data to the user device via the communication system 1007

The audio system 1006 includes one or more audio speakers.

The communication system 1007 includes one or more communication devices so that the user device can transmit and receive data. For example, the communication system includes one or more of: a WiFi communication system, a Bluetooth communication system, a mobile cell network radio system, a wired Internet connection system, etc.

In some embodiments, the user device does not have one or more the above components. For example, a user device that is a smart speaker does not have a display system and a touch screen system. In another example, a user device that is a smart television does not have a GPS system.

Figure 11A:
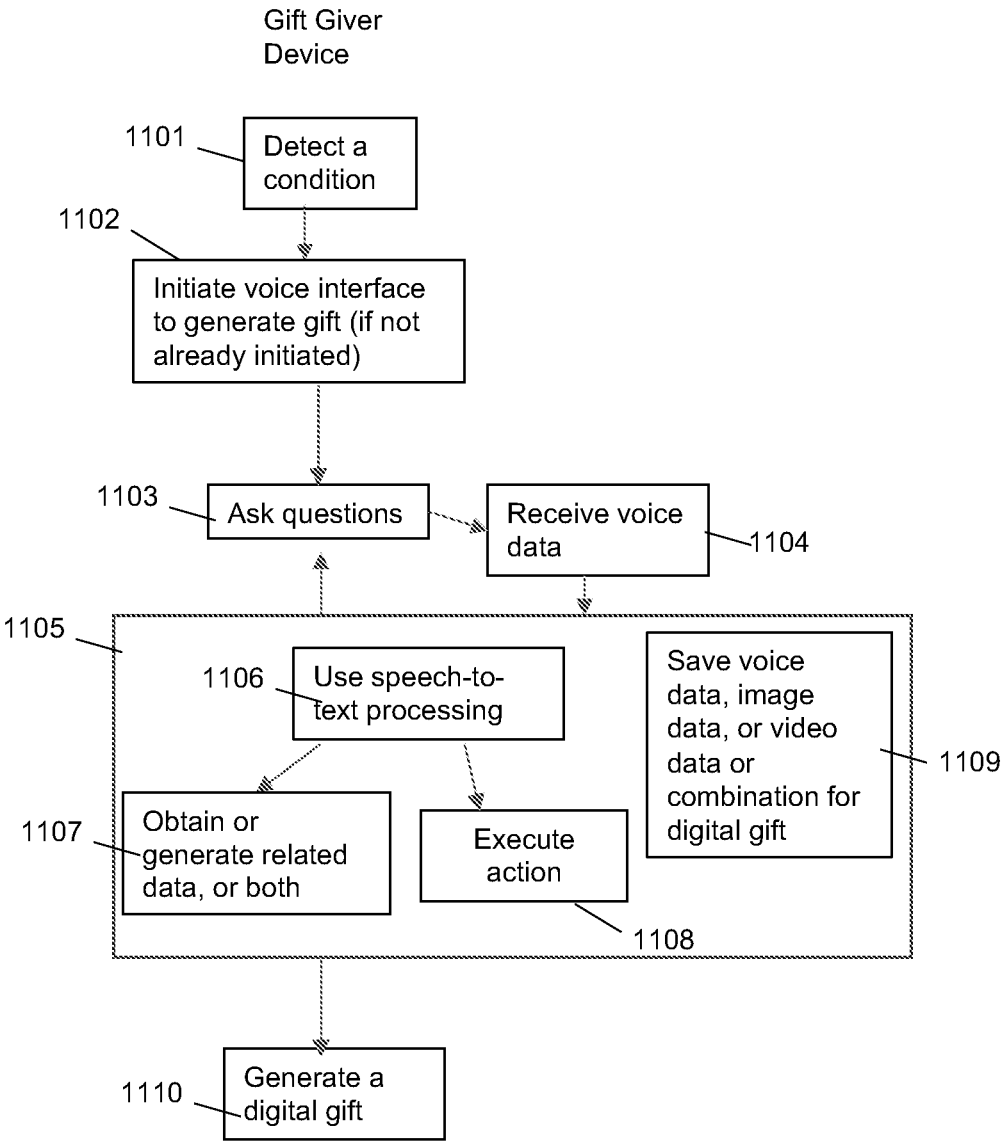
FIG. 11A is a flow diagram of example executable instructions for generating a digital gift using voice dialogue.

Turning to FIG. 11A, an example of executable instructions is provided for generating a gift. At block 1101, a user device of a gift giver detects a certain condition. For example, the user device detects a condition that includes a user input on a touch screen (e.g. to open the user connection application 1010, to initiate a giving a gift, etc.). In another example, the condition includes the user device detecting motion (e.g. movement of the gift giver). In another example, the condition includes detecting sound (e.g. the gift giver makes a sound, or a gift giver speaks). In another example, the condition includes detecting a time condition (e.g. the current time, the time passed since the last digital gift was given, a pre-scheduled time, etc.). In another example, the condition includes detecting an upcoming event related to a potential gift recipient that is a contact of the gift giver (e.g. a birthday event, a holiday, etc.). In another example, the condition includes detecting a recent action (e.g. the gift giver recently was accessing and viewing photos of a potential gift recipient, the gift giver recently called a potential gift recipient, the gift giver recently wrote an electronic message to a potential gift recipient, the gift giver recently said a name of a potential gift recipient, the gift giver recently completed some online action, the gift giver recently completed an action that relates to a potential gift recipient, etc.). In another example, the condition includes detecting a mood or a behavior of the gift giver (e.g. the gift giver's mood is happy or restless or some other mood). In another example, the condition includes detecting that the user device of the gift giver is within a certain location (e.g. near a certain landmark, near a certain business, has changed location from a first location to a second given location, near a certain address, etc.). It will be appreciated that other conditions can be used to initiate the voice interface.

At block 1102, after detecting a certain condition, the user device initiates a voice interface to generate a digital gift. In an example embodiment, the voice interface of the user device is already initiated.

At block 1103, the user device, via the voice interface, asks one or more questions to the gift giver, and the user device at block 1104 receives voice data from the gift recipient. At block 1105, the user device or the connect server system 103, or both, process the received voice data to ask more questions (e.g. continue to block 1103) or to generate a digital gift (block 1110), or return to a ready state (e.g. show a standby image, standby animation, or standby video).

The processing at block 1105 includes, for example, using speech-to-text processing (block 1106) to process the voice data. In an example aspect, the text data is used to initiate obtaining or generating related data, or both (block 1107). For example, the text data is used to: initiate a camera to record an image or a video, initiate an audio recording session, initiate a photo app to obtain image data, initiate a music app to select a song. In another example aspect, the text data is used to execute an action (block 1108). Examples of actions include: sending the digital gift, sending a message to other gift givers to contribute digital content to the digital gift, specifying conditions associated with the digital gift, adding a digital game or activity in the digital gift, initiating an e-commerce session, etc. If additional information is required from the gift giver, the user device asks more question (block 1103). The processing at block 1105 also includes saving voice data, image data, or video data, or a combination thereof, to include in the digital gift.

In an example aspect, in the process of generating a digital gift, the user device presents a photo application that displays a library of photos or videos (or both) to add to the digital gift. For example, the photo application displays a recommended set of images that are associated with one or more sentiment tags; wherein the one or more sentiment tags comprise at least one of happy, calm, peaceful, laughing, hug, comfort, and love. In another example, either in addition or in alternative, the photo application displays a recommended set of images that include a face of the gift recipient and a face of a user (e.g. the gift giver) of the user device. In an example aspect, the tagging of the images based on the faces of the gift recipient and gift giver is done using facial recognition computations.

At block 1110, the user device or the connect server system 103, or both, generate the digital gift. This process also includes, for example, generating a digital gift wrapper based on the information provided in blocks 1103, 1104, 1105.

In the process of receiving the digital gift, the user device of the gift recipient receives, via the communication system, a digital gift wrapper from a gift giver. The digital gift wrapper, for example, includes visual content. The user device displays the digital gift wrapper on the display screen. The user device initiates a voice interface that comprises activating the audio speaker and the microphone. The user device then asks a first set of one or more questions via the audio speaker of the user device and respectively records a first set of one or more answers via the microphone. The first set of the one or more questions and the first set of the one or more answers used to at least confirm playing the digital gift. After receiving a positive confirmation from the gift recipient, the user device plays the digital gift, wherein the digital gift comprises at least one of an audio gift content and visual gift content. After playing the digital gift, the user device asks a second set of one or more questions via the audio speaker and respectively records a second set of one or more answers via the microphone. The second set of the one or more questions and the second set of the one or more answers are used to at least initiate an option to provide a response message to the gift giver, record the response message using at least the microphone, and confirm transmission of the response message. The user device then initiates transmission of the response message to the gift giver via the user device's communication system.

Figure 11B:
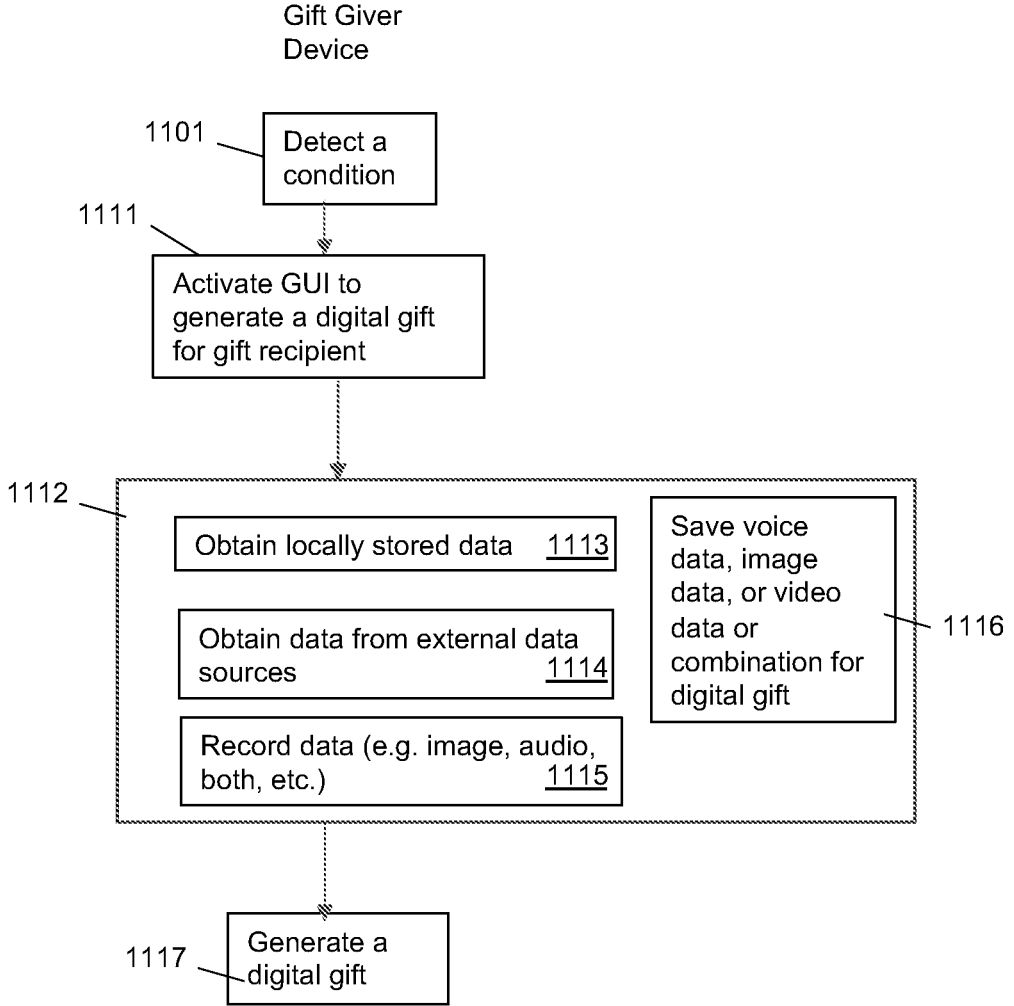
FIG. 11B is a flow diagram of example executable instructions for generating a digital gift using a touch graphical user interface (GUI).

Turning to FIG. 11B, another example of executable instructions is provided for generating a digital gift on a gift giver's user device. At block 1101, the device detects a condition (e.g. a touch input that opens a User Connect app).

At block 1111, a GUI is activated to generate a digital gift for a gift recipient. At block 112, data obtained to create the digital gift. For example, using the GUI, a gift giver selects locally stored data (e.g. photos, videos, audio, etc.) (block 1113). In another example, the gift giver uses the GUI to select data from external data sources (e.g. photos, videos, audio, etc.) (block 1114). In another example, the gift giver initiates recording of data (e.g. image, video, audio, etc.) (block 1115). The data links or the data itself is saved for the digital gift (block 1116). At block 11117, the gift giver's device generates the digital gift. In other words, a digital gift can be generated without using a voice interface.

Figure 11C:
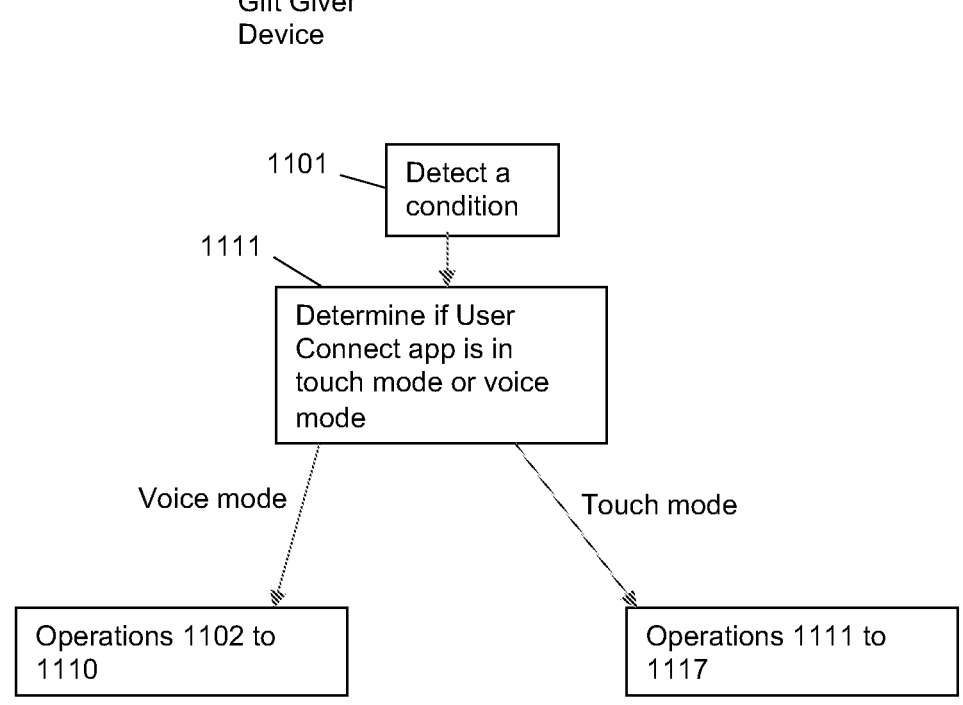
FIG. 11C is a flow diagram of example executable instructions for selecting a voice dialogue process or a touch GUI process for generating a digital gift.

Turning to FIG. 11C, in an example embodiment, upon activating the User Connect app at block 1101, the User Connect app determines if a touch mode is activated or if a voice mode is activated (block 1111). If the voice mode is activated, then the operations at block 1102 to 1110 are executed. If the touch mode is activated, then the operations at block 1111 to 1117 are executed. In an example aspect, the user can select between the touch mode or the voice mode.

Turning to FIG. 12, example executable instructions are provided for receiving a digital gift.

At block 1201, the user device of the gift recipient or the connect server system detects a condition to initiate a voice interface (block 1202), which is used to initiate presenting a digital gift wrapper or the digital gift (or presents both in sequence) (block 1203). For example, the voice interface is activated to speak to the gift recipient and advise the gift recipient that they have received a digital gift (e.g. the digital gift wrapper is presented at this stage). The user device then asks the gift recipient if they wish to play the digital gift now. If not, then the standby image is shown. If so, then the user device plays the digital gift.

In another example, after detecting a condition is satisfied (block 1201), then the user device presents the digital gift wrapper presents the digital gift (or automatically presents both in sequence) (block 1203). In other words, the voice interface is not initiated, or has already been initiated when presenting the digital gift wrapper or the digital gift, or automatically presents both in sequence.

An example embodiment of a condition (as per block 1201), includes the user device of the gift recipient or the connect server system, or both, detecting one or more of: a certain time; a certain location of the gift recipient or the gift recipient's user device; a certain mood of the gift recipient; motion of the gift recipient; a face of the gift recipient; someone speaking; a voice of the gift recipient; user input on a touch screen; a certain word or a certain phrase spoken by the gift recipient; an upcoming event in relation to the gift recipient; a group state in which other people physically are around the gift recipient; an alone state in which the gift recipient is physically alone; an action of the gift recipient; eye motion of the gift recipient; a certain health state of the gift recipient; and a certain biometric signal of the gift recipient. It will be appreciated that other conditions can be used to initiate blocks 1202 or 1203. In an example embodiment, one or more conditions are set by the gift giver or the gift recipient or a third party, or a combination thereof.

After the presentation of the digital gift, the user device initiates a conversation as per blocks 1204, 1205, 1206. At block 1204, the user device asks a question or gives a prompt. At block 1205, the gift recipient orally responds and the user device receives voice data from the gift recipient. At block 1206, the voice data is processed by the user device or the connect server system, or both.

In an example aspect, the processing at block 1206 includes executing a speech-to-text processing of the voice data to obtain text (block 1207). In an example aspect, the obtained text is used to obtain data or generate data, or both, for a response message (block 1208). In another example aspect, the obtained text is used to execute an action (block 1209), such as confirm sending the response message. In another example aspect, the processing at block 1206 includes saving voice data, image data, or video data, or a combination thereof, that has been generated by the gift recipient; this data is used to form part of the response message.

At block 1211, the user device or the connect server system generates the response message. The response message is associated with or includes, for example, the gift recipient ID, the gift giver ID, the digital gift ID, and the response message content. In an example aspect, the response message also includes reaction data of the gift recipient while listening or seeing the digital gift (e.g. an audio recording, an image, a video recording, mood data, health data, heart rate, facial expression data, etc.). In an example aspect, the response message also includes viewing data of the digital gift, such as the time of viewing, the location of viewing, whether the gift recipient viewed the digital gift alone or with other people, etc.

Figure 13:
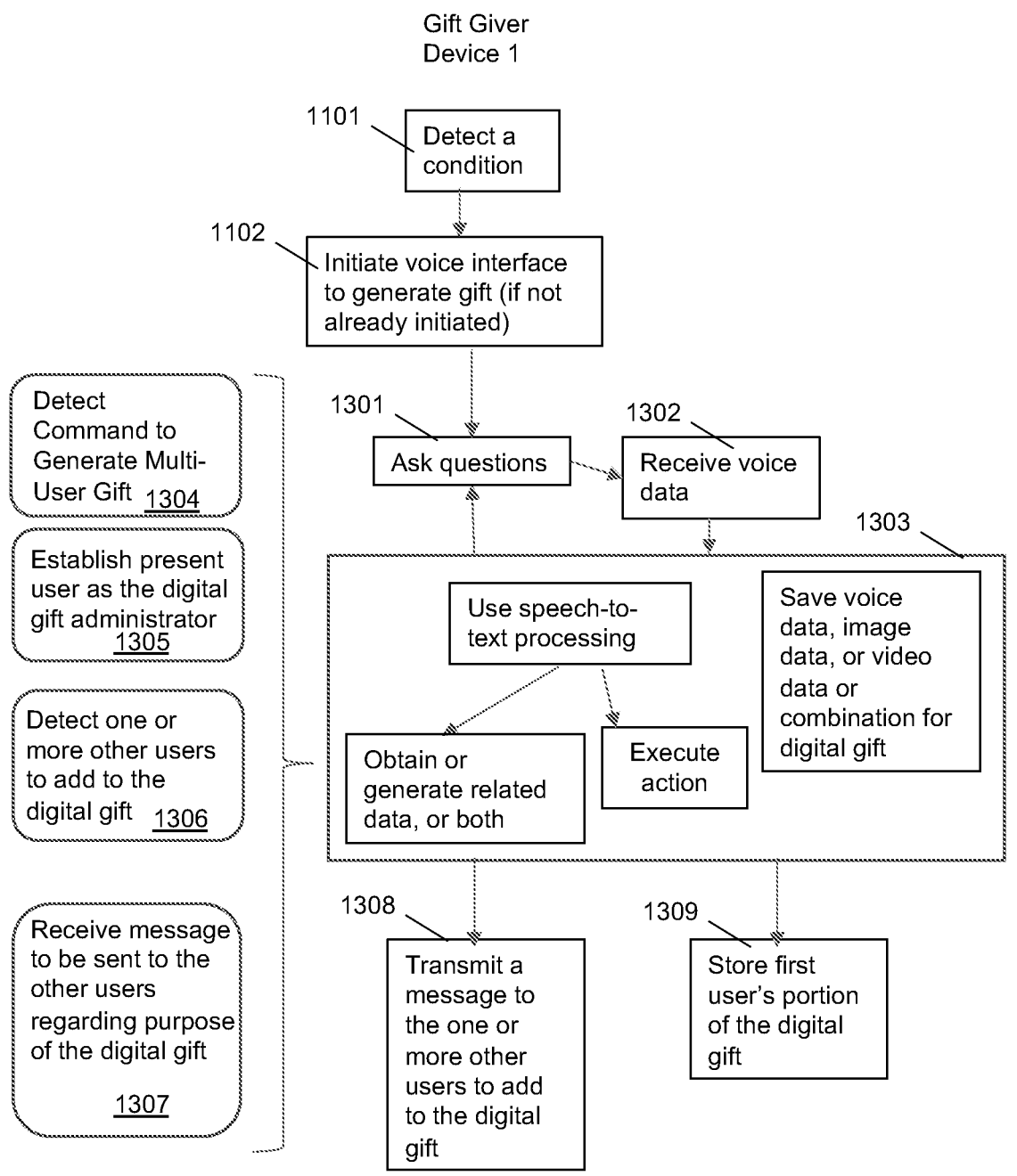
FIG. 13 is a flow diagram of example executable instructions for a first gift giver initiating a digital gift that is generated by multiple gift givers.

Turning to FIG. 13, example executable instructions are provided for a gift giver to initiate a digital gift that includes content that has been contributed by multiple gift givers. FIG. 14 shows example executable instructions for another gift giver being prompted to contribute content for a digital gift.

In FIG. 13, the process of blocks 1101, 1102 are used to initiate a conversation between the gift giver's user device and the gift giver. The conversation includes the blocks 1301, 1302 and 1303, which includes the user device asking questions, receiving voice data, and processing the voice data. In an example embodiment, the questions include asking the gift giver if they wish to have other contribute to the digital gift. The processing includes, for example, detecting a command or confirmation to generate a multi-user gift (block 1304), establishing the current gift giver as the digital gift administrator (block 1305), detecting one or more other users (e.g. as selected by the current gift giver) to contribute content to the digital gift (block 1306), and receiving a message to be sent to the other users regarding the purpose of the digital gift (block 1307). For example, the current gift giver specifies two other users to contribute digital gift content and sends a message to these other users: "Mom's anniversary is coming up! Let's all send her a gift message!".

At block 1308, the user device initiates transmission of the message to the one or more other user to contribute content to the digital gift. At block 1309, the current gift giver's content portion is stored by the connect server system.

Turning to FIG. 14, and further to block 1308, another user, via their user device, receives a message from the digital gift administrator (block 1401). This user becomes one of the multiple contributing gift givers. The voice interface of the user device is initiated (block 1402), if it is not already initiated. At blocks 1403, 1404, 1405, a conversation takes place between the user device and the subject gift giver, by the user device asking a question, receiving an oral response from the subject gift giver, and processing the oral response. The conversation includes, for example, the user device presenting the purpose of the digital gift (e.g. who is the gift recipient, what is the occasion, etc.). The conversation also includes, for example, the user device presenting one or more other portions of the digital gift (e.g.

the content contributed by the digital gift administrator). The subject user can, for example, user their user device to record an audio message, a video message, or append a photo as their contribution to the digital gift. At block 1406, the user device initiates transmission of a message to another user to add digital content to the digital gift, if there are other users specified by the digital gift administrator and that have not yet been contacted. At block 1407, the subject user's portion of the digital gift is stored by the connect server system.

In another example embodiment, different gift givers can generate a combined digital gift using a GUI (e.g. touch-based or pointer based), instead of using a voice interface. In another example embodiment, some gift givers can use a voice interface, and another set of gift givers can user a touch-based or pointer-based GUI to collectively create one digital gift.

Figure 15:
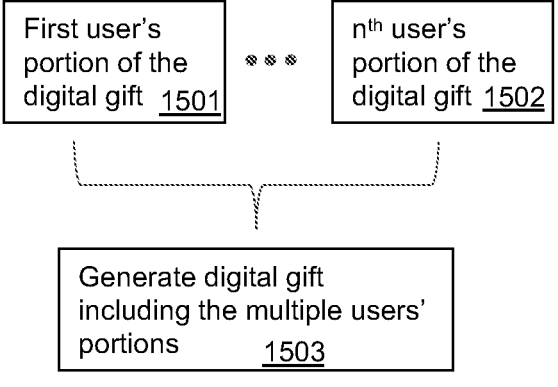
FIG. 15 is a schematic diagram showing the generation of a digital gift based on multiple portions from different gift givers.

Turning to FIG. 15, after the multiple users have added their content portions (1501, 1502), the connect server system compiles the content portions to generate one digital gift (1503).

Figure 16:
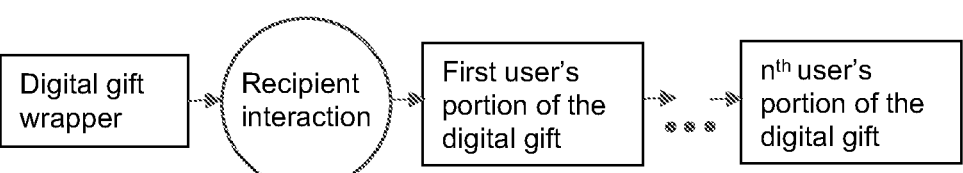
FIG. 16 is a schematic diagram showing an example sequence of playing components of a digital gift, including a digital gift wrapper, detecting recipient interaction, and playing different portions of a digital gift from different gift givers.

Turning to FIG. 16, an example sequence of outputting components of a multi-user digital gift is shown. It includes presenting a digital gift wrapper to a gift recipient, receiving appropriate recipient interaction to initiate presenting the digital gift, and then play a sequence of the different content portions of the digital gift from the multiple users (e.g. first user, . . . , n$^{th}$ user). It will be appreciated that there are different ways that the different portions can be combined to generate a single digital gift. In an example embodiment, the sequence is based on first-in-first-out, so that the first gift giver's gift is played back first and the last gift giver's gift is played last. In another example embodiment, the sequence is based on last-in-first-out, so that last user to contribute has their digital gift portion played back first to the gift recipient and the first user to contribute has their digital gift portion played back last to the gift recipient. In another example embodiment, the sequence of the digital gift portions is random. In another example embodiment, the sequence is based on the type of gifts sent (e.g. voice based gifts, picture gifts, video gifts, music gifts, physical gifts, etc.).

Turning to FIG. 17A, an example process is provided in which the connect server system detects or obtains current behavior data or mood data, or both, about a potential gift recipient (block 1701). Behavior data or mood data can be obtained, for example, using audio data, visual data, health data (e.g. heart rate, temperature, etc.), or by observations from other people, or a combination thereof. At block 1702, the connect server system generates and sends a message to one or more contacts of the potential gift recipient. The message includes the potential gift recipient's mood or behavior, or both and a suggestion to send a digital gift to the potential gift recipient. For example, the suggestion includes photos, videos, animations, music, etc. to send to the potential gift recipient. For example, if the potential gift recipient is detected to be bored or restless, then the suggested content for the digital gift is entertaining. In another example, if the potential gift recipient is detected to be sad, then the suggested content for the digital gift addresses the sadness or is suggested content that redirects towards happiness, or both.

The contact receives the message and suggestion from the connect server system. At block 1703, the contact then generates a digital gift for the potential gift recipient and sends the digital gift.

In an alternative example embodiment in FIG. 17B, after block 1701, the connect server system generates a digital gift content based on one or more of: current behavior or mood, personal profile (e.g. age, location, interests, hobbies, etc.), previous digital gifts, personal content, public content, etc. (block 1704). The connect server system then sends the digital gift to the user (e.g. the gift recipient) (block 1705). In other words, the connect server system autonomously generates and sends a digital gift based on the user's mood or behavior, without the initiation of a gift giver person.

Turning to FIG. 18A, an example of executable instructions is provided for the connect server system to generate a suggestion message for a contact of a potential gift recipient.

At block 1801, the connect server system detects a current or upcoming special date or time for a potential gift recipient (e.g. a holiday, a birthday, an anniversary, etc.). In another example aspect, a predicted mood of the gift recipient is associated with the current or upcoming date. For example, if the date is their birthday, then the predicted mood is happy. For example, if the date is a wedding anniversary and their spouse has died, then the predicted mood includes sadness.

At block 1802, the connect server system generates and sends a message to one or more contacts of the potential gift recipient regarding the date, with a suggestion to send a digital gift. The message includes, for example, suggested content for the digital gift based on one or more of: the attributes of the date or event, the attributes of the potential gift recipient, and the attributes of the contact that will give the digital gift.

The contact receives the message from the connect server system. At block 1803, the contact uses their user device to generate and send a digital gift to the gift recipient based on the message and suggested information. In an example aspect, the digital gift is prepared prior to the date and then is scheduled to be automatically sent on the date.

In an alternative example embodiment in FIG. 18B, after block 1801, the connect server system generates a digital gift content based on one or more of: the special date or time, personal profile (e.g. age, location, interests, hobbies, etc.), previous digital gifts, personal content, public content, etc. (block 1804). The connect server system then sends the digital gift to the user (e.g. the gift recipient) (block 1805). In other words, the connect server system autonomously generates and sends a digital gift based on a current or upcoming date or time, without the initiation of a gift giver person.

Figure 19:
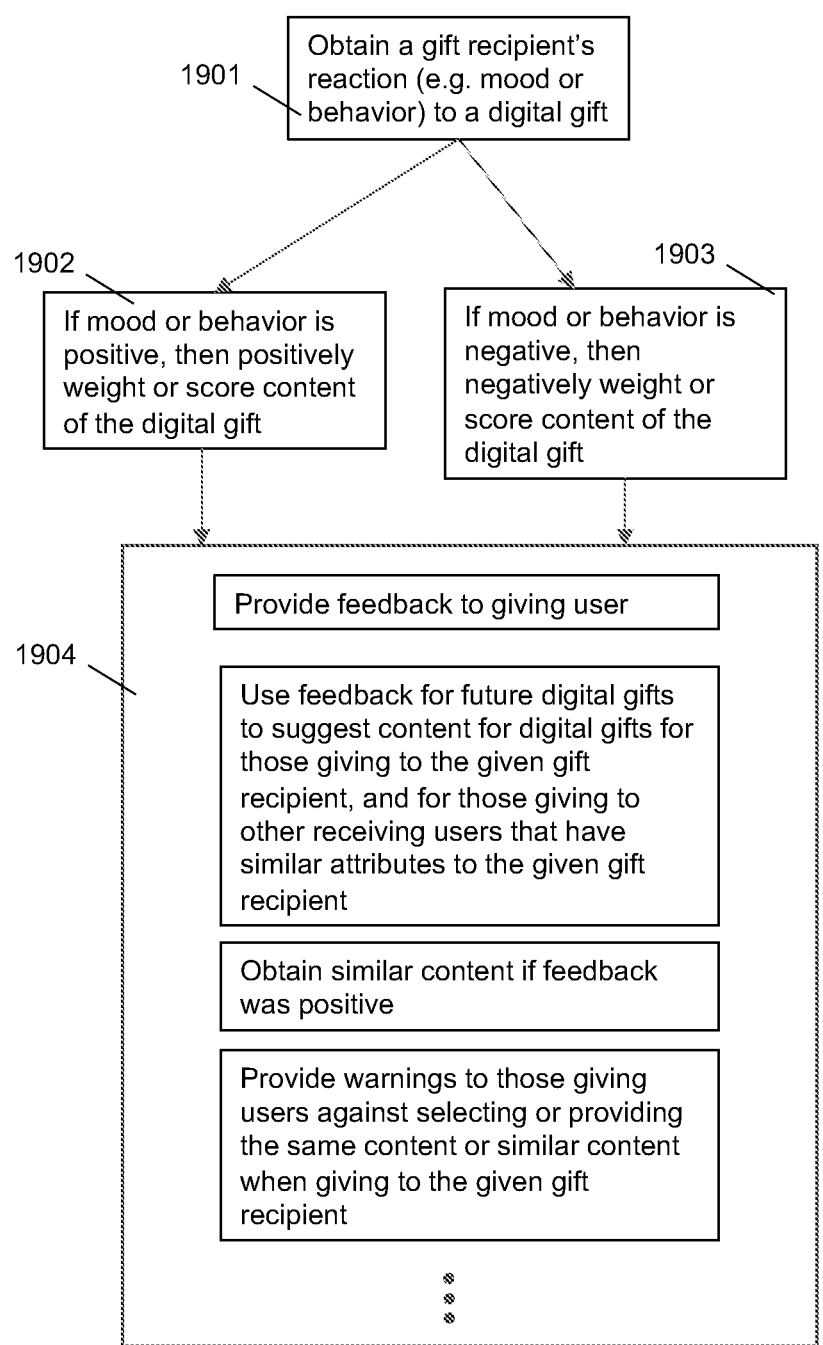
FIG. 19 is a flow diagram of executable instructions for providing feedback based on a gift recipient's reaction to a digital gift.

Turning to FIG. 19, example executable instructions are provided for using the reaction data of a gift recipient as feedback in a digital gift generating process.

At block 1901, the user device obtains a gift recipient's reaction to a digital gift. The reaction, for example, is in the form of a mood or a behavior, or both. For example, a microphone records the audio sounds or words spoken by the gift recipient and analyzes the same to automatically provide a classification of a certain mood, or a certain behavior. In another example, a camera records the facial expression of the gift recipient to automatically classify their mood (e.g. angry, happy, confused, surprised, sad, excited, engaged, etc.). In another example, a camera records the body posture and movement of the gift recipient and then uses this information to automatically provide a classification of their behavior. In another example, the user device prompts the gift recipient to provide their feedback (e.g. an audio questionnaire, a touchscreen display feedback control, etc.). For example, the user device, via the voice interface, asks the gift recipient "Did you enjoy the digital gift from <Gift Giver Name>?", and the gift recipient orally responds. This oral response is then automatically analysed using speech-to-text, and the words are analyzed to indicate whether the reaction is positive or negative. One or more of the above approaches to classify the data can be combined.

It will be appreciated that there are different approaches to obtaining the reaction of the gift recipient that are applicable to the principles described herein.

At block 1902, if the mood or behavior of the gift recipient's reaction is positive, then the user device or the connect server system, or both, positively scores the content of the digital gift. Alternatively, at block 1903, if the mood or behavior of the gift recipient's reaction is negative, then the user device or the connect server system, or both, negatively scores the content of the digital gift.

At block 1904, this scoring from block 1902 or block 1903 is used as feedback to reinforce similar content or discourage similar content. For example, the connect server system sends a message to the gift giver's user device regarding the gift recipient's reaction. In another example, the connect server system uses the feedback to suggest content for future digital gifts for those users giving a digital gift to the same gift recipient. For example, if content about gardens for the digital gift given to Mary (e.g. the gift recipient) evoked a positive reaction (e.g. happy mood, engaged activity, etc.), then for others contacts of Mary who are thinking to give a digital gift to Mary, the connect server system will recommend these other contacts to include content about gardens.

In another example, if there are other users (e.g. Hazel, Betty) that have similar attributes to Mary (e.g. age, gender, interest in gardening or outdoors), then the connect server system will use a look-a-like algorithm to determine that recommended content that Mary likes would potentially also be liked by Hazel and Betty. Therefore, for users who wish to give a digital gift to Hazel and Betty, the connect server system will recommend the same or similar garden content to these users to include in the digital gift to Hazel or Betty, or both.

In another example, if Mary enjoyed content about gardens, then the connect server system will search for additional content about gardens.

In another example scenario, Mary receives a digital gift that includes content about beaches (e.g. water, sand, shoreline, waves, etc.) and her reaction is negative. This feedback is used to provide warnings to Mary's contacts. In particular, a contact of Mary is preparing a digital gift to Mary and includes photos of a beach. The user device of the contact, or the connect server system, sends a warning message to the contact that Mary did not enjoy beaches in a past digital gift.

It will be appreciated that the reaction data of the gift recipient can be used in other ways to automatically, or semi-automatically, create digital gifts that are liked by the gift recipient.

Figure 20:
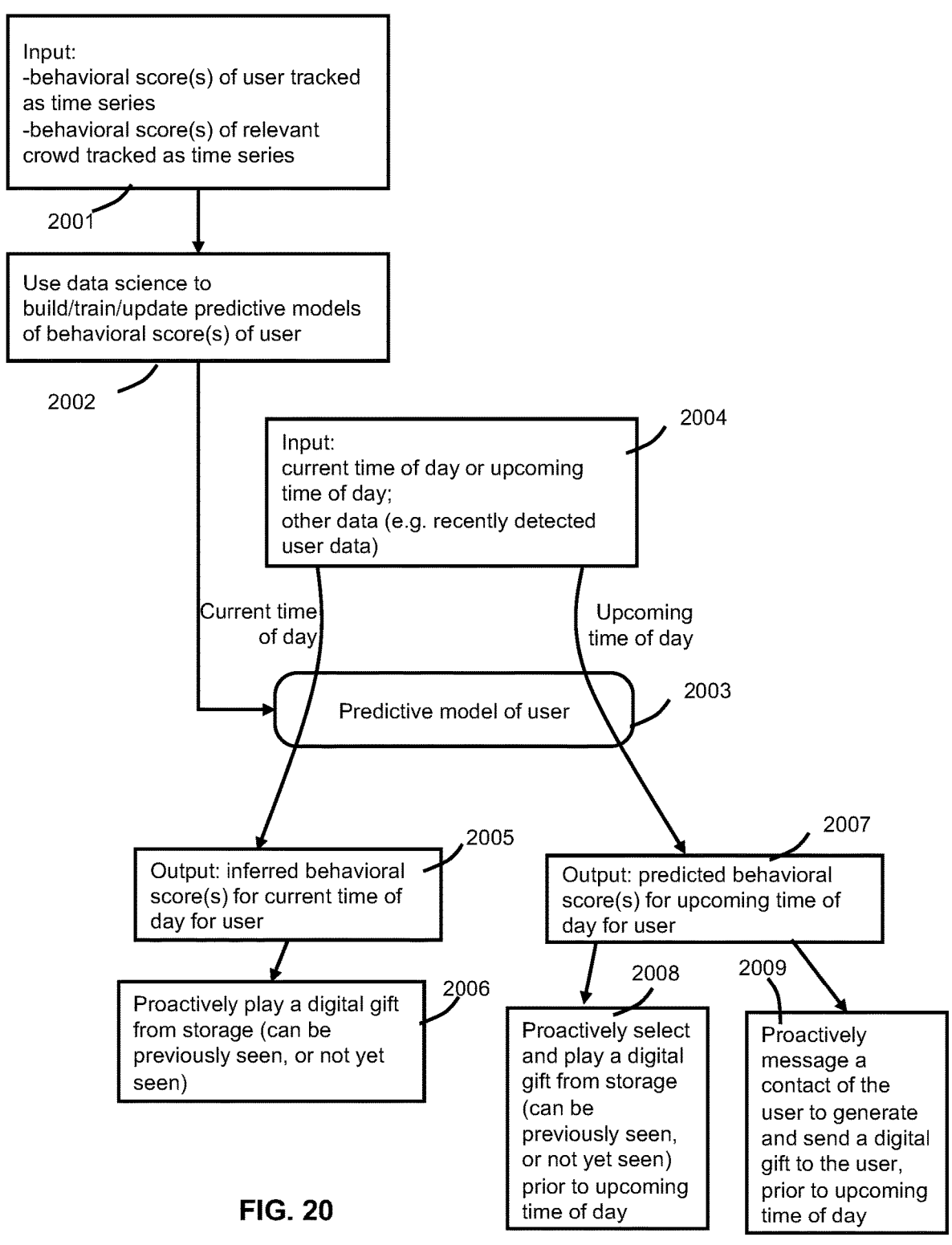
FIG. 20 is a flow diagram of executable instructions for using a predictive model of a user to initiate a digital gift for the user.

Turning to FIG. 20, example executable instructions are provided to proactively play a digital gift to a gift recipient, or to initiate generating a digital gift for a recipient, based on a predictive model of the gift recipient.

A behavioral or mood score is assigned to a gift recipient. This score is dynamic as the behavior or mood of the gift recipient can change over time. In an example aspect, the score is calculated in part based on inputs from others (e.g. family members, caregivers, friends, etc.). In an example aspect, the score is calculated based on data obtained about the gift recipient through the gift recipient's user device or other connected devices (e.g. other sensors or IoT devices). For example, the gift recipient's score is computed based on the words they say as recorded by a microphone, the intonation of their voice as recorded by a microphone, their facial expression as recorded by a camera, their body posture as recorded by a camera, their movement as recorded by a camera or some other sensor, their heart rate as recorded by a wearable sensor, etc. This behavioral or mood score is used by the connect server system to build a predictive model of the gift recipient, so that the moods or behaviors, or both, can be predicted. The prediction of future behaviors or future moods, or both, can be made using artificial intelligence, machine learning or other statistical computations.

The below example refers to behavioral scores, although the scores could be alternatively, or in addition, apply to mood scores.

Block 2001: The connect server system obtains, as input, the behavioral score(s) of a subject gift recipient tracked as a time series. The connect server system can optionally obtain, as input, behavioral score(s) of other gift recipients that are considered to be similar to the subject gift recipient, also tracked as a time series. For example, the other gift recipients have similar attributes (e.g. temperament, age, gender, culture, etc.) to the subject gift recipient, and therefore, behavioral rules and science applied to the other gift recipients are optionally used to build the predictive model of the subject gift recipient.

Block 2002: The connect server system then uses data science to build, train or update predictive model(s) of behavioral score(s) of user. In particular, in a first iteration, the connect server system builds and trains the predictive model(s) of the behavior score(s). In subsequent iterations, the connect server system uses newer and additional data to update (or retrain) the predictive model(s).

Predictive model(s) 2003 of the subject gift recipient's behavior score(s) are outputted from block 2002.

After the predictive model(s) 2003 of the subject gift recipient has been built, trained, or updated, or a combination thereof, then the following computations take place.

Block 2004: The connect server system obtains as input: the current time of day or an upcoming time of day; and other data (e.g. recently detected user data of the gift recipient). These inputs are inputted into the predictive model(s) 2003.

In an example embodiment where the current time of day is inputted into the predictive model(s) 2003, blocks 2005 and 2006 are executed.

Block 2005: The predictive model(s) 2003 output the predicted behavioral score(s) for the current time of day for the subject gift recipient.

Block 2006: The connect server system then proactively initiates the user device of the subject gift recipient to play a digital gift. The digital gift may be a new digital gift that the subject gift recipient has not yet seen, or may be a digital gift that has already been seen and is played again. In an example embodiment, multiple digital gifts are queued and played one after another.

In an example embodiment at block 2006, the connect server system generates a new digital gift for the gift recipient based on the gift recipient's personal profile and the outputted behavioral results associated with the gift recipient.

In another example embodiment where the upcoming time of day is inputted into the predictive model(s) 2003, block 2007 and block 2008 or block 2009 are executed.

Block 2007: The predictive model(s) 2003 output the predicted behavioral score(s) for the given upcoming time of day for the user.

Block 2008: The connect server system then proactively selects and plays a digital gift from storage (e.g. can be previously seen, or can be a digital gift that has not yet been seen) based on predicted behavioral score(s). This digital gift is played prior to the upcoming time of day. For example, if the connect server system predicts that the gift recipient will be sad in 2 hours from now (e.g. at 7:00 pm, such as for sundowning), the connect server system will initiate the user device of the gift recipient to play a happy digital gift in advance to prevent the gift recipient from thinking about things related to sadness. More generally, the connect server system attempts to prevent certain negative behaviors in advance, or attempts to encourage certain positive behaviors in advance, or both. In an example embodiment, multiple digital gifts are queued and played one after another.

In an example embodiment at block 2008, the connect server system generates a new digital gift for the gift recipient based on the gift recipient's personal profile and the outputted behavioral results associated with the gift recipient.

Block 2009: In alternative to block 2008, the connect server system proactively messages a contact of the gift recipient, with a suggestion to generate and send a digital gift to the subject gift recipient prior to the upcoming time of day (e.g. 7:00 pm). In this way, the contact, if they wish to participate, will generate a digital gift for the subject gift recipient to cheer them up prior to 7:00 pm, which is the example time at which the subject gift recipient is predicted to be sad.

Figure 21A:
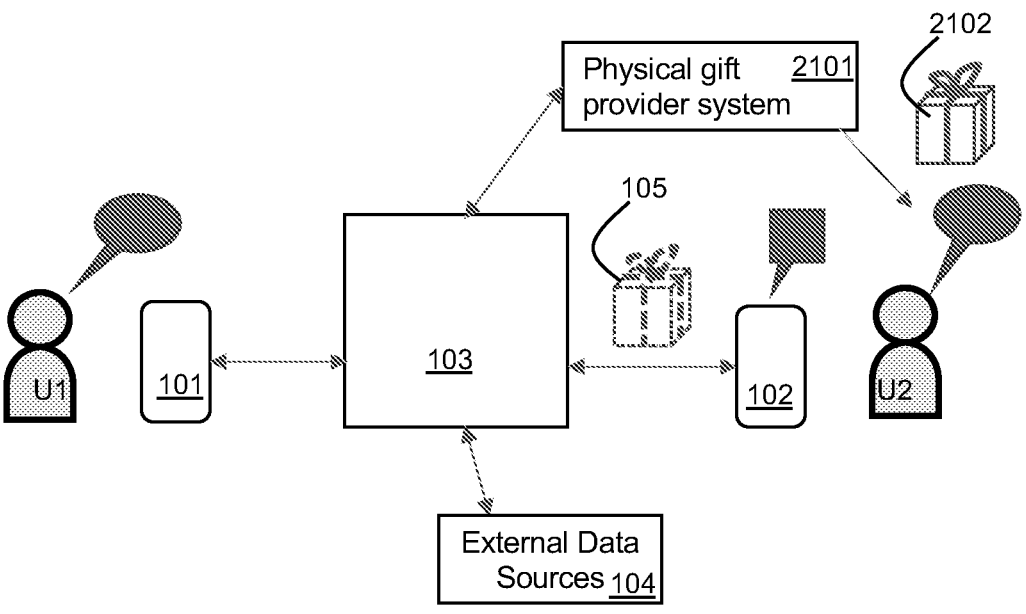
FIG. 21A is a schematic diagram of an example of a connect server system and user devices that facilitate generating and sending a digital gift and a physical gift based on the initiation of a gift giver.

Turning to FIG. 21A, an example embodiment is shown in which a physical gift 2102 is sent to the gift recipient U2 along with the digital gift 105. FIG. 21A is similar to FIG. 1, however, further includes a physical gift provider system 2101 that initiates delivery of a physical gift 2102. In an example embodiment, the physical gift is an object (e.g. a thing). Examples of physical gifts include: food, flowers, a watch, a book, a painting, clothes, jewellery, etc. For example, the physical gift provider system is an online computing platform operated by a company such as Amazon, Shopify, Walmart, 1-800-Flowers, etc. In another example embodiment, the physical gift is a physical service for the gift recipient. Examples of physical gifts include: a massage from a massage therapist, a cleaning service that cleans the home of the gift recipient, a gardening service for the gift recipient, a taxi or driver service for the gift recipient, a teaching service for the gift recipient, etc. One or more service people provide a service to the gift recipient. For example, the physical gift provider system is an online computing platform the manages the deployment of people that provide a service.

The physical gift provider system 2101 includes one or more computing servers that digitally communicate with the connect server system 103. In this way, the connect server system 103 can coordinate the giving of physical gift 2102 with the digital gift 105. In an example embodiment, the digital gift 105 includes a digital gift wrapper as discussed above. In other words, reference to a digital gift may herein include a digital gift wrapper although not explicitly stated. In other examples, a digital gift wrapper does not accompany a digital gift, and the digital gift is provided to the gift recipient without a digital gift wrapper.

In an example aspect, delivery of a physical gift is coordinated with delivery of the digital gift to the gift recipient, or with confirmed presentation of the digital gift to the gift recipient.

In another example aspect, delivery of the digital gift to the recipient is coordinated to precede delivery of a physical gift to the gift recipient.

In another example aspect, delivery of the digital gift to the gift recipient is coordinated to proceed after delivery of a physical gift to the gift recipient.

The user device 101 of the gift giver U1, for example, initiates a voice interface that includes activating the audio speaker and the microphone. The user device 101 asks the gift giver U1 one or more questions via the audio speaker and respectively records one or more answers via the microphone. These one or more questions and these one or more answers are used to at least identify a gift recipient, obtain an audio gift message for the gift recipient, to initiate selection of one or more physical gifts to be delivered to the gift recipient, and confirm transmission of a digital gift and a selected physical gift, the digital gift comprising the audio gift message. The user device 101 then initiates transmission of the digital gift 105 and the selected physical gift 2101 to the gift recipient via the communication system. Delivery of the selected physical gift 2102 is coordinated with delivery of the digital gift 105 to the gift recipient U2, or with confirmed presentation of the digital gift to the gift recipient.

In an example aspect, the physical gift provider system 2101 tracks the delivery of the physical gift 2102 to the gift recipient U2. For example, this can be done through delivery tracking systems of packages (e.g. via scanners, digital check points, GPS, etc.). In another example aspect, a delivery person, or a person that provides the service to the gift recipient, provides input via a computing device (e.g. laptop, mobile phone, etc.) to indicate that they are about to deliver the physical or have delivered the physical gift.

Figure 21B:
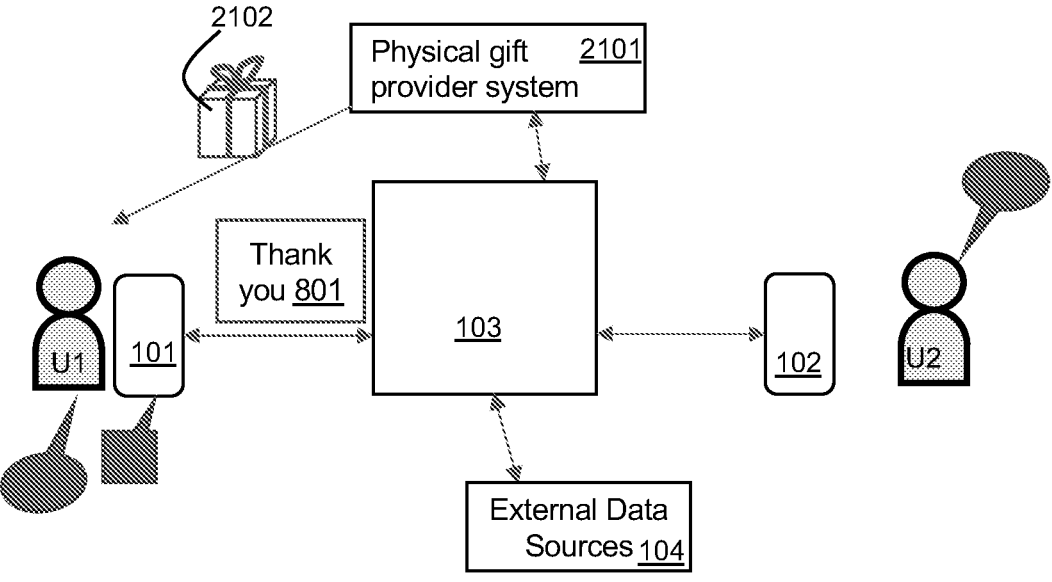
FIG. 21B is a schematic diagram of an example of a connect server system and user devices that facilitate generating and sending a response message and a physical gift from a gift recipient.

In the example shown in FIG. 21B, the gift recipient U2 responds with a thank you message (e.g. a response message 801). The gift recipient U2 also uses the same process described in FIG. 21A to send a physical gift 2102 to the gift giver U1. For example, the gift giver U1 sends a digital gift 105 and a corresponding physical 2102, such as a toaster oven or a blender, to the gift recipient U2, as per the process in FIG. 21A. In FIG. 21B, the gift recipient U2 responds with a thank you message 801 and a physical gift 2102 of flowers.

Figure 21C:
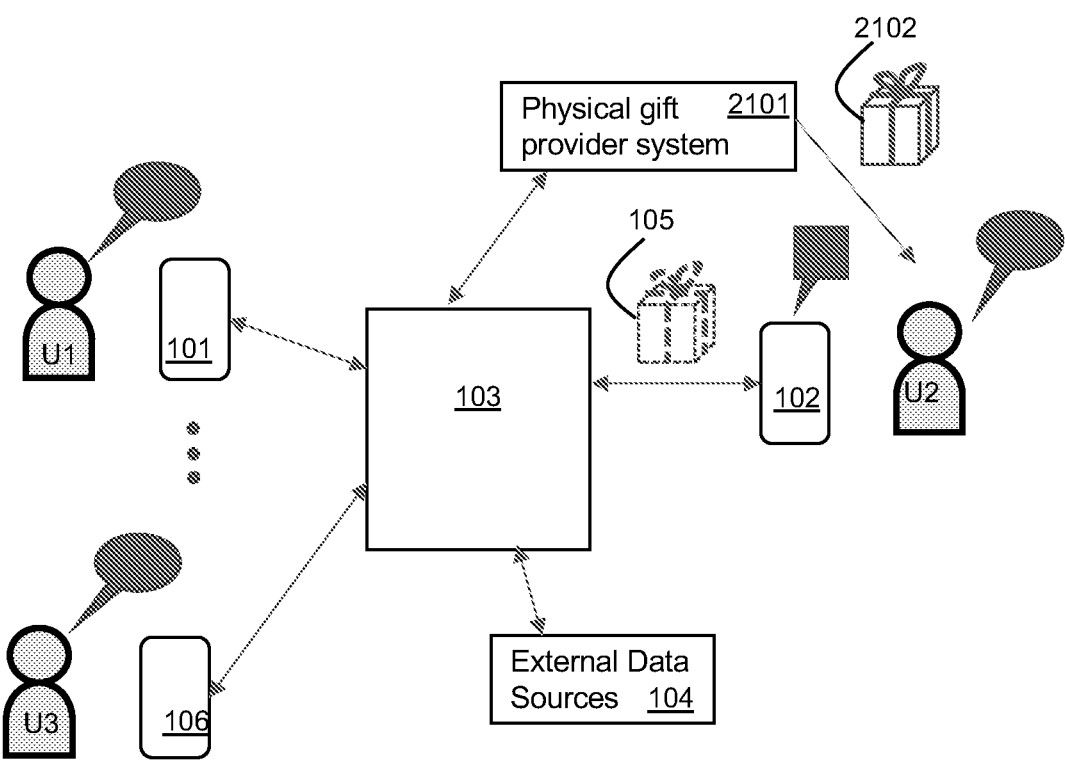
FIG. 21C is a schematic diagram of an example of a connect server system and user devices that facilitate multiple gift givers generating and sending a digital gift and a physical gift.

FIG. 21C shows another example embodiment in which multiple gift givers U1, U3 contribute in providing a physical gift 2102 and a digital gift 105 to the gift recipient U2. For example, the gift givers U1 and U3 both pay for the physical gift 2102. For example, the gift givers buy a new chair for the gift recipient U2.

Figure 21D:
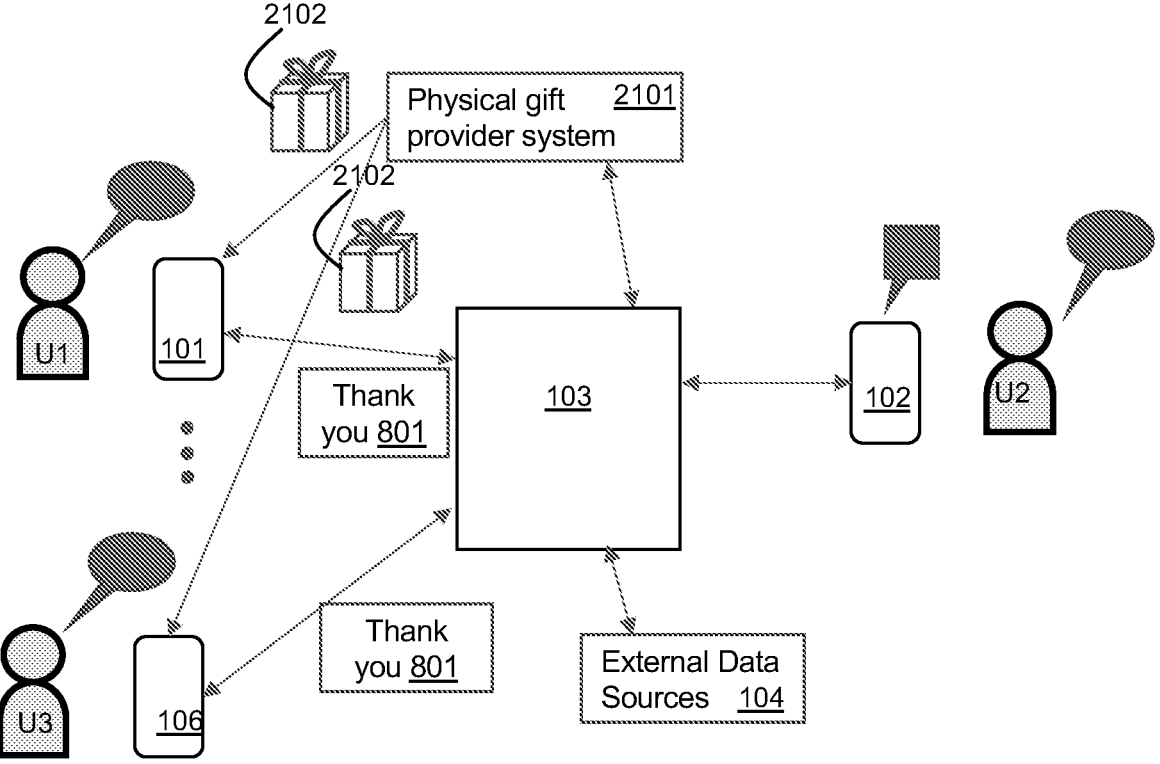
FIG. 21D is a schematic diagram of an example of a connect server system and user devices that facilitate a gift recipient sending a response message and one or more physical gifts to the multiple gift givers.

Following FIG. 21D, the gift recipient U2 sends a thank you message 801 to both the gift givers U1 and U3, and sends them a physical gift 2102 to one or both of them. For example, gift recipient U2 sends a cup of coffee to each of the gift givers U1 and U3 to express appreciation for the new chair.

Figure 22:
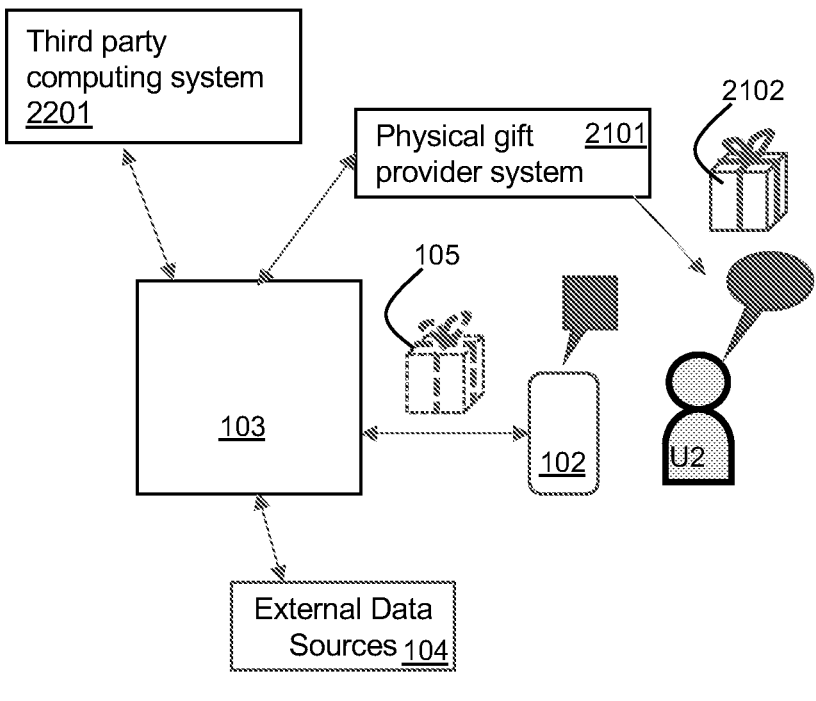
FIG. 22 is a schematic diagram of an example of a connect server system and a user device that facilitate generating and sending a digital gift and a physical gift based on internal processes or on initiation of a third party.

In FIG. 22, a physical gift 2102 along with a digital gift 104 is sent to a gift recipient U2 without a gift giving person. For example, the connect server system 103 automatically initiates generating a digital gift and sending the digital gift and a physical gift to the gift recipient U2. In another example, a third-party computing system 2201 sends data to the connect server system 103 to initiate generating a digital gift and sending the digital gift and a physical gift to the gift recipient U2. For example, the third-party system is a company or an organization.

FIG. 23 shows example executable instructions for coordinating the presentation of the digital gift with the delivery or provision of the physical gift. At block 2301, the connect server system stores a digital gift for a gift recipient in memory. It will be appreciated that one or more gift givers have provided input to generate the digital gift for the gift recipient and have provided input, via their user device, to send a physical gift to the recipient.

At block 2302, the connect server system transmits a command to a physical gift provider system 2101 to provide a physical gift to the gift recipient.

At block 2303, a delivery service or the physical gift provider system 2101, or both, track the delivery status of the physical gift and transmits a predicted arrival time of the physical gift to the connect server system.

At block 2304, the connect server system receives this predicted arrival time of the physical gift at the location of the gift recipient. At block 2305, the connect server system then sends the digital gift, or initiates playing of the digital gift, at a time in advance of the predicted arrival time (e.g. 5 minutes beforehand, 1 hour beforehand, etc.), or at the same time as the predicted arrival time, or at some time after the predicted arrival time.

FIG. 24 provides an alternative example embodiment. Blocks 2301 and 2302 are executed. At block 2401, the delivery service or the physical gift provider system, or both, track the delivery status of the physical gift and transmits the arrival status (or delivery complete status) of the physical gift to the connect server system.

At block 2402, the connect server system receives this time stamp associated with the arrival of the physical gift at the gift recipient's location. At block 2403, the connect server system sends the digital gift, or initiates playing of the digital gift, in response to block 2402. In another example embodiment, the connect server system wait for a delay period and then initiates sending of the digital gift to the gift recipient's user device.

Figure 25:
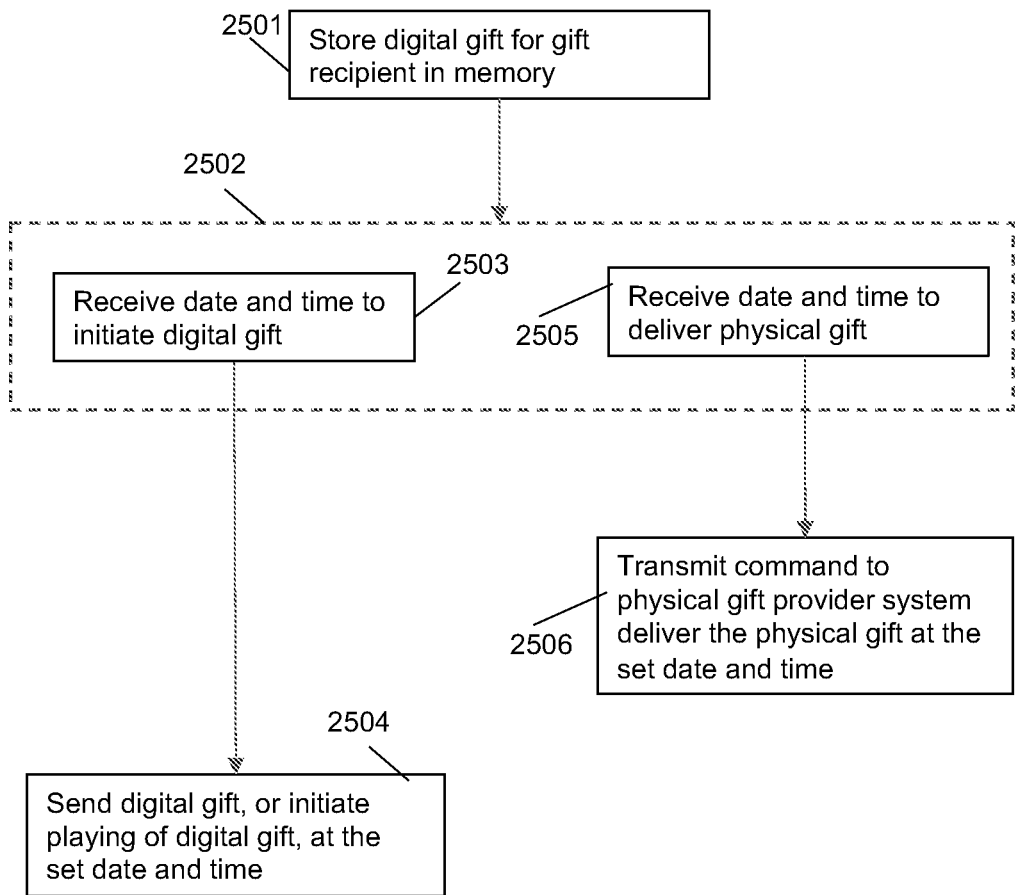
FIG. 25 is a flow diagram of example executable instructions for coordinating sending a digital gift and a physical gift according to another example embodiment.

FIG. 25 shows another set of example executable instructions for coordinate the delivery of the physical gift and the digital gift. At block 2501, the connect server system stores the digital gift for the gift recipient in memory.

At block 2502, a scheduling process takes place in which the connect server system receives a data and time to initiate the digital gift at the user device of the gift recipient (block 2503) and receives a date and time to deliver the physical gift to the gift recipient (block 2505). In an example aspect, block 2505 includes a negotiation process with the gift giver, or the physical gift provider system, or the delivery service system, or a combination thereof. For example, the gift giver specifies the desired delivery time and date of each of the digital gift and the physical gift, and this process includes also presenting estimated delivery dates of the physical gift due to limitations or logistics of delivering a physical gift.

Following block 2503, the connect server systems sends the digital gift or initiates play the digital gift at the set date and time (block 2504).

Following block 2505, the connect server system sends the command to the physical gift provider system to deliver the physical gift at the set date and time (block 2506).

The time and date of the digital gift presentation can be set to be different from, or can be set to coincide with, the time and date of the arrival of the physical gift.

FIG. 26 shows example executable instructions for another coordination approach. At block 2601, the connect server system sends the digital gift to the gift recipient's user device. At block 2602, the connect server system receives a message from the gift recipient's user device that the digital gift has been opened and played to the gift recipient. At block 2603, the connect server system then transmits a command to a physical gift provider system to deliver the physical gift to the gift recipient.

FIG. 27 shows example executable instructions for another coordination approach that is conditional on the gift recipient completing an action.

At block 2701, the connect server system sends a digital gift to a user device of the gift recipient. The digital gift includes an action to be completed by the gift recipient. Examples of an action include: a digital game to be played by the gift recipient using their user device; the gift recipient answering a question via the voice interface of the user device; completing a motion that is detectable by the camera of the user device or some other sensor in communication with the user device; participating in a sing along that is detectable by the voice interface of the user device; matching a facial expression presented on the display of the user device and that is detectable by the camera of the user device; and the gift recipient interacting with an ancillary sensor that is in communication with the user device. It will be appreciated that other actions can be used to make the digital gift interactive.

At block 2702, the connect server system detects the gift recipient has received the digital gift and has initiated playing the digital gift.

At block 2703, the connect server system sends the action to the user device of the gift recipient, so that that gift recipient can complete the action.

At block 2704, the connect server system receives a message from the user device, or some other computing device that is used in the action, that the action has been completed.

At block 2705, the connect server system transmits a command to the physical gift provider system to provide the physical gift to the gift recipient.

Figure 28:
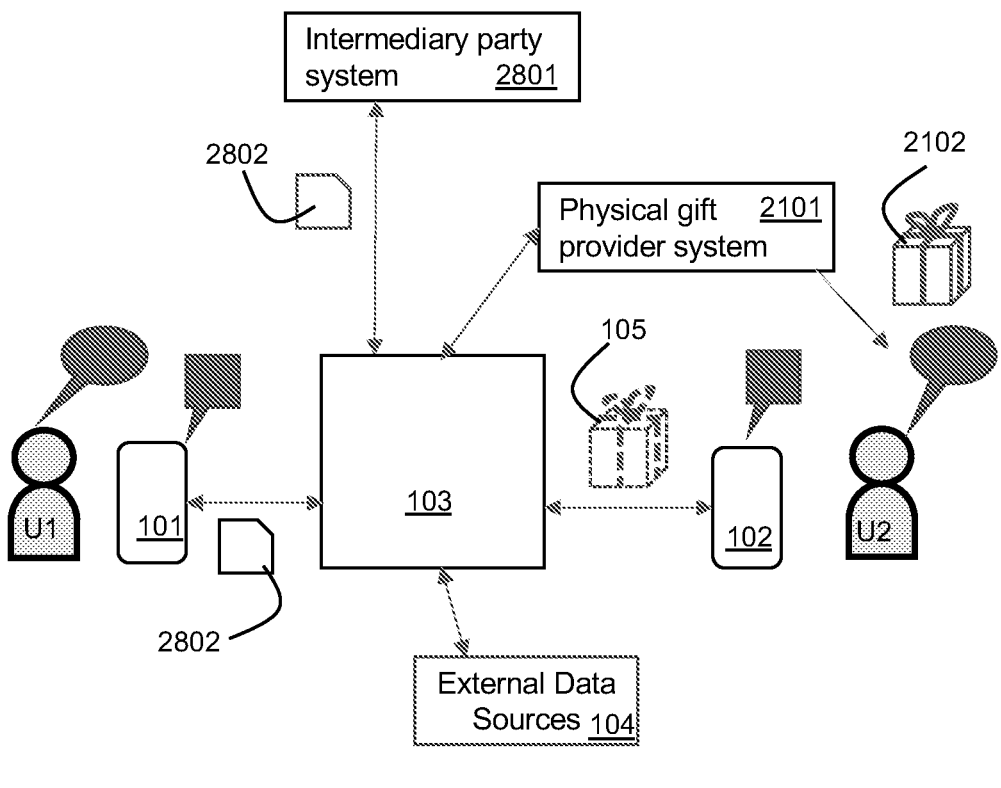
FIG. 28 is a schematic diagram for initiating a digital gift or a physical gift, or both, based on an advertisement message sent to a potential gift giver, according to an example embodiment.

Turning to FIG. 28, an example embodiment is provided that is similar to FIG. 21. In FIG. 28, a digital message 2802 is sent to the user device 101 of the gift giver U1 to prompt the gift giver to send a gift recipient a digital gift 105 and a physical gift 2102. The digital message 2802, for example, is a form of advertisement. In an example aspect, the digital message 2802 originates from an intermediary party 2801, or the digital message 2802 originates from the physical gift provider system 2101.

In an example embodiment, the digital gift 105 includes a digital gift wrapper as discussed above. In other words, reference to a digital gift may herein include a digital gift wrapper although not explicitly stated. In other examples, a digital gift wrapper does not accompany a digital gift, and the digital gift is provided to the gift recipient without a digital gift wrapper.

In an example scenario, the intermediary party system 2801 is a computing system that manages activities or manages things for the gift recipient U2. For example, the intermediary party system is a company, a school, another user, or a facility that provides some form of care for the gift recipient U2. The intermediary party system 2801 recommends that a physical gift (e.g. a thing, a service, a trip, an event, etc.) should be given to the gift recipient. Accordingly, the intermediary party system 2801 identifies a contact of the gift recipient (i.e. the potential gift giver U1), and sends a digital message to the potential gift giver U1 to initiate giving the digital gift and the physical gift to the gift recipient U2.

In another example scenario, the intermediary party system 2801 detects a condition of the potential gift giver U1. For example, the connect server system 103 receives from the user device 101 that the gift giver U1 is located at a tourism site, and the connect server system 103 sends a message to the intermediary party system about the tourism site. The intermediary party system 2801 in response transmits a digital message 2802 that includes suggested physical gifts that relate to the tourism site (e.g. souvenirs of the tourism site) to send to one or more gift recipients (e.g. the gift recipient U2). The connect server system relays this digital message 2802 to the user device 101 of the gift giver U1. For example, the digital message 2802 includes links to initiate a purchase of physical souvenirs to send to gift recipients and a suggestion to send a digital gift 105 and a physical souvenir 2102 to the gift recipient U2.

Figure 29:
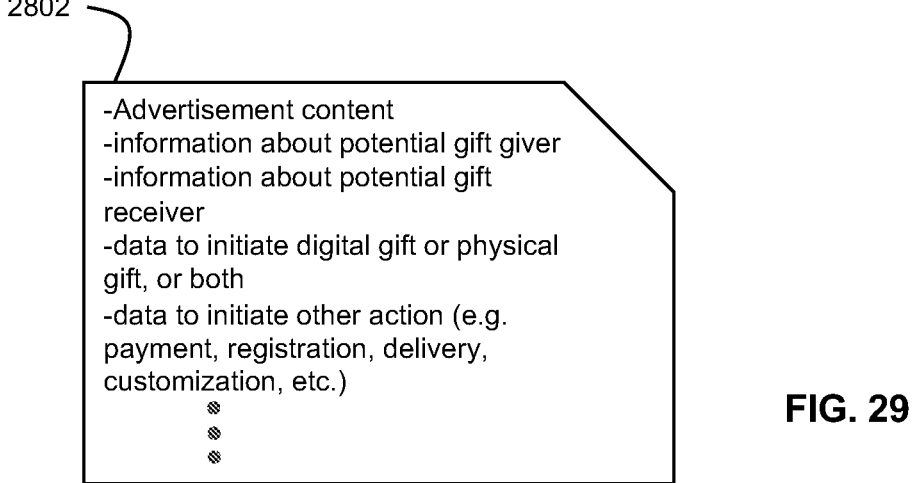
FIG. 29 is an example embodiment of an advertisement message.

FIG. 29 shows an example embodiment of a digital message 2802. It includes, for example, advertisement content about one or more physical gifts. It may also include information about the potential gift giver U1 and information about the potential gift receiver U2; this information may be explicitly presented to the gift giver U1 or may remain hidden to the gift giver U1. The digital message 2802 also includes data to initiate generating a digital gift and data to initiate sending a physical gift. The digital message 2802 also includes, according to another example aspect, data to initiate another action (e.g. payment of the digital gift, a registration process to provide the physical gift, delivery information, a customization process, etc.).

Figure 30:
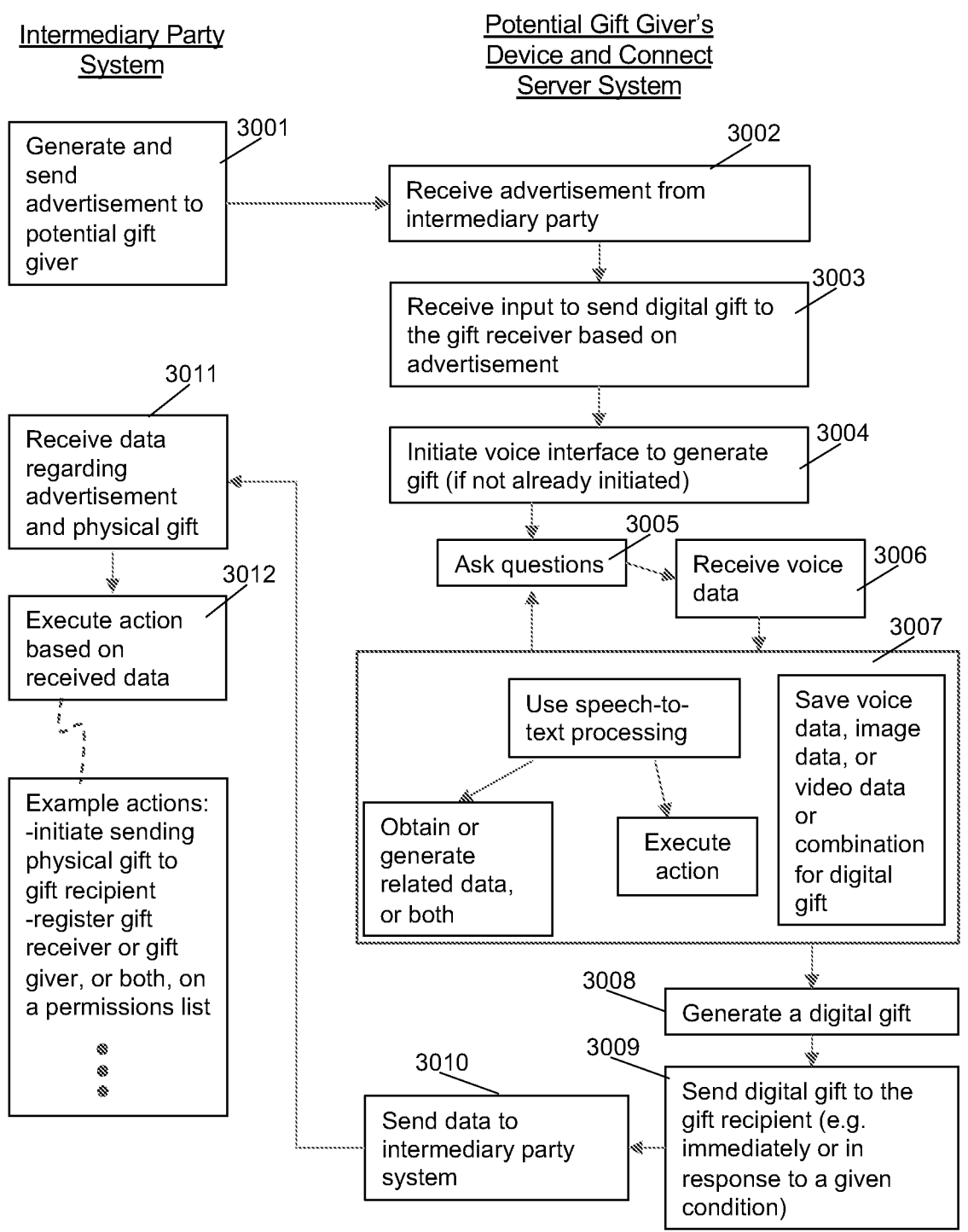
FIG. 30 is a flow diagram of example executable instructions for an intermediate party to generate and send and advertisement to a potential gift giver, and generating a digital gift based on the same.

FIG. 30 shows example executable instructions for sending a digital message 2802, which is an advertisement for a physical gift. At block 3001, the intermediary party system generates and sends a digital message 2802 that includes an advertisement to a potential gift giver. For example, this advertisement is based on the context information of the gift giver. Examples of context information include: location of the gift giver; an event related to the gift giver; the relationship between the gift giver and the gift recipient; an event related to the gift recipient; and the relationship between the intermediary party and the gift giver or the gift recipient, or both.

At block 3002, the gift giver's user device receives the advertisement from the intermediary party.

At block 3003, the gift giver's user device receives an input to send a digital gift to the gift recipient based on the advertisement.

At block 3004, if the voice interface has not already been initiated, the gift giver's user device initiates a voice interface to generate a digital gift.

At block 3005, the user device asks one or more questions to the gift giver. At block 3006, the user device receives voice data from the gift giver, which are responses from the gift recipient or is an audio message that forms part of the digital gift. At block 3007, the voice data is processed to obtain or generate related data, execute an action, or store content data (e.g. voice data, image data, video data, etc.) to form the digital gift. Blocks 3005, 3006, 3007 can occur in a loop with different questions, actions, responses, etc. to form a conversation between the user device and the gift giver. Blocks 3005, 3006, 3007 are also used to obtain confirmation and related details to process the provision of a physical gift to the gift recipient (e.g. selection of the physical gift, delivery details, payment for the physical gift, etc.).

At block 3008, the user device or the connect server system generates a digital gift.

At block 3009, the connect server system transmits the digital gift to the user device of the gift recipient. The digital gift is sent, for example, in response to detecting a condition is satisfied (e.g. a certain time, a certain mood or action detected by the gift recipient, etc.). Alternatively, the digital gift is sent right away.

At block 3010, the connect server system sends data to the intermediary party system. The data includes details regarding the physical gift, related information (e.g. the gift recipient, delivery details, payment details, etc.) and the advertisement (e.g. the data from the digital message 2802). At block 3011, the intermediary party system receives this data. At block 3012, the intermediary party system executes one or more actions based on this received data.

For example, the intermediary party system executes a computing process that initiates sending a physical gift to the gift recipient. In another example, the physical gift requires permission or registration or both, and the intermediary party system executes a computing process that registers the gift recipient or the gift giver (or both) on to a permission or registration list. For example, the physical gift is an event or a trip, and the intermediary party system registers the gift recipient on a permission list, indicating that the gift recipient is permitted to attend the event or the trip.

For example, an intermediary party is a care provider organization for a potential gift recipient. The intermediary party system sends a digital message to the gift giver (e.g. a daughter of the gift recipient) that includes an advertisement—"We are going to the zoo on July 2nd. Would you like Mary to join? Pay $30 to gift her this experience!". Mary is the mother of the gift giver and is under the care of the care provider organization. Mary is also the gift recipient. The daughter receives this advertisement and proceeds to generate and give the digital gift to Mary, which could have a zoo theme. Mary then receives the digital gift from her daughter showing a gift—and explaining to Mary that she has received a gift to go to the zoo field trip. Payment and registration are sent to the intermediary party system.

FIGS. 31A to 31D show different example schematics of sending digital gifts and thank you messages over different communication channels.

Figure 31A:
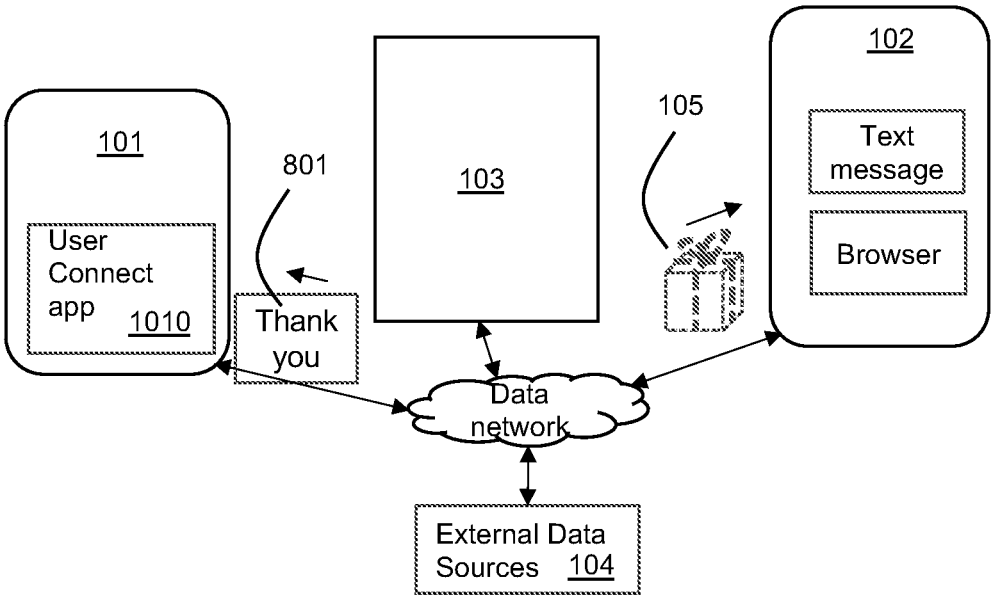
FIG. 31A is a schematic diagram of gift giver's device using their User Connect application to initiate sending a digital gift to a gift recipient's device via text message; the gift recipient's device receiving the digital gift via text message; and the gift recipient's device sending a response to the gift giver's device that is accessible by the gift giver's User Connect application, according to an example embodiment.

Turning to FIG. 31A, the gift giver's user device 101 has a User Connect app 1010 that generates and sends a digital gift 105 to a gift recipient. The user device 101 specifies that the digital gift is to be sent via text message and user device 101 specifies a gift recipient's phone number. The connect server system 103 then sends a text message that includes a data link (e.g. URL) that links to the digital gift. In another example embodiment, the data link is sent to the gift giver's user device 101 and the gift giver's device 102 then sends the text message with the data link to the gift recipient's device 12. The gift recipient's device 102 receives the text message and, after activating the data link, a web browser on the device 102 opens a web page that links to the connect server system 103. Through the web page, the connect server system 103 plays the digital gift on the device 102.

The gift recipient can send a thank you message (e.g. a response message 801) via a text message or a via the web browser. In an example aspect, the thank you message is sent via text message as a reply to the initial text message. In an example embodiment, this text messaged response is displayed via the gift giver's User Connect app 1010 and is stored in association with the digital gift. In another example embodiment, the text messaged response is displayed in the gift giver's text messaging application.

Figure 31B:
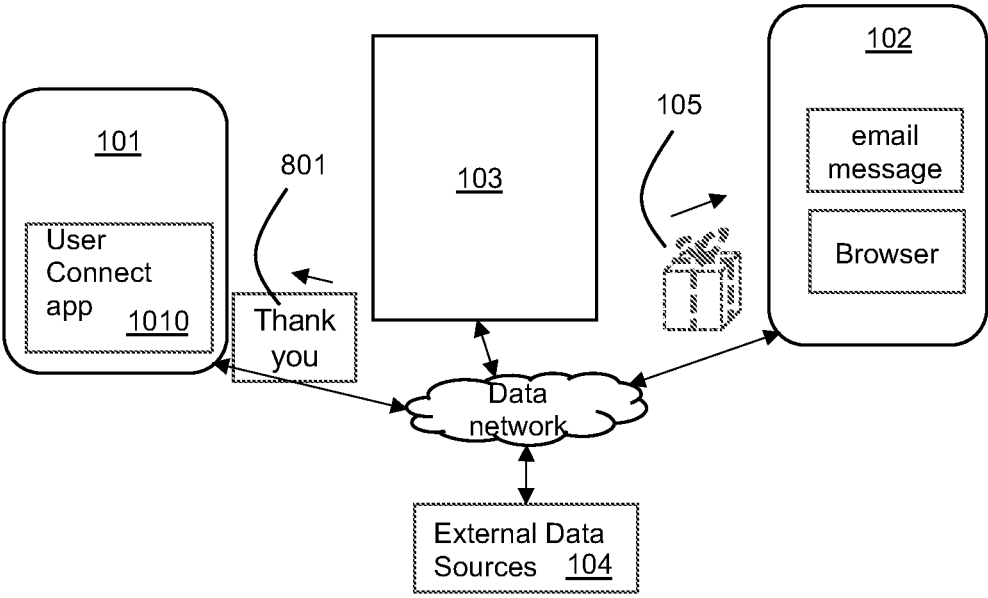
FIG. 31B is a schematic diagram of gift giver's device using their User Connect application to initiate sending a digital gift to a gift recipient's device via email; the gift recipient's device receiving the digital gift via email; and the gift recipient's device sending a response to the gift giver's device that is accessible by the gift giver's User Connect application, according to an example embodiment.

FIG. 31B is similar to FIG. 31A, except that the digital gift is specified to be sent by email to the gift recipient using an email address provided by the gift giver's device 101. The connect server system 103 then sends an email that includes a data link (e.g. URL) that links to the digital gift. In another example embodiment, the data link is sent to the gift giver's user device 101 and the gift giver's device 102 then sends the email with the data link to the gift recipient's device 12. The gift recipient's device 102 receives the email and, after activating the data link, a web browser on the device 102 opens a web page that links to the connect server system 103. Through the web page, the connect server system 103 plays the digital gift on the device 102.

The gift recipient can send a thank you message (e.g. a response message 801) via an email or a via the web browser. In an example aspect, the thank you message is sent via email as a reply to the initial text message. In an example embodiment, this emailed response is displayed via the gift giver's User Connect app 1010 and is stored in association with the digital gift. In another example embodiment, the emailed response is displayed in the gift giver's email application.

Figures 31C, 31D:
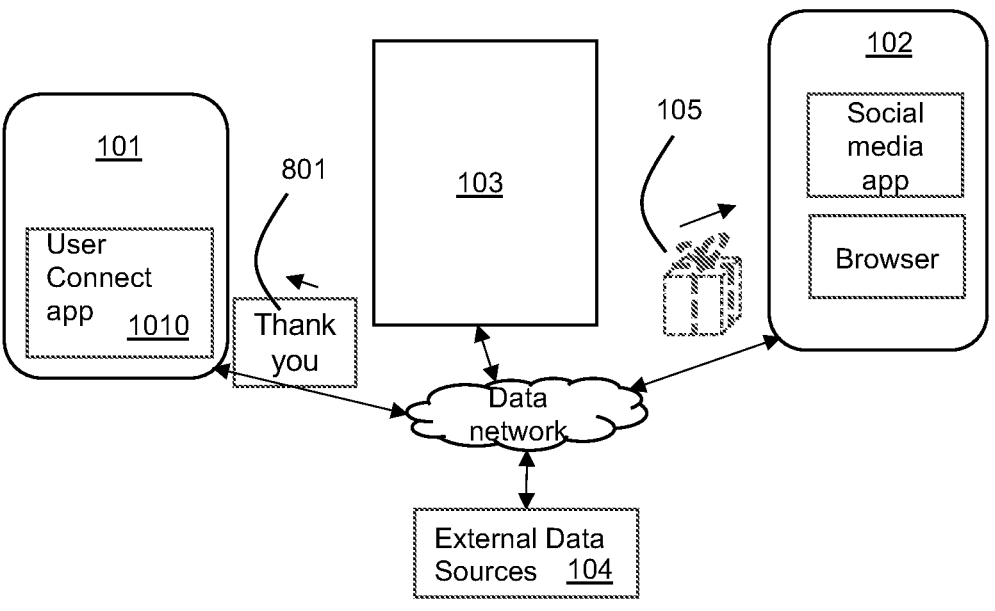
FIG. 31C is a schematic diagram of gift giver's device using their User Connect application to initiate sending a digital gift to a gift recipient's device via a social media application; the gift recipient's device receiving the digital gift via the social media application; and the gift recipient's device sending a response to the gift giver's device that is accessible by the gift giver's User Connect application, according to an example embodiment.
FIG. 31D is a schematic diagram of gift giver's device using their User Connect application to initiate sending a digital gift to a gift recipient's device via a messaging application; the gift recipient's device receiving the digital gift via the messaging application; and the gift recipient's device sending a response to the gift giver's device that is accessible by the gift giver's User Connect application, according to an example embodiment.

FIG. 31C is similar to FIG. 31A, except that the digital gift is sent via a social media application. Similarly, a response message can be sent back via the social media application, which is viewable at the gift giver's device on their User Connect app or on their social media application.

FIG. 31D is similar to FIG. 31A, except that the digital gift is sent via a messaging application. Similarly, a response message can be sent back via the messaging application, which is viewable at the gift giver's device on their User Connect app or on their messaging application.

FIG. 32 shows example executable instructions for sending a digital gift using a different channel than the User Connect app.

Block 3201: The giver's device 101 generates a digital gift via the User Connect App.

Block 3202: The giver's device specifies an external communication channel (e.g. text, email, other messaging app, social media channel, etc.) and the corresponding details of the gift recipient (e.g. phone number for texting, email address for emailing, social media handle or ID for a social media platform, etc.).

Block 3203: The giver's device transmits the digital gift and communication channel with corresponding details to the connect server 103.

Block 3204: The connect server 103 stores the digital gift.

Block 3205: The connect server generates a data link to the digital gift and transmit the data link via the specified communication channel.

Block 3206: The recipient's device 102 receives the data link via the specified communication channel.

Block 3207: The recipient's device launches a viewing window (via Browser or other app) that connects to the data link.

Block 3208: The connect server in turn receives a request to connect from user device 102.

Block 3209: The connect server compiles and transmits the digital gift so that it is vieawable or playable on the recipient's device using the viewing window.

Block 3210: The recipient's device plays the digital gift via the viewing window.

If the recipient wants to send the thank you message, then the process continues at block 3211.

Block 3211: The recipient's device receives user input for a response message, which is a reply to the message with the data link.

Block 3212: The recipient's device transmits the response message via the specified communication channel used at block 3206.

Block 3213: The connect server receives the response message via the specified channel.

Block 3214: The connect server associates the response message with the digital gift.

Block 3215: The connect server transmits the response message to giver's device via the User Connect App.

Block 3216: The giver's device receives the response message via the User Connect App.

FIG. 33 shows another example embodiment that encourages a gift recipient to download the User Connect app. In FIG. 33, blocks 3201 to 3210 are executed.

If the recipient wishes to send a thank you message, then process continues at block 3301.

Block 3301: The recipient's device receives an input from the user indicating desire to respond.

Block 3302: The recipient's device initiates downloading of the User Connect app and associating the recipient's account with the giver's account.

Block 3303: The connect server in turn creates a new user account for the recipient and associates the new user account with the giver's account.

Block 3304: The recipient's device receives user input for the response via the User Connect app and transmits the same.

Block 3305: The connect server receives and associates the response message with the digital gift.

Block 3306: The connect server then transmits the response message and the recipient's account ID to the giver's device via the User Connect App, Block 3307: The giver's device then receives the response message and the recipient's account ID via the User Connect App.

Below are example embodiments and example aspects.

In an example embodiment, a user device is provided for generating a digital gift. The user device includes: a display screen; a processor system; a communication system; an audio speaker; a microphone; and a memory system. The memory system comprises executable instructions to at least:

initiate a user interface to receive a selection identifying a gift recipient, obtain digital content for generating a digital gift, and obtain communication channel information for transmitting the digital gift to the gift recipient, wherein the digital gift comprises a voice interactive condition for the gift recipient that triggers playing the digital gift;

transmit the digital gift and the communication channel information to a connect server system via the communication system; and responsive to subsequently receiving a response message from the gift recipient, determine whether to play the response message and, after determining that the response message is to be played, play at least a representation of the digital gift followed by the response message.

In an example aspect, the user interface is a voice interface.

In another example aspect, the user interface is a touch interface.

In another example aspect, the user interface receives a combination of voice inputs and touch inputs to generate the digital gift.

In another example embodiment, a user device for generating a digital gift is provided. It includes: a display screen; a processor system; a communication system; an audio speaker; a microphone; and a memory system. The memory system includes executable instructions to at least: initiate a voice interface that comprises activating the audio speaker and the microphone; ask a first set of one or more questions via the audio speaker and respectively record a first set of one or more answers via the microphone, the first set of the one or more questions and the first set of the one or more answers used to at least identify a gift recipient, obtain an audio gift message for the gift recipient, initiate an option to select an image or a video, and confirm transmission of a digital gift, the digital gift comprising the audio gift message; initiate transmission of the digital gift to the gift recipient via the communication system; and, responsive to subsequently receiving a response message from the gift recipient, initiate the voice interface to ask a second set of one or more questions via the audio speaker and respectively record a second set of one or more answers via the microphone to at least determine whether to play the response message and, after determining that the response message is to be played, play at least a representation of the digital gift followed by the response message.

In an example aspect, the executable instructions are used to further display one or more images, or one or more videos, or both, via the display screen; the display screen comprises a touch interface to receive a selection of the image or the video, or both; and the digital gift further comprises the image or the video, or both.

In another example aspect, the memory system further includes a photo application that includes one or more images or one or more videos, or both, and the voice interface uses the first set of the one or more questions and the first set of the one or more answers to initiate display of the photo application.

In another example aspect, the user device further includes a camera device, and the first set of the one or more questions and the first set of the one or more answers are further used to activate the camera device to capture a video or an image, or both. The digital gift further includes the video or the image, or both, that have been captured by the camera device.

In another example aspect, the first set of the one or more questions and the first set of the one or more answers are further used to select a digital gift wrapper associated with the digital gift, the digital gift wrapper includes visual data that is displayed before playing the digital gift.

In another example aspect, the digital gift wrapper further includes audio data.

In another example aspect, the first set of the one or more questions and the first set of the one or more answers are further used to determine one or more conditions associated with the gift recipient receiving the digital gift.

In another example aspect, the one or more conditions comprise a date and a time at which the digital gift is transmitted to the gift recipient.

In another example aspect, the one or more conditions comprise verifying the gift recipient's presence using at least one of facial recognition, voice recognition, fingerprint recognition, and biological signal recognition before permitting the digital gift to be received by the gift recipient.

In another example aspect, the one or more conditions comprise verifying a mood of the gift recipient before permitting the digital gift to be received by the gift recipient.

In another example aspect, the one or more conditions comprise verifying a location of the gift recipient before permitting the digital gift to be received by the gift recipient.

In another example aspect, the one or more conditions comprise verifying that the gift recipient is alone in an immediate vicinity of the gift recipient before permitting the digital gift to be received by the gift recipient.

In another example aspect, the first set of the one or more questions and the first set of the one or more answers are further used to select a digital gift wrapper associated with the digital gift, the digital gift wrapper comprising visual data and one or more conditions associated with the gift recipient receiving the digital gift; wherein the digital gift wrapper is displayed prior to playing the digital gift.

In another example aspect, the digital gift includes a data link to the audio gift message.

In another example aspect, the digital gift further includes one or more data links to an image or a video, or both; and the image or the video, or both, form part of the digital gift.

In another example aspect, the representation of the digital gift comprises a portion of the audio gift message.

In another example aspect, the representation of the digital gift comprises the audio gift message played at faster speed than the original speed.

In another example aspect, the representation of the digital gift comprises the audio gift message.

In another example aspect, the first set of the one or more questions and the first set of the one or more answers are further used to select one or more actions to be completed by the gift recipient prior to receiving the digital gift.

In another example aspect, the one or more actions are part of a digital game that is presented to the gift recipient.

In another example aspect, the first set of the one or more questions and the first set of the one or more answers are further used to initiate selection of one or more digital games to be included as part the digital gift.

In another example aspect, the first set of the one or more questions and the first set of the one or more answers are further used to initiate selection of one or more physical gifts to be delivered to the gift recipient.

In another example aspect, delivery of the one or more physical gifts is coordinated with delivery of the digital gift to the gift recipient, or with confirmed presentation of the digital gift to the gift recipient.

In another example aspect, delivery of the digital gift to the recipient is coordinated to precede delivery of the one or more physical gifts to gift recipient.

In another example aspect, delivery of the digital gift to the recipient is coordinated to proceed after delivery of the one or more physical gifts to gift recipient.

In another example aspect, the executable instructions are used to further receive, via the communication system, an intermediary message from an intermediary party; the intermediary message comprising data to initiate generating the digital gift.

In another example aspect, the intermediary message further comprises data to initiate giving a physical gift, and the data to initiate generating the digital gift comprises digital content about the physical gift that forms part of the digital gift.

In another example aspect, the intermediary message further comprises data about the gift recipient.

In another example aspect, the intermediary message further comprises data about a user of the user device.

In another example aspect, the intermediary message further comprises data about an upcoming event date.

In another example aspect, the intermediary message further comprises location-related data that is derived from a location of the user device.

In another example aspect, responsive to detecting that the user device is within a given location, the voice interface is initiated to generate the digital gift.

In another example aspect, responsive to the user device receiving one or more attributes of the gift recipient, the voice interface is initiated to generate the digital gift.

In another example aspect, the one or more attributes comprise a mood of the gift recipient.

In another example aspect, the one or more attributes comprise a location of the gift recipient.

In another example aspect, the one or more attributes comprise biological data or health related data of the gift recipient.

In another example aspect, the one or more attributes comprise a birthdate of the gift recipient.

In another example aspect, responsive to the user device receiving date information, the voice interface is initiated to generate the digital gift.

In another example aspect, the date information comprises an upcoming holiday.

In another example aspect, the date information comprises the time elapsed since sending a previous digital gift to the gift recipient.

In another example aspect, the response message comprises recorded audio data or visual data, or both, the gift recipient's reaction while playing the digital gift.

In an example embodiment of a user device that generates a digital gift, the user device includes: a display screen; a processor system; a communication system; an audio speaker; a microphone; and a memory system. The memory system includes executable instructions to at least: initiate a voice interface that comprises activating the audio speaker and the microphone; ask one or more questions via the audio speaker and respectively record one or more answers via the microphone, the one or more questions and the one or more answers used to at least identify a gift recipient, obtain an audio gift message for the gift recipient, initiate display of a photo application to select at least one of one or more images and one or more videos, and confirm transmission of a digital gift, the digital gift comprising the audio gift message and at least one of a selected image and a selected video; and initiate transmission of the digital gift to the gift recipient via the communication system.

In an example aspect, the display screen comprises a touch interface to receive a user selection to select at least one of the selected image and the selected video.

In another example aspect, the one or more questions and the one or more answers are further used to select a digital gift wrapper associated with the digital gift, the digital gift wrapper comprising visual data that is displayed before playing the digital gift.

In another example aspect, the digital gift wrapper includes one or more conditions to be satisfied by the gift recipient before playing the digital gift.

In another example aspect, the one or more questions and the one or more answers are further used to select a digital gift wrapper associated with the digital gift, the digital gift wrapper comprising audio data that is played before playing the digital gift.

In another example aspect, the digital gift wrapper includes one or more conditions to be satisfied by the gift recipient before playing the digital gift.

In another example aspect, the photo application displays a recommended set of images that are associated with one or more sentiment tags; wherein the one or more sentiment tags comprise at least one of happy, calm, peaceful, laughing, hug, comfort, and love.

In another example aspect, the photo application displays a recommended set of images that include a face of the gift recipient and a face of a user of the user device.

In an example embodiment of a user device that generates a digital gift, the user device includes: a processor system; a communication system; an audio speaker; a microphone; and a memory system. The memory system includes executable instructions to at least: initiate a voice interface that comprises activating the audio speaker and the microphone; ask one or more questions via the audio speaker and respectively record one or more answers via the microphone, the one or more questions and the one or more answers used to at least identify a gift recipient, obtain an audio gift message for the gift recipient, to initiate selection of one or more physical gifts to be delivered to the gift recipient, and confirm transmission of a digital gift and a selected physical gift, the digital gift comprising the audio gift message; and initiate transmission of the digital gift and the selected physical gift to the gift recipient via the communication system, wherein delivery of the selected physical gift is coordinated with delivery of the digital gift to the gift recipient, or with confirmed presentation of the digital gift to the gift recipient.

In an example aspect, delivery of the digital gift to the gift recipient is coordinated to precede delivery of the selected physical gift to the gift recipient.

In another example aspect, delivery of the digital gift to the gift recipient is coordinated to proceed after delivery of the selected physical gift to the gift recipient.

In another example aspect, presentation of the digital gift to the gift recipient is coordinated to occur at approximately the same time as delivery of the selected physical gift to the gift recipient.

In another example aspect, presentation of the digital gift to the gift recipient and delivery of the selected physical gift to the gift recipient are coordinated to occur within a same given time period.

In another example aspect, the physical gift is a service.

In another example aspect, the physical gift is a product.

In another example aspect, the user device further includes a display screen for displaying the one or more physical gifts, and wherein the display screen has a touch interface to receive an input selection to select the selected physical gift.

In an example embodiment of a user device that generates a digital gift, the user device includes: a processor system; a communication system; an audio speaker; a microphone; and a memory system. The memory system includes executable instructions used to at least: responsive to the user device receiving a message comprising that a mood of a gift recipient that is at least one of anxious, sad, restless and angry, initiate a voice interface that comprises activating the audio speaker and the microphone. The executable instructions are also used to at least: ask one or more questions via the audio speaker and respectively record one or more answers via the microphone, the one or more questions and the one or more answers used to at least identify a gift recipient, record an audio gift message for the gift recipient, and confirm transmission of a digital gift, the digital gift comprising the audio gift message; and initiate transmission of the digital gift to the gift recipient via the communication system.

In an example aspect, the user device further includes a display screen, and the executable instructions are used further to initiate display of a photo application to select at least one of one or more images and one or more videos; wherein the digital gift further comprises at least one of a selected image and a selected video.

In another example aspect, the photo application displays a recommended set of images that are associated with one or more sentiment tags; wherein the one or more sentiment tags comprise at least one of happy, calm, peaceful, laughing, hug, comfort, and love.

In another example aspect, the photo application displays a recommended set of images that include a face of the gift recipient and a face of a user of the user device.

In another example embodiment of a user device that generates a digital gift, the user device includes: a display screen; a processor system; a communication system; an audio speaker; a microphone; and a memory system. The memory system includes executable instructions to at least: receive, via the communication system, an intermediary message from an intermediary party, the intermediary message comprising data to initiate generating the digital gift; initiate a voice interface that comprises activating the audio speaker and the microphone; ask a first set of one or more questions via the audio speaker and respectively record a first set of one or more answers via the microphone, the first set of the one or more questions and the first set of the one or more answers used to at least identify a gift recipient, record an audio gift message for the gift recipient, initiate an option to select an image or a video, and confirm transmission of a digital gift, the digital gift comprising the audio gift message and the data from the intermediary message; and initiate transmission of the digital gift to the gift recipient via the communication system.

In an example aspect, the intermediary message further comprises data about the gift recipient.

In another example aspect, the intermediary message further comprises data about a user of the user device.

In another example aspect, the intermediary message further comprises data about an upcoming event date.

In another example aspect, the intermediary message further comprises location-related data that is derived from a location of the user device.

In another example embodiment of a user device that generates a digital gift, the user device includes: a display screen; a processor system; a communication system; an audio speaker; a microphone; and a memory system. The memory system includes executable instructions to at least: receive, via the communication system, an intermediary message from an intermediary party, the intermediary message comprising data to initiate generating a digital gift and giving a physical gift; initiate a voice interface that comprises activating the audio speaker and the microphone; ask a first set of one or more questions via the audio speaker and respectively record a first set of one or more answers via the microphone, the first set of the one or more questions and the first set of the one or more answers used to at least identify a gift recipient, record an audio gift message for the gift recipient, initiate an option to select an image or a video, and confirm delivery of the physical gift and transmission of the digital gift, the digital gift comprising the audio gift message and the data from the intermediary message; and, initiate transmission of the digital gift to the gift recipient via the communication system, and initiate delivery of the physical gift to the gift recipient.

In an example aspect, the data to initiate generating the digital gift comprises digital content about the physical gift.

In another example aspect, the intermediary message further comprises data about the gift recipient.

In another example aspect, the intermediary message further comprises data about a user of the user device.

In another example aspect, the intermediary message further comprises data about an upcoming event date.

In another example aspect, the intermediary message further comprises location-related data that is derived from a location of the user device.

In an example embodiment of a user device that receives a digital gift, the user device includes: a display screen; a processor system; a communication system; an audio speaker; a microphone; and a memory system. The memory system includes executable instructions to at least: receive, via the communication system, a digital gift from a gift giver; initiate a voice interface that comprises activating the audio speaker and the microphone; ask a first set of one or more questions via the audio speaker and respectively record a first set of one or more answers via the microphone, the first set of the one or more questions and the first set of the one or more answers used to at least confirm the user wants to play the digital gift and, after receiving a positive confirmation from a user of the user device, playing the digital gift, wherein the digital gift comprises at least an audio gift message; after playing the digital gift, ask a second set of one or more questions via the audio speaker and respectively record a second set of one or more answers via the microphone, the second set of the one or more questions and the second set of the one or more answers used to at least initiate an option to provide a response message to the gift giver, record the response message using at least the microphone, and confirm transmission of the response message; and initiate transmission of the response message to the gift giver via the communication system.

In an example aspect, the digital gift is associated with one or more conditions, and the user device detects if the one or more conditions are satisfied before playing the digital gift.

In another example aspect, the one or more conditions comprise verifying a location of the user device.

In another example aspect, the one or more conditions comprise verifying a date and a time at which the digital gift is to be played to the user of the user device.

In another example aspect, the one or more conditions comprise verifying the user's presence using at least one of facial recognition, voice recognition, fingerprint recognition, and biological signal recognition.

In another example aspect, the one or more conditions comprise verifying a mood of the user.

In another example aspect, the one or more conditions comprise verifying that the user is alone in an immediate vicinity of the user.

In another example aspect, the one or more conditions comprise verifying that the user has taken their medication.

In another example aspect, the executable instructions are used to further audio record a reaction of the user while playing the digital gift, and transmit the reaction to the gift giver.

In another example aspect, the user device further includes a camera device, and wherein the executable instructions are used to further record, using at least the camera device, a reaction of the user while playing the digital gift, and transmit the reaction to the gift giver.

In another example aspect, the reaction comprises an image of the user.

In another example aspect, the reaction comprises a video of the user.

In another example aspect, the digital gift further comprises at least one of an image and a video displayable on the display screen.

In another example aspect, the digital gift further comprises a digital game for the user to play.

In another example aspect, the digital gift is played to the user after receiving a message, via the communication system, that a physical gift associated with the digital gift has been delivered to the user.

In another example aspect, the communication system receives a message that a physical gift associated with the digital gift will be delivered to the user at a future time, and the user device plays the digital gift before the future time.

In another example aspect, the communication system receives a message that a physical gift associated with the digital gift will be delivered to the user at a future time, and the user device plays the digital gift at the future time.

In another example embodiment of a user device that receives a digital gift, the user device includes: a display screen; a processor system; a communication system; an audio speaker; a microphone; and a memory system. The memory system includes executable instructions to at least: receive, via the communication system, a digital gift wrapper from a gift giver, the digital gift wrapper comprising visual content; display the digital gift wrapper on the display screen; initiate a voice interface that comprises activating the audio speaker and the microphone; ask a first set of one or more questions via the audio speaker and respectively record a first set of one or more answers via the microphone, the first set of the one or more questions and the first set of the one or more answers used to at least confirm playing the digital gift and, after receiving a positive confirmation from a user of the user device, playing the digital gift, wherein the digital gift comprises at least one of an audio gift content and visual gift content; after playing the digital gift, ask a second set of one or more questions via the audio speaker and respectively record a second set of one or more answers via the microphone, the second set of the one or more questions and the second set of the one or more answers used to at least initiate an option to provide a response message to the gift giver, record the response message using at least the microphone, and confirm transmission of the response message; and initiate transmission of the response message to the gift giver via the communication system.

In an example aspect, the digital gift wrapper comprises an animation.

In another example aspect, the digital gift wrapper comprises a static image.

In another example aspect, the digital gift wrapper comprises a video.

In another example aspect, the digital gift wrapper further comprises audio data.

In another example aspect, the visual content of the digital gift wrapper is associated with an attribute of the gift giver.

In another example aspect, the visual content of the digital gift wrapper is associated with an attribute of the user.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system, the devices, and the components as described herein, may be combined with each other in different ways. In other words, different devices, modules, operations, functionality and components may be used together according to other example embodiments, although not specifically stated.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A user device for generating a digital message, the user device comprising:

a display screen;

a processor system;

a communication system, wherein the communication system is configured to communicate with a connect server system to generate the digital message;

an audio speaker;

a microphone;

a memory system comprising executable instructions to at least:

detect that the user device has changed location from a first location to a second location and is within the second location;

responsive to detecting that the user device has changed location from a first location to a second location and is within the second location, initiate a voice interface, which comprises speech-to-text processing, to process user voice data to obtain text data, and processing the text data to at least: receive a selection identifying a recipient, obtain digital content for generating a digital wrapper and the digital message, and obtain communication channel information for transmitting the digital message to the recipient;

transmit the digital wrapper, the digital message, and the communication channel information to the connect server system via the communication system;

responsive to subsequently receiving a response message from the recipient, determine whether to play the response message and, after determining that the response message is to be played, display at least a representation of the digital message followed by the response message;

wherein the digital wrapper comprises an opening condition, and a voice conversation library that comprises a plurality of questions, prompts, and responses; and wherein the digital wrapper is transmittable and loadable on to a recipient device separately from the digital message, the digital wrapper comprises a digital link to the digital message, and the digital wrapper is configured to be presented before playing the digital message.

2. The user device of claim 1, wherein the memory comprises executable instructions to further: search and return one or more photos showing both a face of the recipient and a face of a giver using facial recognition computations, wherein the user device is operated by the giver; and display the one or more photos via the display screen for inclusion in the digital message.

3. The user device of claim 2, wherein the one or more photos are each associated with one or more sentiment tags.

4. The user device of claim 1, wherein a voice interaction condition is associated with a given digital message, and the voice interaction condition comprises one or more key words that are to be audio detected to trigger playing the given digital message.

5. The user device of claim 1, wherein the opening condition comprises verifying a recipient's presence using at least one of facial recognition, voice recognition, fingerprint recognition, and biological signal recognition before permitting the digital message to be received by the recipient.

6. The user device of claim 1, wherein the opening condition comprises detecting a certain mood of the recipient before permitting a given digital message to be received by the recipient.

7. The user device of claim 1, wherein the digital wrapper is configured to initiate recording of the recipient when interacting with the digital wrapper and detecting a mood of the recipient.

8. The user device of claim 1, wherein the memory comprises executable instructions to further: search and return one or more photos showing both a face of the recipient and a face of a giver using facial recognition computations, wherein the user device is operated by the giver; and display the one or more photos via the display screen for inclusion in the digital wrapper.

9. The user device of claim 1, wherein the memory system comprises the executable instructions to further:

receive an advertisement from an intermediary party for a physical item to give to the recipient, wherein the advertisement is received in response to context information associated with a giver that operates the user device; and responsive to receiving the advertisement, initiate the voice interface, which comprises the speech-to-text processing, to process the user voice data of the giver to obtain the text data, and processing the text data to at least: receive the selection identifying the recipient, obtain the digital content for generating the digital wrapper and the digital message, obtain the communication channel information for transmitting the digital message to the recipient, and obtain confirmation to provision the physical item to the recipient.

10. The user device of claim 9, wherein the context information comprises location information of the user device.

11. The user device of claim 9, wherein the context information comprises an event associated with the giver.

12. A user device for generating a digital message, the user device comprising:

a display screen;

a processor system;

a communication system, wherein the communication system is configured to communicate with a connect server system to generate the digital message;

an audio speaker;

a microphone;

a memory system comprising executable instructions to at least:

detect a location of the user device;

receive an advertisement from an intermediary party for a physical item to give to the recipient, wherein the advertisement is received in response to context information comprising the location of the user device;

responsive to receiving the advertisement, initiate a voice interface, which comprises speech-to-text processing, to process user voice data to obtain text data, and processing the text data to at least: receive a selection identifying a recipient, obtain digital content for generating a digital wrapper and the digital message, and obtain communication channel information for transmitting the digital message to the recipient;

transmit the digital wrapper, the digital message, and the communication channel information to the connect server system via the communication system;

responsive to subsequently receiving a response message from the recipient, determine whether to play the response message and, after determining that the response message is to be played, display at least a representation of the digital message followed by the response message;

wherein the digital wrapper comprises an opening condition, and a voice conversation library that comprises a plurality of questions, prompts, and responses; and wherein the digital wrapper is transmittable and loadable on to a recipient device separately from the digital message, the digital wrapper comprises a digital link to the digital message, and the digital wrapper is configured to be presented before playing the digital message.

* * * * *